(12) United States Patent
Hoff

(10) Patent No.: US 12,162,132 B2
(45) Date of Patent: Dec. 10, 2024

(54) SHED ORGANIZING SYSTEMS INCLUDING SELF-LEVELING MOUNTING PLATES AND TOOL SUPPORTING SECTIONS

(71) Applicant: Tim Hoff, Stewartsville, NJ (US)

(72) Inventor: Tim Hoff, Stewartsville, NJ (US)

( * ) Notice: Subject to any disclaimer, the term of this patent is extended or adjusted under 35 U.S.C. 154(b) by 42 days.

(21) Appl. No.: 17/367,474

(22) Filed: Jul. 5, 2021

(65) Prior Publication Data

US 2022/0009079 A1  Jan. 13, 2022

Related U.S. Application Data

(60) Provisional application No. 63/048,675, filed on Jul. 7, 2020.

(51) Int. Cl.
*F16M 13/02* (2006.01)
*B25H 3/00* (2006.01)

(52) U.S. Cl.
CPC .............. *B25H 3/00* (2013.01); *F16M 13/02* (2013.01)

(58) Field of Classification Search
CPC .......... B25H 3/00; B25H 3/04; A47B 81/005; A47B 96/06; F16L 3/223; A47H 1/142
See application file for complete search history.

(56) References Cited

U.S. PATENT DOCUMENTS

| | | | | |
|---|---|---|---|---|
| 1,227,111 A | * | 5/1917 | Burdick | .................. H01B 17/16 248/68.1 |
| 4,650,144 A | | 3/1987 | Conrad | |
| 4,984,763 A | | 1/1991 | O'Donnell | |
| 5,499,724 A | * | 3/1996 | Hickman | .................. B25H 3/04 211/70.6 |
| 6,375,141 B1 | | 4/2002 | Kettlestring | |
| 2005/0193530 A1 | | 9/2005 | Boda | |
| 2006/0022105 A1 | | 2/2006 | MacKay | |
| 2007/0235596 A1 | * | 10/2007 | Youmans | ................ F16L 3/223 248/68.1 |
| 2011/0062293 A1 | * | 3/2011 | McCoy | ..................... F16L 3/22 211/60.1 |
| 2017/0335881 A1 | | 11/2017 | Briggs | |

OTHER PUBLICATIONS

Hang-it-All Hooks, https://www.familyhandyman.com/garden/12-ingenious-gardening-and-yard-tool-storage-tips/, 1 page.
Steel Garage Storage Small J Hooks, https://garageage.com/products/coolyeah-steel-garage-storage-std-u-hooks, 2 pages.
Stud Grabber Utility Hooks, https://www.amazon.com/Cleverbrand-Inc-Stud-Grabber-Utility/dp/B00266KTZC, 2 pages.

* cited by examiner

*Primary Examiner* — Bradley Duckworth
(74) *Attorney, Agent, or Firm* — Charney IP Law LLC

(57) ABSTRACT

A shed organizing system includes a first tool organizing device having a first mounting plate and a first tool supporting section that extends from the first mounting plate, and a second tool organizing device having a second mounting plate and a second tool supporting section that extends from the second mounting plate. A shed includes an exposed vertical stud having a first major surface that extends along a first side of the exposed vertical stud and a second major surface that extends along a second side of the exposed vertical stud. The first mounting plate is secured to said the major surface of the exposed vertical stud and the second mounting plate is secured to the second major surface of the exposed vertical stud.

27 Claims, 48 Drawing Sheets

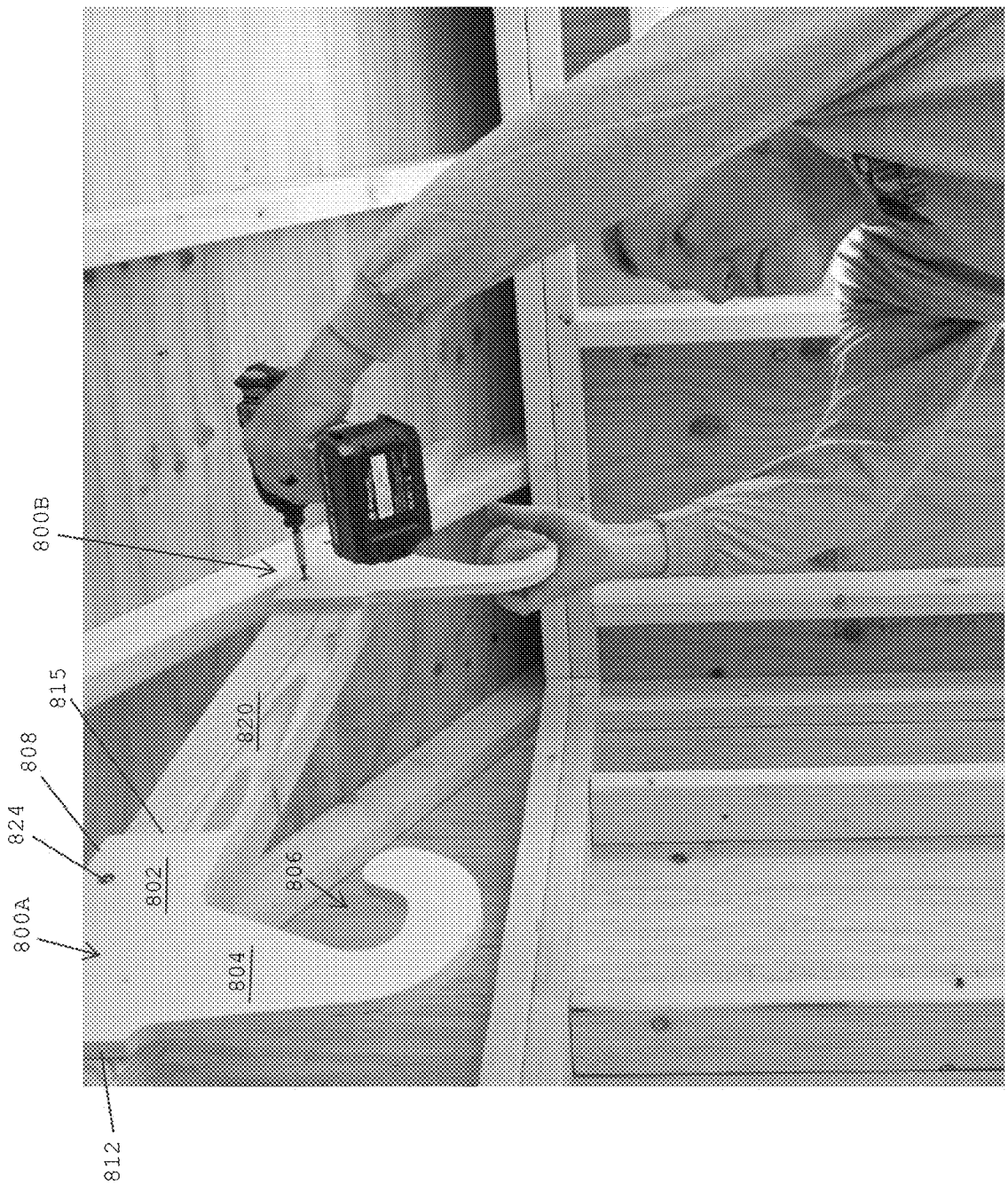

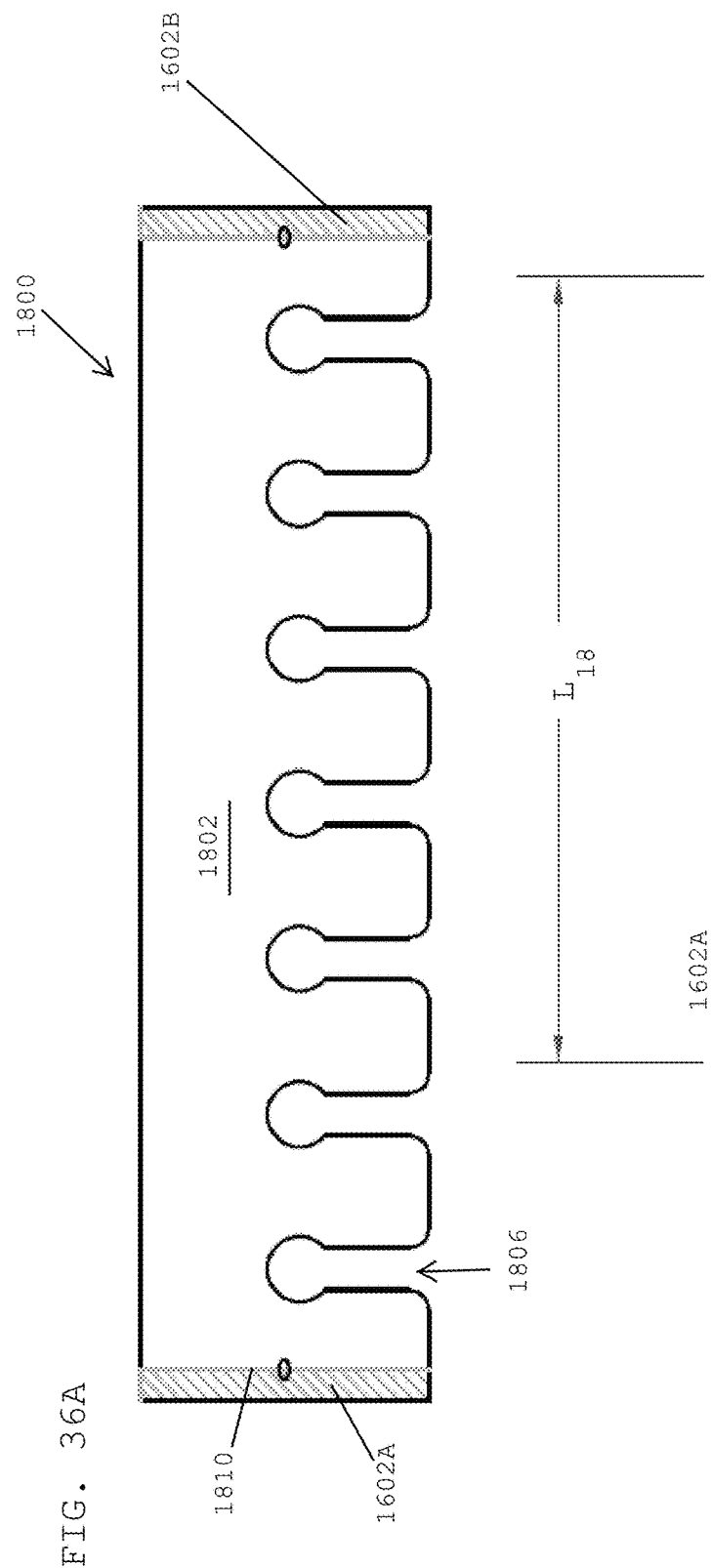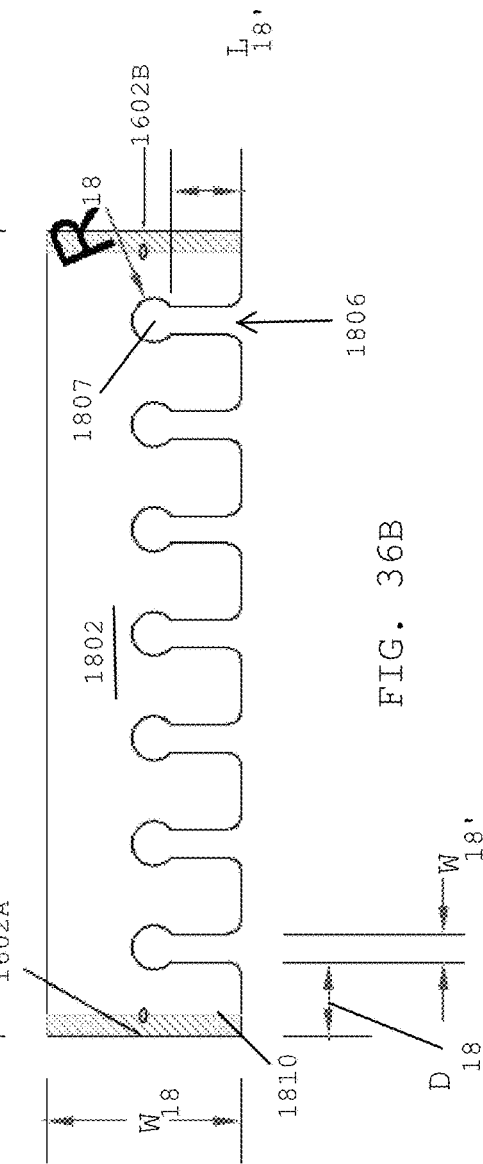
FIG. 36A
FIG. 36B

SHED ORGANIZING SYSTEMS INCLUDING SELF-LEVELING MOUNTING PLATES AND TOOL SUPPORTING SECTIONS

CROSS-REFERENCE TO RELATED APPLICATIONS

The present patent application claims benefit of U.S. Provisional Application Ser. No. 63/048,675, filed on Jul. 7, 2020, the disclosure of which is hereby incorporated by reference herein.

BACKGROUND OF THE INVENTION

Field of the Invention

The present patent application is generally related to organizing systems, tools and devices and is more particularly related to systems, tools and devices for organizing items that are stored in storage sheds.

Description of the Related Art

Hangers and hooks are often used for storing items inside buildings such as homes, barns, garages and sheds. Typically, hangers and hooks are secured to a structure such as a wall or stud by using fasteners (e.g., screws) that are designed for penetrating the front surface of a stud, beam, rafter, and/or joist. Generally, the screws are passed through a plate of the hanger or hook and into the front face of the stud, beam, rafter and/or joist. This conventional methodology does not make it easy to install the hangers and hooks, nor does it provide the strongest way to mount a hanger or hook device.

In view of the above-noted deficiencies, there is a need for improved organizing systems for buildings, barns, garages and sheds.

SUMMARY OF THE INVENTION

In one embodiment, an organizing system for enclosed structures such as homes, barns, garages and sheds preferably includes organizing devices that may be secured or mounted to the exposed studs, beams, joists and/or rafters of the enclosed structures.

In one embodiment, the organizing system may include one or more tool organizing devices that are adapted to be secured to studs, beams, joists and/or rafters. In one embodiment, each organizing device preferably includes a mounting plate and a tool supporting section that is adapted to support one or more item such as tools. In one embodiment, the tool supporting section may include a tool supporting recess that is configured to seat and retain a tool such as the blade of a shovel or a rake head.

In one embodiment, the systems disclosed herein provide a unique mounting concept whereby the dimensions of the mounting plate portion of a hanging device corresponds to the depth and/or or height of a stud, beam, joist or rafter. For example, in one embodiment, an organizing device includes a mounting plate having a length of 3.50 inches that is secured to a major face (i.e., the side face) of a 2×4 stud, and another organizing device includes a mounting plate having a length of 5.50 inches that is secured to a major face (i.e., a side face) of a 2×6 stud.

In one embodiment, an organizing device may include a single piece of material that is used to make the mounting plate and the tool supporting section of a hanging device.

In one embodiment, a tool organizing device may be made from plywood (e.g., wisa birch) or from a composite material.

In one embodiment, a tool organizing device may be secured to a side face (i.e., a major face) of a stud or beam rather than to the front face of the stud or beam.

In one embodiment, a tool organizing device preferably includes a mounting plate that provides for ease of installation. In one embodiment, the mounting plate has horizontally extending and vertically extending edges that enable the device to be easily aligned with the front, back, top and/or bottom of a stud, beam, rafter, or joist.

In one embodiment, installation may only require the use of a screw driver for joining the mounting plate to the stud using fasteners such as screw. In one embodiment, the mounting plate preferably has pre-formed fastener openings. In one embodiment, a drill may be used for forming fastener openings in either the mounting plate or the stud/beam.

A tool organizing device may be mounted to a stud/beam using screws or bolts depending upon the weight of items to be hung.

The system may be used for a variety of items to be stored in a storage shed such as lawn tools (e.g., rakes, shovels), yard items (e.g., garden hoses, power washing hoses, wands), lawn equipment (e.g., lawn spreaders, seed spreaders), hangers for light power equipment (e.g., weed wackers, trimmers, chain saws), mounts for shelving, mounts for bikes, mounts for snow skis, mounted for water equipment (e.g., water skis, wake boards), folding chairs, fishing rods, baseball bats and golf clubs.

The organizing devices disclosed herein provide many benefits over conventional organizing devices including: 1) mounting a device on a side, major face of a stud provides greater mounting strength than mounting the device on a front face of the stud; 2) the mounting plates having fastener openings provides for ease of installation; and 3) the system can accommodate a single tool, or to or more tools.

BRIEF DESCRIPTION OF THE DRAWINGS

FIG. 18 shows the tool organizing device of FIGS. 17A and 17B being secured to an overhead beam a storage shed, in accordance with one embodiment of the present patent application.

FIGS. 36A and 36B show a top view of a golf club organizing system including a golf club support plate and a pair of self-leveling mounting plates, in accordance with one embodiment of the present patent application.

DETAILED DESCRIPTION OF PREFERRED EMBODIMENTS

Figure 1A:
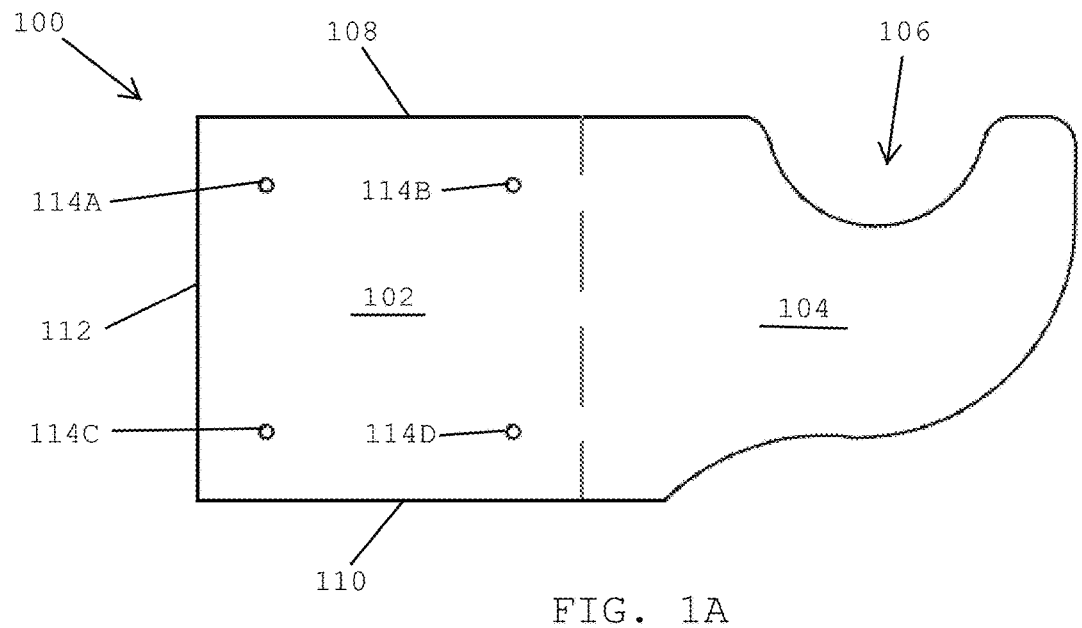
FIGS. 1A and 1B show a side view of a tool organizing device, in accordance with one embodiment of the present patent application.
Figure 1B:
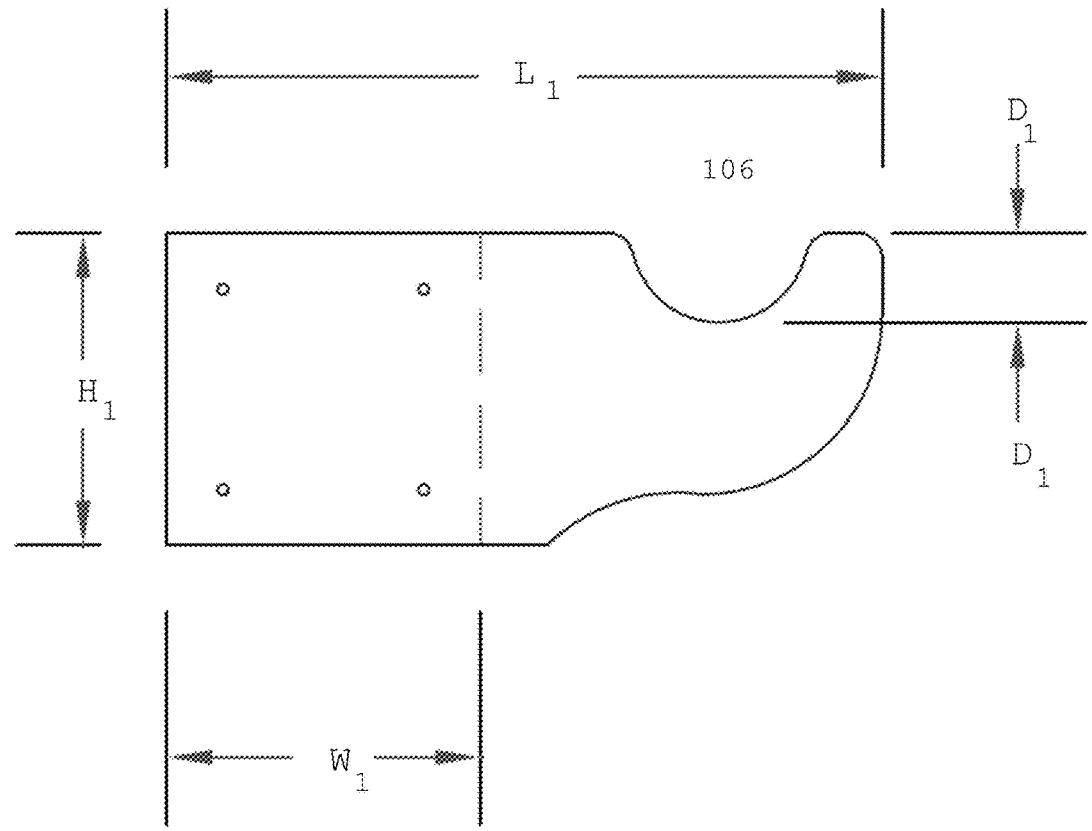

Referring to FIGS. 1A and 1B, in one embodiment, a tool organizing system preferably includes a tool organizing device 100 that may be used for storing and organizing garden tools. In one embodiment, the tool organizing device 100 preferably has a mounting plate 102 and a tool supporting section 104 with a tool supporting recess 106 formed at an upper end of the tool supporting section 104. In one embodiment, the mounting plate 102 has a horizontally extending top edge 108, a horizontally extending bottom edge 110, and a vertically extending rear edge 112 that defines a 90 degree angle with the horizontally extending top and bottom edges 108, 110. The 90 degree angle between the vertically extending rear edge 112 and the horizontally extending top and bottom edges 108, 110 preferably enables the mounting plate 102 to be a self-leveling mounting plate whereby the vertically extending rear edge 112 and the horizontally extending top and bottom edges 108, 110 may be used to align the tool organizing device 100 relative to vertical studs and horizontal beams of a storage shed.

In one embodiment, the tool organizing device may be made of wood such as wisa birch plywood. In one embodiment, the mounting plate and the tool supporting section are formed from a single piece of material such as a single or integral piece of plywood (e.g., wisa birch plywood).

In one embodiment, the tool supporting section 104 may function as a hook for supporting an item such as a garden tool. In one embodiment, the tool supporting recess 106 may have a concave curved configuration for providing a broad base of support for an item (e.g., a garden tool) that is hung from the tool organizing device 100.

Referring to FIG. 1B, in one embodiment, the tool organizing device 100 has a length $L_1$ of about 6-10 inches and more preferably about 8 inches. In one embodiment, the mounting plate 102 has a height $H_1$ of about 3.5 inches and a width $W_1$ of about 3.5 inches. In one embodiment, the tool supporting recess 106 desirably has a depth $D_1$ of about 1 inch.

In one embodiment, the self-leveling mounting plate 102 preferably includes a plurality of fastener openings 114A-114D that are adapted to receive fasteners, such as threaded screws, for securing the tool organizing device 100 to a stud or beam of a storage shed.

Figure 2:
FIG. 2 shows the tool organizing device of FIGS. 1A and 1B being secured to a vertical stud of a storage shed, in accordance with one embodiment of the present patent application.

Referring to FIG. 2, in one embodiment, the tool organizing device 100 may be secured to a major face of a vertical stud 120 of a storage shed. In one embodiment, the stud 120 is a vertical stud that extends from the floor toward the ceiling of a tool shed. In one embodiment, the vertical rear edge 112 of the self-leveling mounting plate 102 is pressed against a vertical wall 122 of the shed for aligning the self-leveling mounting plate 102 on the vertically extending stud 120. The top and bottom horizontal edges 108, 110 of the self-leveling mounting plate 102 may also be utilized for properly aligning the tool organizing device 100 on the vertically extending stud 120 of the storage shed. In one embodiment, the tool organizing device 100 is preferably secured to the stud 120 so that the tool supporting section 104 of the tool organizing device 100 projects inwardly toward the interior region of the storage shed. As a result, the tool supporting recess 106 of the tool organizing device 100 is accessible inside the storage shed for hanging an item, such as a garden tool, from the tool supporting section 104.

In one embodiment, a pair of tool organizing devices may be mounted to the same vertical stud, with a first tool organizing device secured to a first major face of the stud and a second tool organizing device secured to a second major face of the stud. The first and second tool organizing devices are preferably aligned with one another at the same height on the stud. The gap between the first and second tool organizing devices is preferably equal to the thickness of the vertical stud.

Figure 3A:
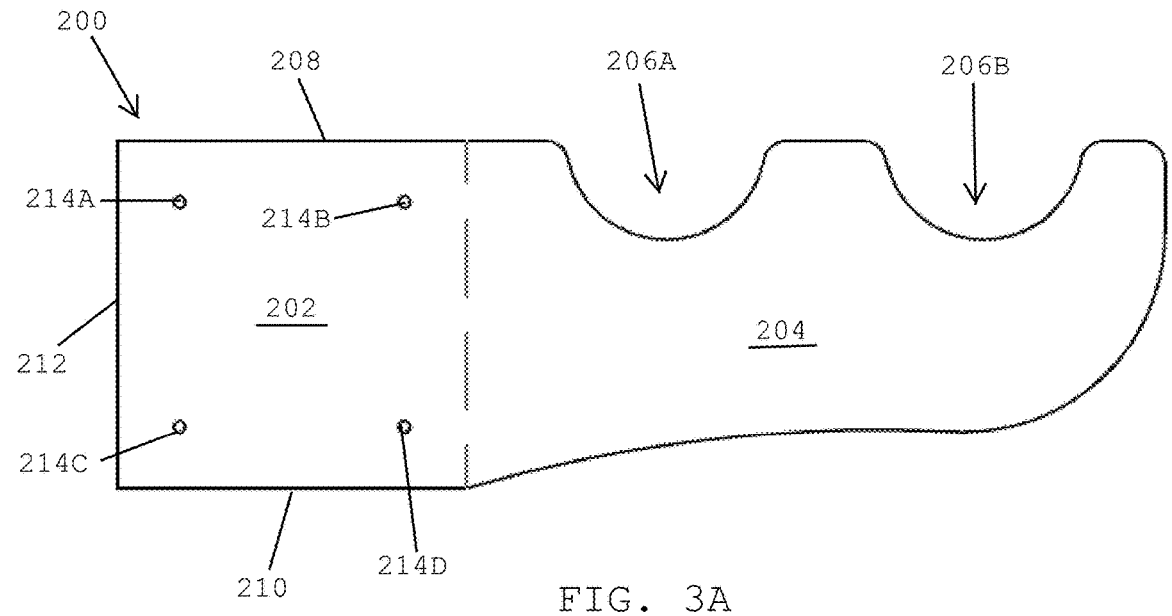
FIGS. 3A and 3B show a side view of a tool organizing device, in accordance with one embodiment of the present patent application.
Figure 3B:
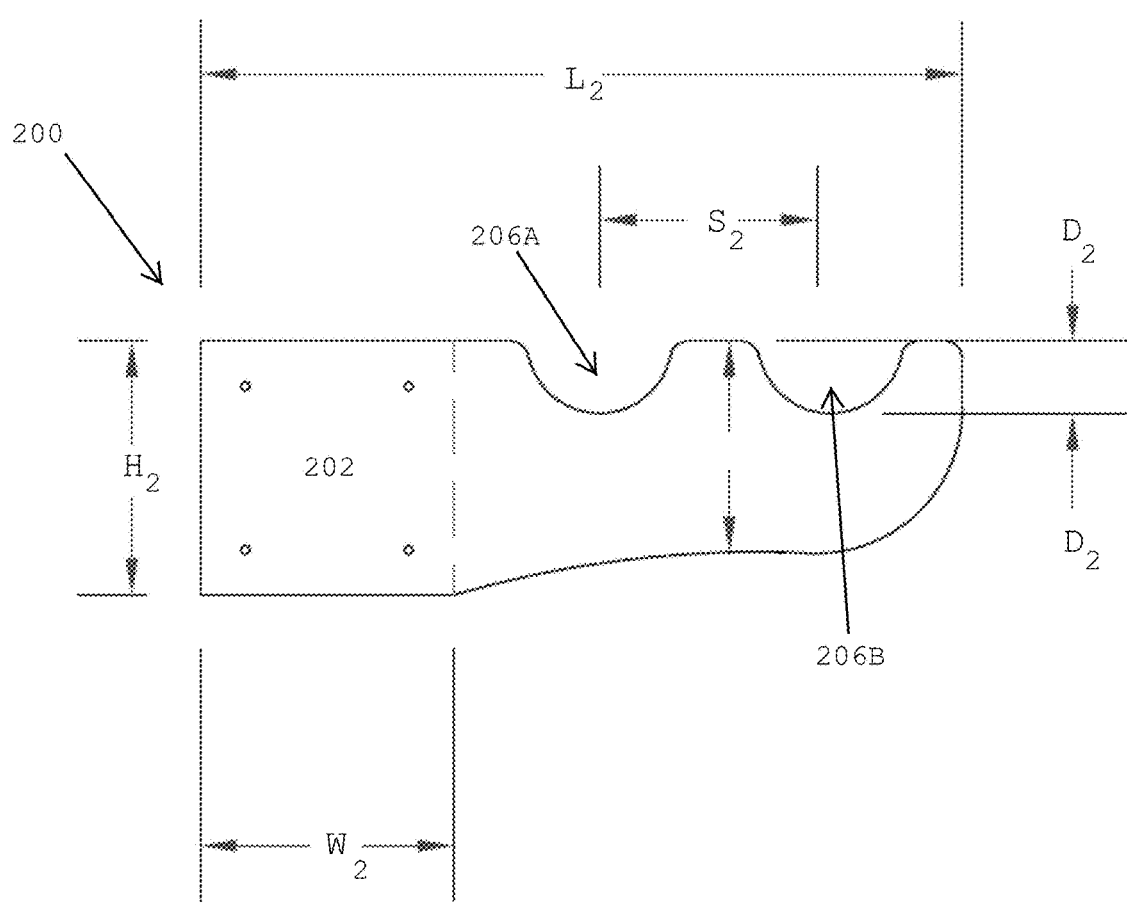

Referring to FIGS. 3A and 3B, in one embodiment, a tool organizing device 200 preferably includes a self-leveling mounting plate 202 and a tool supporting section 204 that has a first tool supporting recess 206A, and a second tool supporting recess 206B that is adjacent the first tool supporting recess 206A.

In one embodiment, the self-leveling mounting plate 202 preferably includes a top horizontal edge 208 and a bottom horizontal edge 210 that is parallel to the top horizontal edge 208. In one embodiment, the self-leveling mounting plate 202 preferably includes a vertically extending rear edge 212 that is perpendicular to the top and bottom horizontally extending edges 208, 210. The 90 degree angle between the vertically extending rear edge 212 and the horizontally extending top and bottom edges 208, 210 preferably enables an individual to easily align the self-leveling mounting plate 202 with a vertical stud of horizontal beam of a storage shed. Thus, if a stud extends in a vertical direction within a storage shed, the rear vertically extending edge 212 will preferably be aligned with the longitudinally extending vertical axes of the stud while the top and bottom horizontally extending edges 208 and 210 will be perpendicular to the vertical axis of the stud.

In one embodiment, the self-leveling mounting plate 202 preferably includes a plurality of fastener openings 214A-2140 that are adapted to receive fasteners, such as screws, for mounting the tool organizing device 200 onto a stud or a beam of a storage shed.

Referring to FIG. 3B, in one embodiment, the tool organizing device 200 preferably has a length $L_2$ of about 8-12 inches and more preferably about 10.5 inches. In one embodiment, the self-leveling mounting plate 202 preferably has a height $H_2$ of about 3.5 inches and a width $W_2$ of about 3.5 inches. In one embodiment, each of the tool supporting recesses 206A, 2068 preferably has a depth $D_2$ of about 1 inch. In one embodiment, the first tool supporting recess 206A and the second tool supporting recess 205B have centers that have spacing $S_2$ of about 3 inches.

Figure 4:
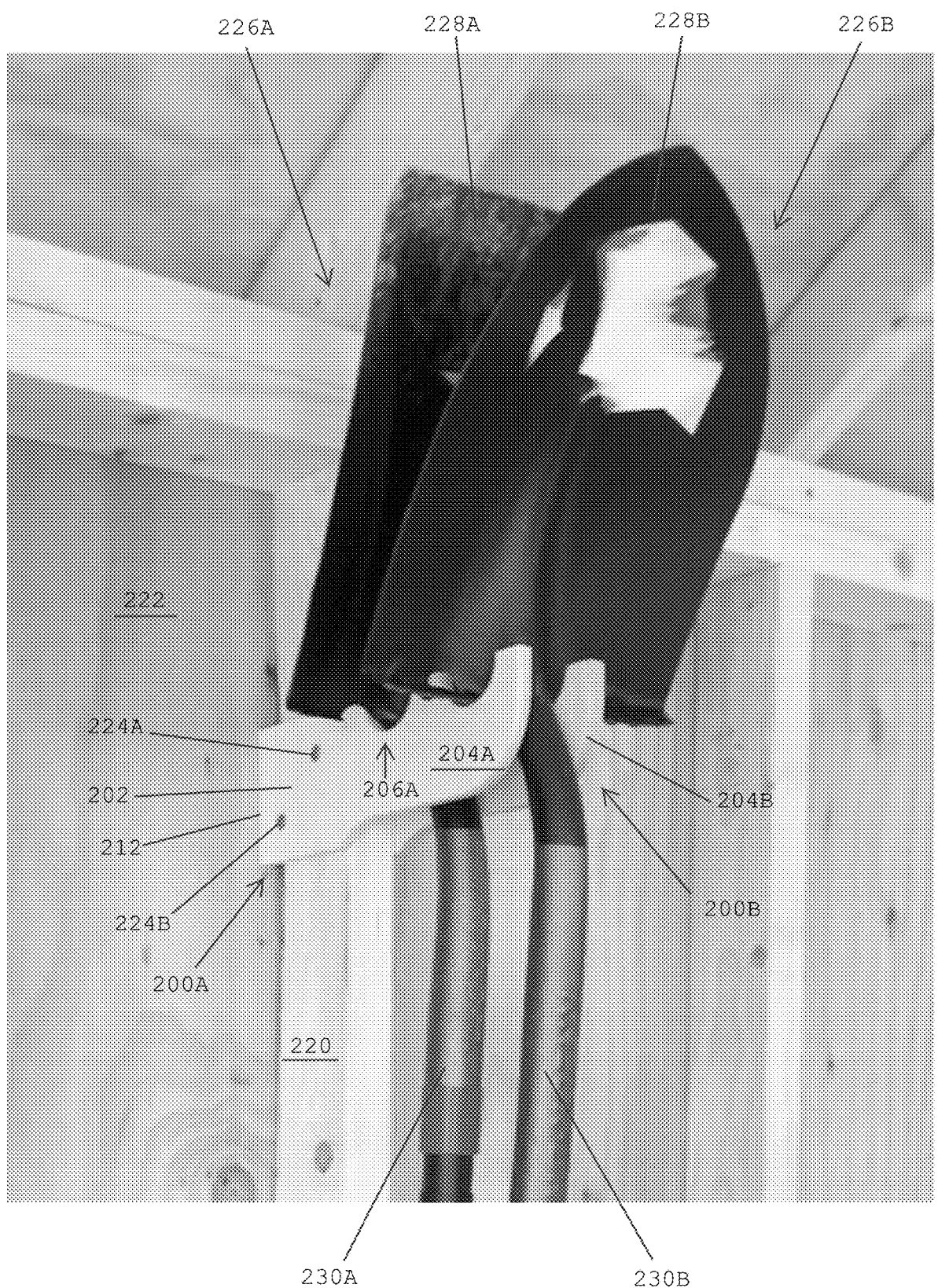
FIG. 4 shows the tool organizing device of FIGS. 3A and 3B after being secured to a vertical stud of a storage shed for supporting one or more tools, in accordance with one embodiment of the present patent application.

Referring to FIG. 4, in one embodiment, a pair of the tool organizing devices 200 shown and described in FIGS. 3A and 3B may be secured to opposite major faces of a vertically extending stud 220 of a storage shed for providing a tool organizing system for garden tools. In one embodiment, a first tool organizing device 200A may be secured to a first major face of the stud 220, and a second tool organizing device 200B may be secured to an opposite major face of the stud 220. The first and second tool organizing devices 200A, 200B are preferably secured at the same height on the vertical stud 220. In one embodiment, the rear vertically extending edge 212 of the first tool organizing device 200A may be abutted against the vertical wall 222 of the storage shed for aligning the self-leveling mounting plate 202 with the vertical axis of the stud 220. In one embodiment, first and second fasteners 224A, 224B are utilized for securing the self-leveling mounting plate 202 to the first major surface of the stud 220. The second tool organizing device 200B is preferably secured to the second major face of the stud 220 in a similar fashion by using fasteners, such as screws, for securing the self-leveling mounting plate of the second tool organizing device 200B to the second major surface of the stud 220.

In one embodiment, after a pair of the tool organizing devices 200A, 200B have been secured on opposite major faces of the stud 220, a gap, which is approximately equal to the thickness of the vertical stud 220, is present between the adjacent tool organizing devices 200A, 200B. In one embodiment, the pair of tool organizing devices 200A, 200B may be utilized for storing two shovels, one shovel being stored in from of a second shovel. In one embodiment, a first shovel 226A includes a blade 228A and a shaft 230A, a second shovel 226B includes a second blade 228B and a second shaft 2308, In one embodiment, the blade 228A of the first shovel 226A is secured within the first tool supporting recesses 206A of the first and second tool organizing devices 200A, 200B, and the shaft 230A of the first shovel 226A extends through the gap that is located between the adjacent tool supporting sections 204A, 204B of the respective first and second tool organizing devices 200A, 200B. In a similar manner, the blade 228B of the second shovel 226B is supported by the second tool supporting recesses 206B of the first and second tool organizing devices 200A, 200B, with the shaft 230B of the second shovel 226B extending in the gap that is located between the first and second tool organizing devices 200A, 200B.

Figure 5A:
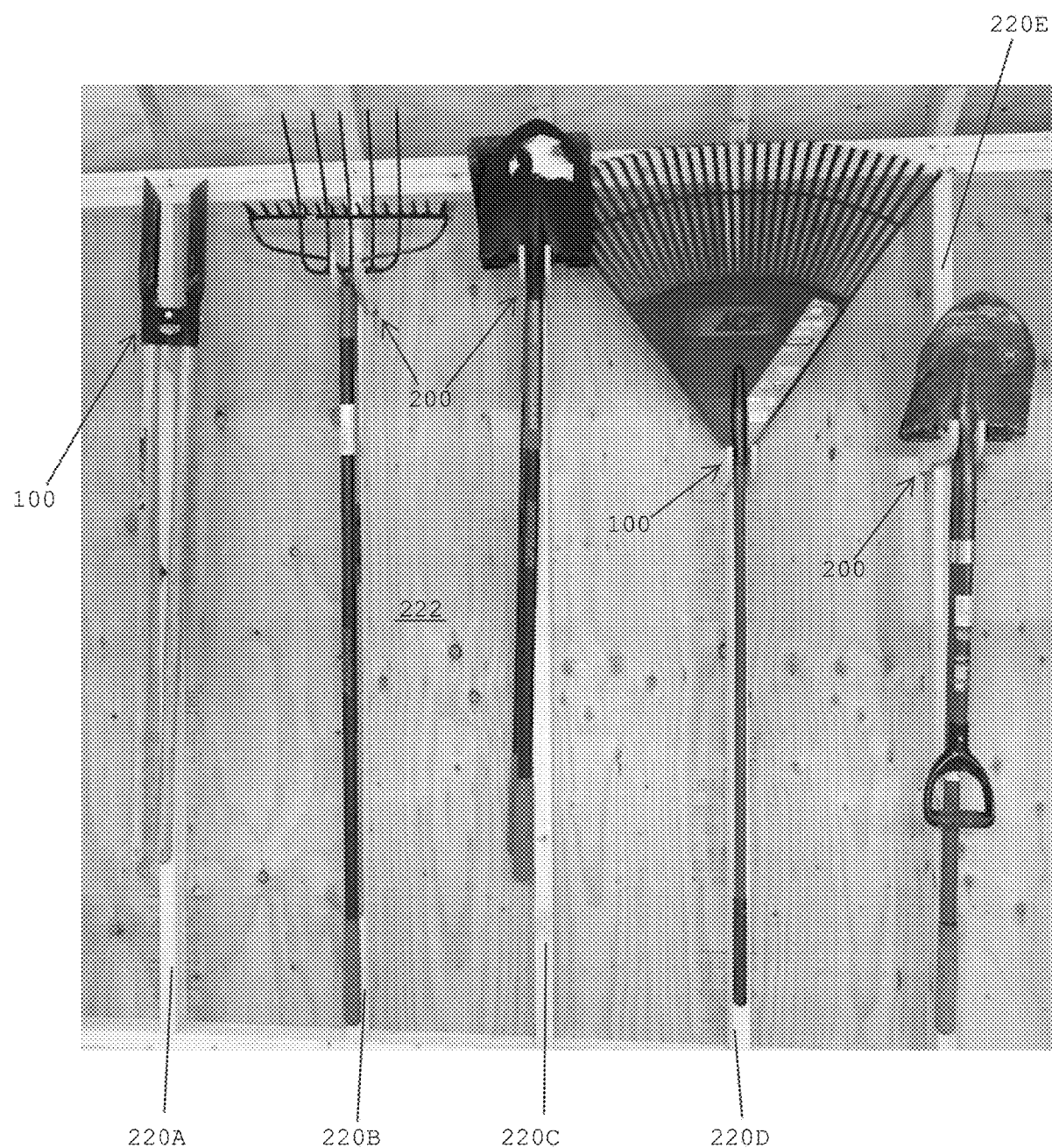
FIG. 5A shows a front view of a tool organizing system including tool organizing devices secured to vertical studs, in accordance with one embodiment of the present patent application.
Figure 5B:
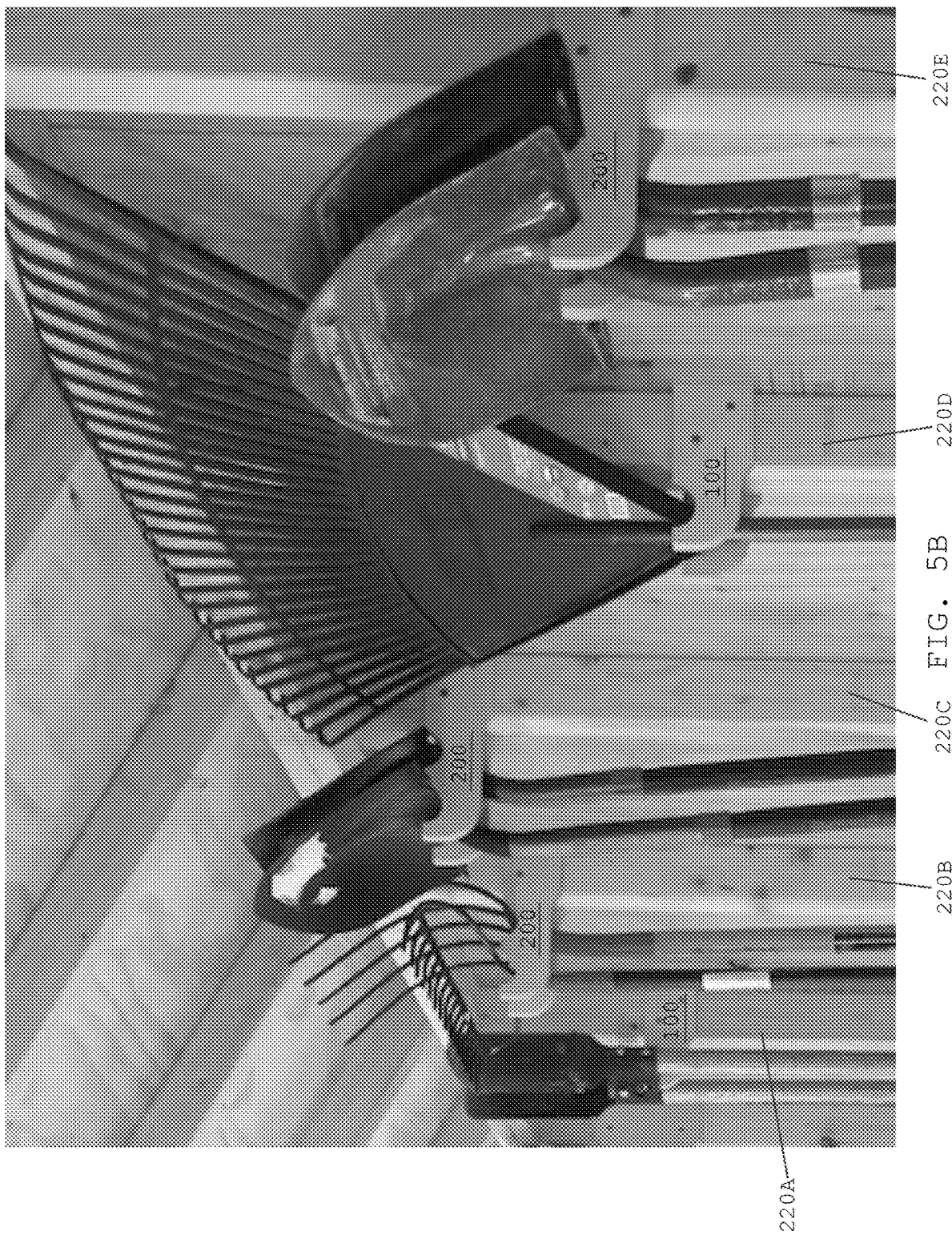
FIG. 5B shows a side perspective view of the tool organizing system including the tool organizing devices shown in FIG. 5A.

Referring to FIGS. 5A and 5B, in one embodiment, the first tool organizing device 100 shown and described above in FIGS. 1A and 1B, and the second tool organizing device 200 shown and described above in FIGS. 3A and 3B may be secured to vertically extending studs of a storage shed. Thus, the respective tool organizing devices 100, 200 may be secured to adjacent studs within a storage shed for storing either a single tool or a pair of tools.

For example, in one embodiment, a storage shed may have at least five vertically extending studs 220A-220E that are adjacent one another. The vertically extending studs 220A-220E preferably support a vertically extending wall 222 of the storage shed. In one embodiment, a pair of first tool supporting devices 100 (FIGS. 1A and 1B) are mounted to the first stud 220A and the fourth stud 220D of the storage shed. The pair of tool organizing devices 100 secured to the first stud 220A are utilized to support a hole digging device. The pair of tool organizing devices 100 secured to the fourth stud 220 are used to store a rake. The pairs of second tool organizing devices 200 (FIGS. 3A and 3B) are secured to the respective second stud 2208, third stud 220C, and fifth stud 220E of the storage shed. The second tool organizing devices 200 mounted to the second stud 220B are utilized to store a rake and a pitchfork. The pair of tool organizing devices 200 secured to the third stud 220C are utilized to store a pair of shovels. The third pair of tool organizing devices 200 mounted to the fifth stud 220E are used to store another pair of shovels. As shown in FIGS. 5A and 5B, a gap exists between each of the tool organizing devices 100, 200 so that the shafts of the tools may pass through the gap and between the pair of tool organizing devices for hanging down and generally extending along the longitudinal axes of the respective vertical studs.

Figure 6A:
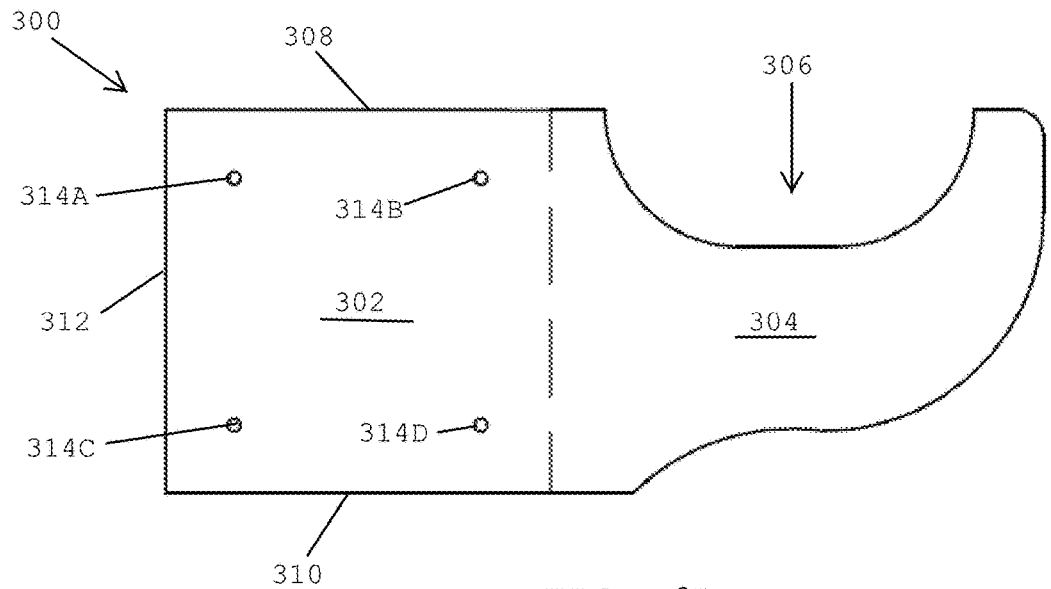
FIGS. 6A and 6B show a side view of a tool organizing device, in accordance with one embodiment of the present patent application.
Figure 6B:
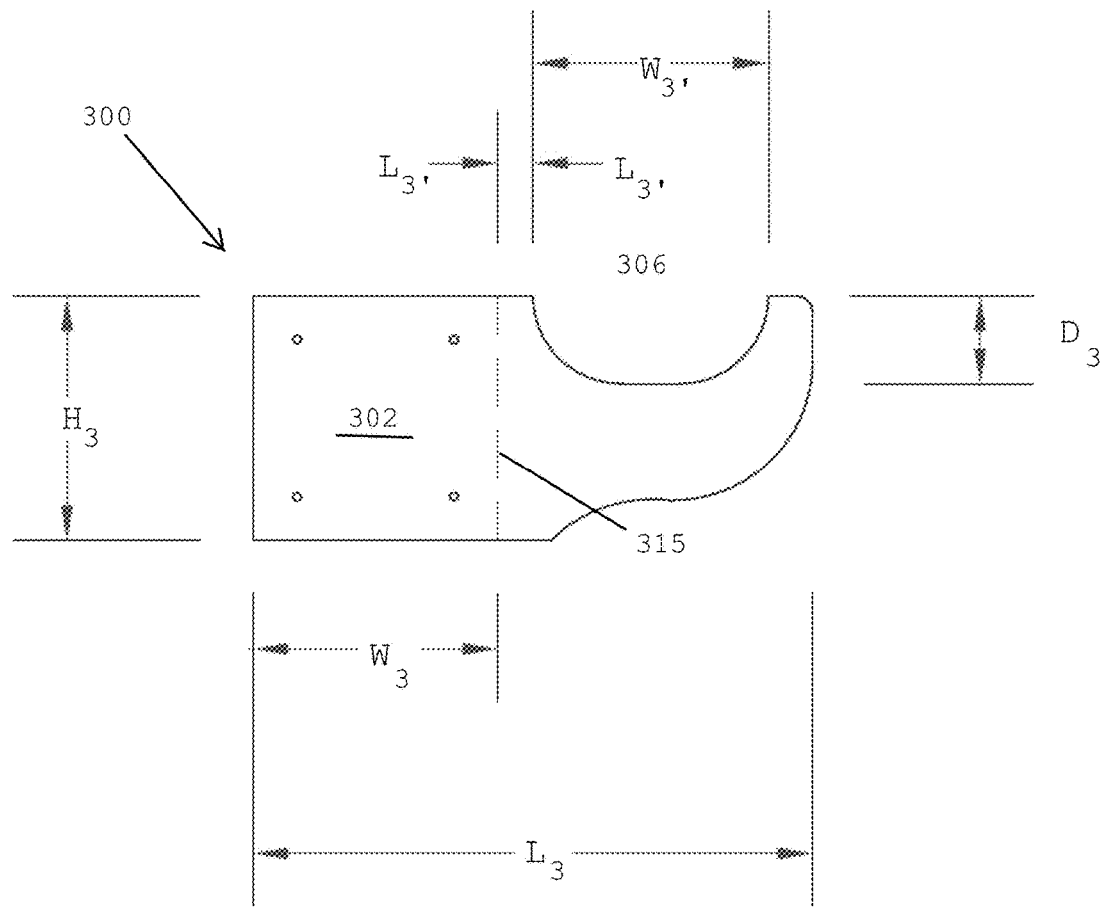

Referring to FIGS. 6A and 6B, in one embodiment, a tool organizing device 300 preferably includes a mounting plate 302 and a tool supporting section 304 that extends from a front edge of the mounting plate 302. The tool organizing device 300 preferably includes a tool supporting recess 306 that is formed in an upper end of the tool supporting section 304. The tool supporting recess 306 may include a concave curved surface that is adapted to receive and support an underside of a tool such as the blade of a shovel.

In one embodiment, the mounting plate 302 preferably includes a horizontally extending top edge 308, and a horizontally extending bottom edge 310 that is parallel to the horizontally extending top edge 308. In one embodiment, the mounting plate 302 preferably includes a vertically extending rear edge 312 that extends along an axis that is perpendicular to the horizontally extending top edge 308 and the horizontally extending bottom edge 310. The 90 degree angle between the vertically extending rear edge 312 and the horizontally extending top and bottom edges 308, 310 preferably enable the mounting plate 302 to be self-leveling when mounting the tool organizing device 300 onto a vertical stud of a storage shed. In one embodiment, the edges are used to align the mounting plate 302 with vertical and horizontal surfaces of studs, beams and walls of a storage shed.

In one embodiment, the tool organizing device 300 preferably includes a plurality of fasteners openings 314A-314D that are adapted to receive fasteners, such as screws, for securing the mounting plate 302 of the tool organizing device 300 to a major face of a stud of a storage shed.

Referring to FIG. 6B, in one embodiment, the tool organizing device 300 preferably has a length $L_3$ of about 8 inches, and the self-leveling mounting plate 302 preferably has a height $H_3$ of about 3.5 inches and a width $W_3$ of about 3.5 inches. The tool supporting recess 306 preferably has a depth $D_3$ of about 1.25 inches, and a width $W_3'$ of about 3.25-3.50 inches. In one embodiment, a distance between the front edge 315 of the mounting plate 302 and the beginning of the tool supporting recess 306 defines a length $L_3'$ of about 0.5 inches.

Figure 7:
FIG. 7 shows the tool organizing device of FIGS. 6A and 6B secured to a vertical stud of a storage shed, in accordance with one embodiment of the present patent application.

Referring to FIG. 7, in one embodiment, the tool organizing device 300 shown and described above in FIGS. 6A and 6B may be secured to a vertically extending stud 320 of a storage shed for hanging a garden tool within the storage shed. In one embodiment, the vertically extending rear edge 312 of the tool organizing device 300 is preferably abutted against an inner surface of a vertical wall of a storage shed and fasteners may be passed through the fastener openings 314A-314D (FIG. 6A) of the tool organizing device 300 for securing the tool organizing device to a major surface of the vertically extending stud 320. The tool supporting section 304, which has the tool supporting recess 306, preferably projects inwardly from the stud 320 to provide a structure for hanging a garden tool such as a seed spreader. In one embodiment, the handle of the gardening tool preferably sits within the tool supporting recess 306 of the tool supporting section 304 of the tool organizing device 300 for hanging the garden tool onto the vertically extending stud 320 of the storage shed.

Figure 8A:
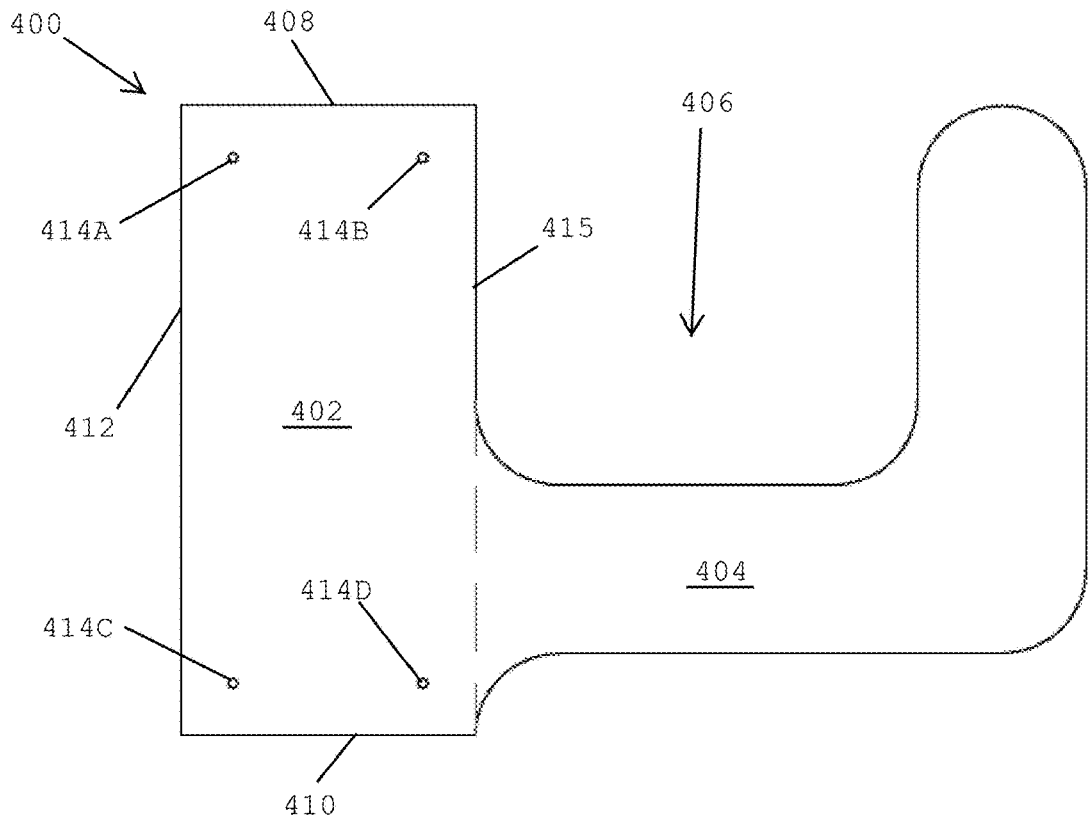
FIGS. 8A and 8B show a side view of a tool organizing device, in accordance with one embodiment of the present patent application.
Figure 8B:
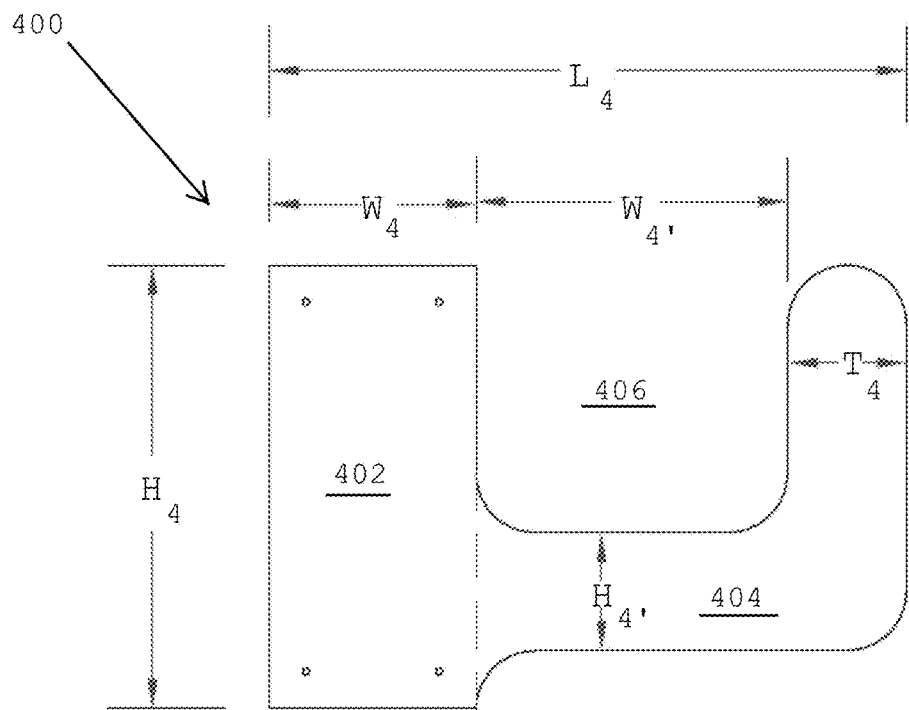

Referring to FIGS. 8A and 8B, in one embodiment, a tool organizing device 400 preferably includes a mounting plate 402 and a tool supporting section 404 that projects from a front edge 415 side of the mounting plate 402. In one embodiment, the tool organizing device 400 preferably includes a tool supporting recess 406 formed at an upper end of the tool supporting section 404.

Referring to FIG. 8B, in one embodiment, the tool organizing device 400 preferably has a length $L_4$ of about 10.75 inches. In one embodiment, the mounting plate 402 preferably has a height $H_4$ of about 7.25 inches and a width $W_4$ of about 3.25 inches. In one embodiment, the tool supporting recess 406 of the tool supporting device 400 preferably has a width $W_4'$ of about 5.25 inches. The horizontally extending component of the tool supporting section 404 preferably has a height $H_4'$ of about 2 inches and the vertically extending component of the tool supporting section 404 preferably has a thickness $T_4$ of about 2 inches.

In one embodiment, the mounting plate 402 preferably includes a plurality of fasteners openings 414A-414D that are adapted to receive fasteners, such as screws, for securing the mounting plate 402 to a major surface of a vertically extending stud of a storage shed.

Figure 9:
FIG. 9 shows the tool organizing device of FIGS. 8A and 8B being secured to a vertical stud of storage shed, in accordance with one embodiment of the present patent application.

Referring to FIG. 9, in one embodiment, the tool organizing device 400 shown and described above in FIGS. 8A and 8B may be secured to a major surface of a vertically extending stud 420 of a storage shed. In one embodiment, the mounting plate 402 is pressed against the first major surface of the vertically extending stud 420 with the rear vertical edge 412 of the mounting plate 402 pressed against the inner surface of the vertical wall 422 of the storage shed and/or aligned with the vertical axis of the stud for aligning the mounting plate 402 on the vertically extending stud 420. Screw fasteners 424A, 424B may be passed through the fastener openings of the mounting plate 402 for securing the tool organizing device 400 to the stud 420. The tool supporting section 404 of the tool organizing device 400 preferably projects inwardly from the stud 420 so that garden tools or items (e.g., hoses) may be hung on the tool supporting recess 406 (FIG. 8A) of the tool organizing device 400.

Figure 10:
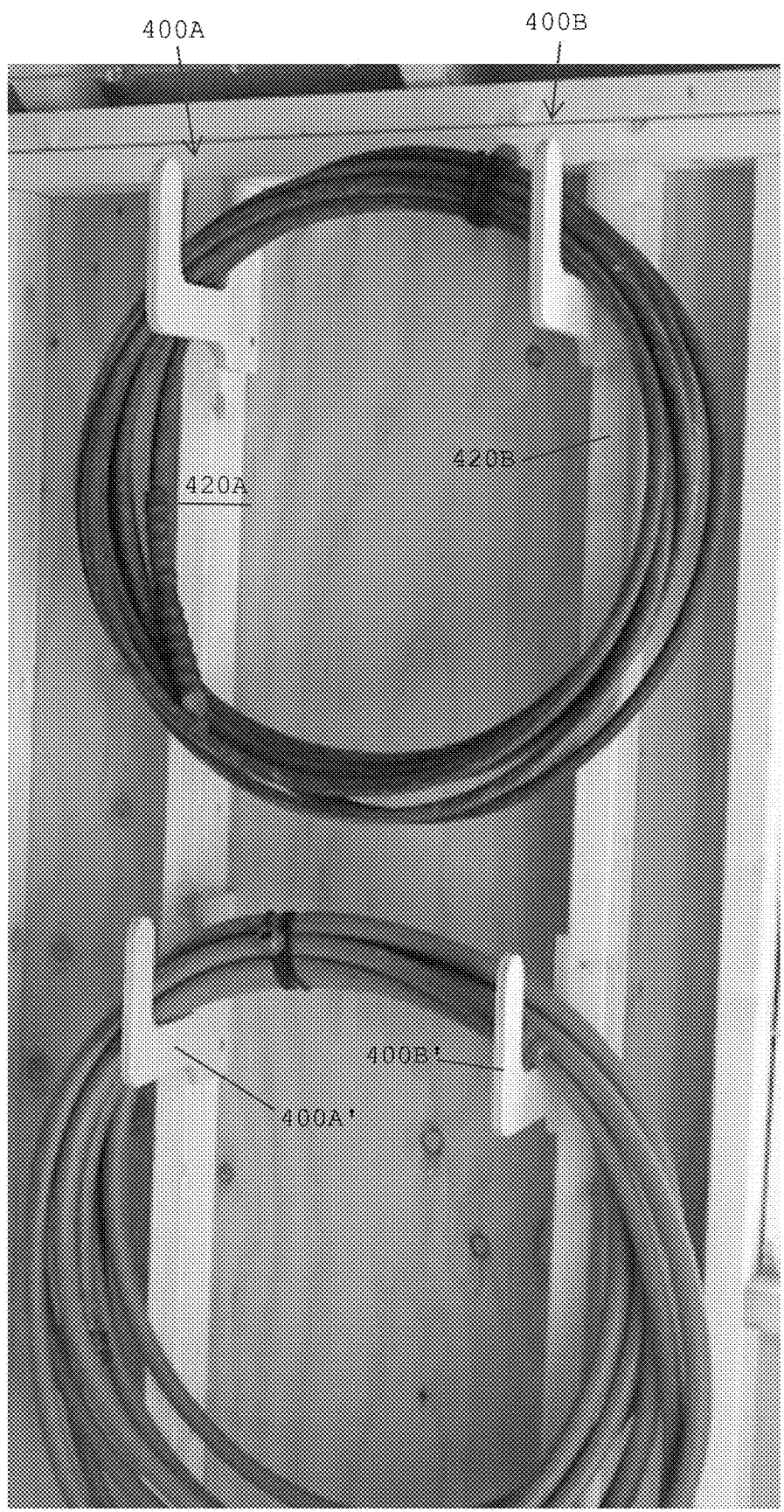
FIG. 10 shows the tool organizing device of FIGS. 8A and 8B being secured to vertical studs of a storage shed for storing hoses inside the storage shed, in accordance with one embodiment of the present patent application.

Referring to FIG. 10, in one embodiment, a first tool organizing device 400A is preferably secured to a major surface of a first stud 420A at an upper end of the first stud 420A. A second tool organizing device 400B is preferably secured to a major surface of a second vertically extending stud 420B. The first and second tool organizing devices 400A, 400B are preferably secured at the same height above the floor of the shed so that the devices are aligned with one another. The pair of first and second tool organizing devices 400A, 400B may be utilized for securing a garden tool such as a hose.

In a similar manner, another pair of tool organizing devices 400A', 400B' may be secured to the respective first and second vertically extending studs 420A, 420B at a height that is closer to the floor of the storage shed. The second pair of tool organizing devices 400A', 400B' may be utilized to hang and store a second hose within the shed.

Figure 11A:
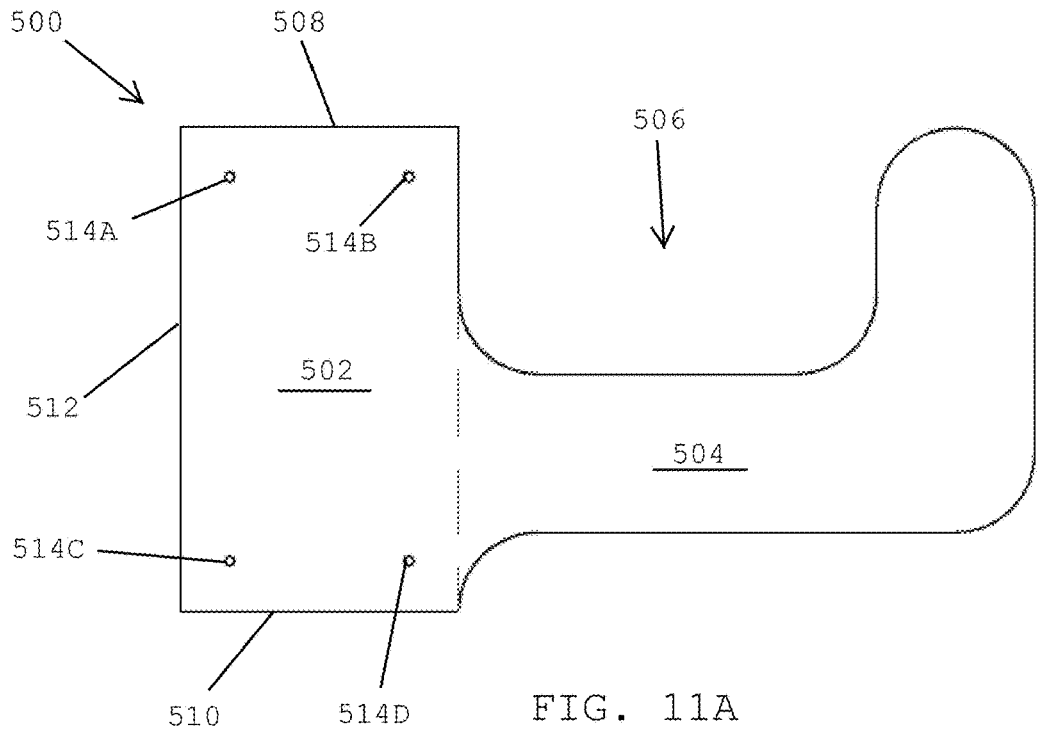
FIGS. 11A and 11B show a side view of a tool organizing device, in accordance with one embodiment of the present patent application.
Figure 11B:
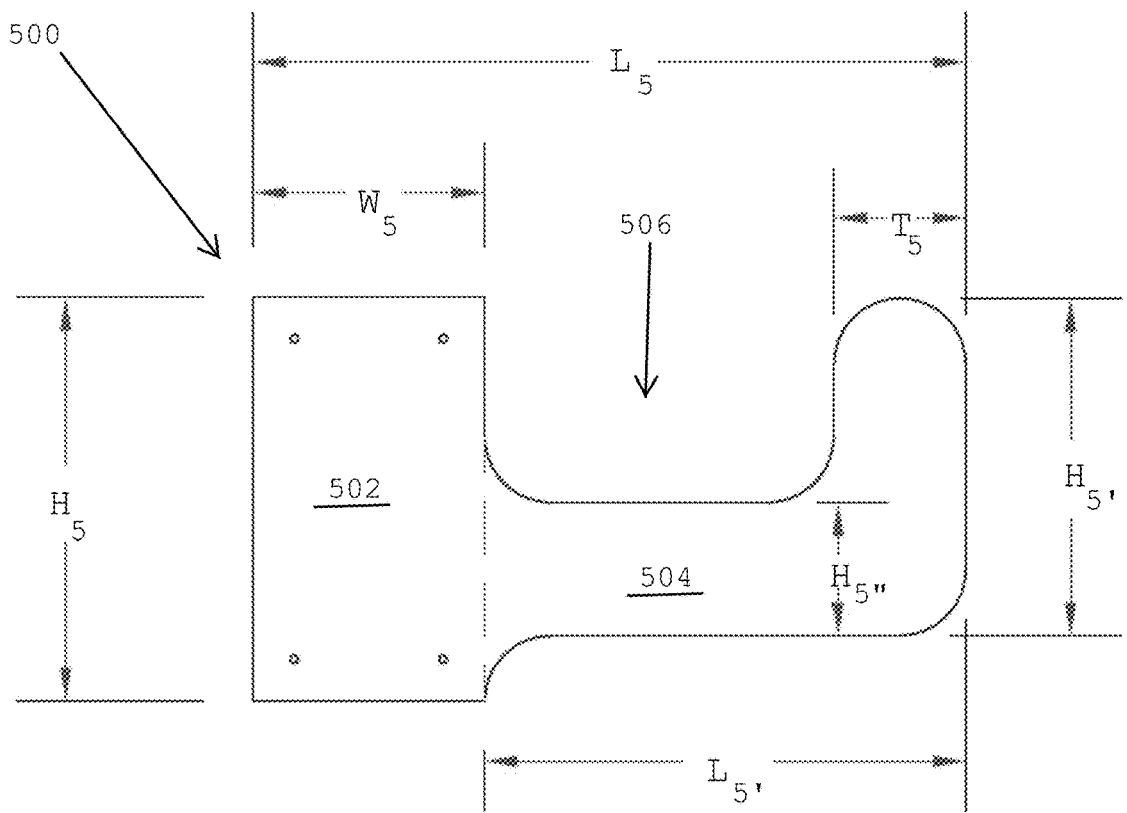

Referring to FIGS. 11A and 11B, in one embodiment, a tool organizing device 500 preferably includes a self-leveling mounting plate 502, a tool supporting section 504 and a tool supporting recess 506 formed in an upper end of the tool supporting section 504. In one embodiment, the self-leveling mounting plate 502 preferably includes a horizontally extending top edge 508, and a horizontally extending bottom edge 510 that is parallel to the top edge 508. In one embodiment, the self-leveling mounting plate 502 preferably includes a rear vertically extending edge 512 that is perpendicular to the top and bottom horizontally extending edges 508, 510. The 90 degree angle between the rear edge 512 and the horizontally extending edges 508, 510 preferably enables an installer to properly align the self-leveling mounting plate 502 onto a face of a vertically extending stud of a storage shed. In one embodiment, the self-leveling mounting plate 502 preferably includes a plurality of fastener openings 514A-514D that are adapted to receive fasteners, such as screws, for securing the mounting plate 502 to a major surface of a stud of a storage shed.

Referring to FIG. 11B, in one embodiment, the tool organizing device 500 preferably has a length $L_5$ of about 10.75 inches. In one embodiment, the self-leveling mounting plate 502 preferably has a height $H_5$ of about 6.0-6.25 inches and a width $W_5$ of about 3.25 inches. In one embodiment, the tool supporting section 504 of the tool organizing device 500 preferably has a length $L_5'$ of about 7.25 inches. The tool supporting section 504 preferably has a vertically extending component having a height $H_5'$ of about 5 inches and a thickness $T_5$ of about 2 inches. The support device 504 has a horizontally extending component that defines a height $H_5''$ of about 2 inches.

Figure 12:
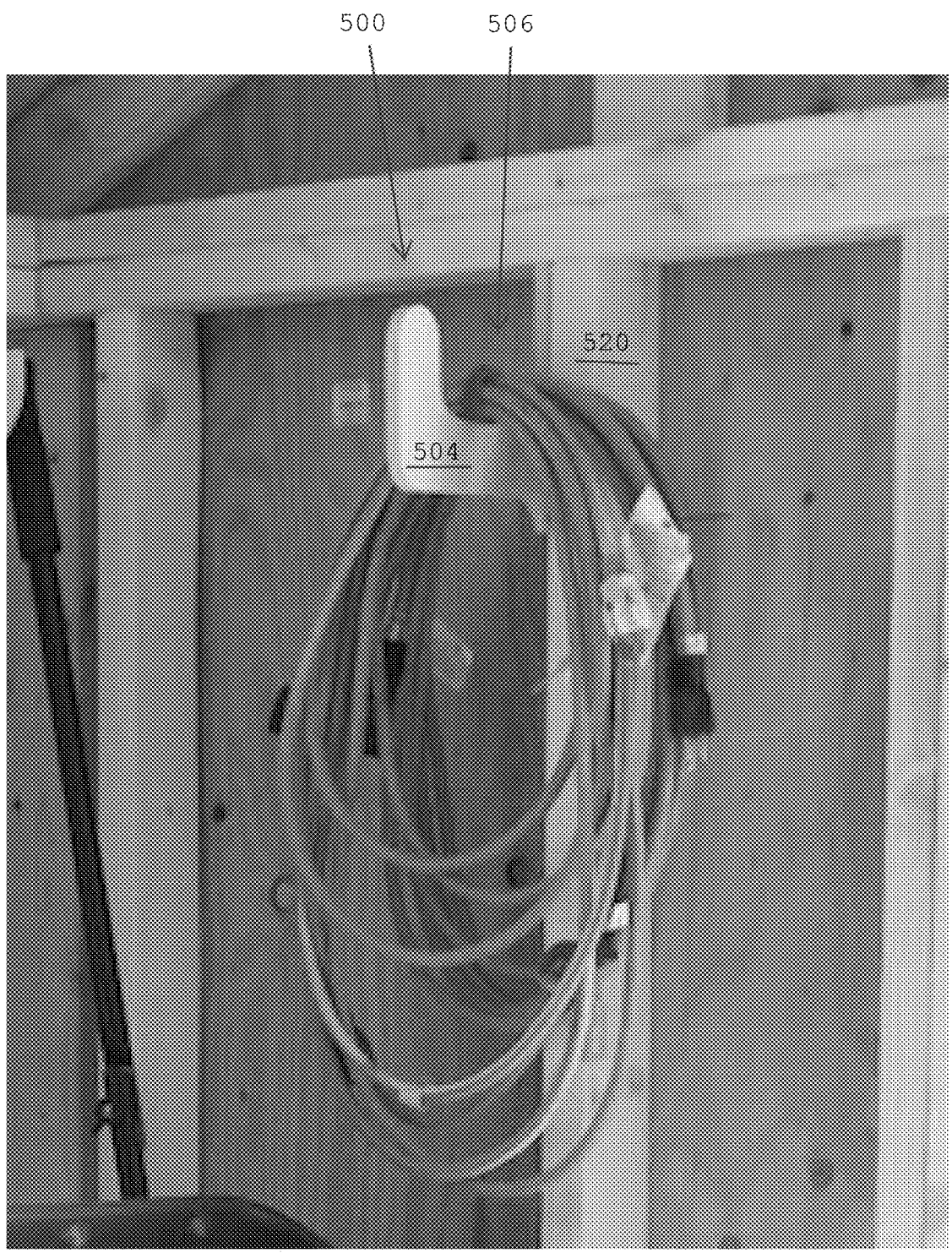
FIG. 12 shows a side view of the tool organizing device of FIGS. 11A and 11B secured to a vertical stud of a storage shed for storing an extension cord, in accordance with one embodiment of the present patent application.

Referring to FIG. 12, in one embodiment, the mounting plate 502 (FIG. 11) of the tool organizing device 500 shown and described above in FIGS. 11A and 11B may be secured to a major surface of a vertically extending stud 520 of a storage shed with the tool supporting section 504 projecting inwardly from the stud 520. The tool supporting recess 506 of the tool organizing device 500 is adapted to store a component such as an extension cord that is wound in a loop.

Figure 13A:
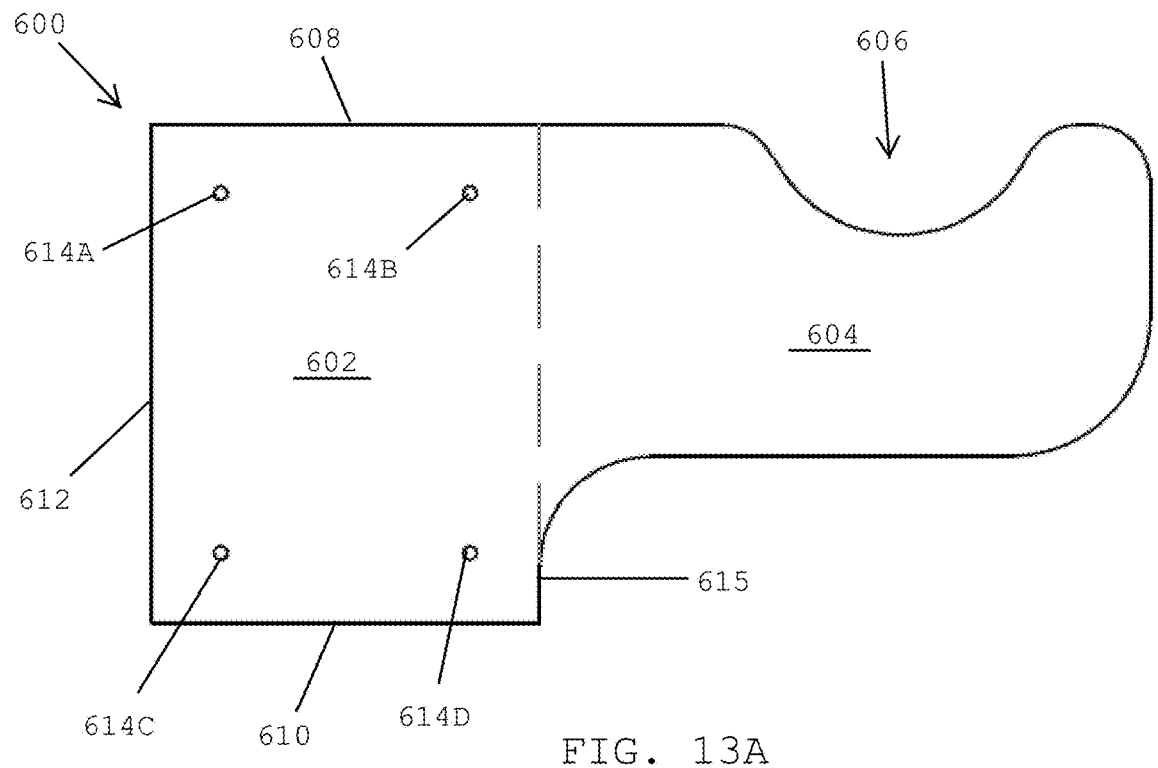
FIGS. 13A and 13B show a side view of a tool organizing device, in accordance with one embodiment of the present patent application.
Figure 13B:
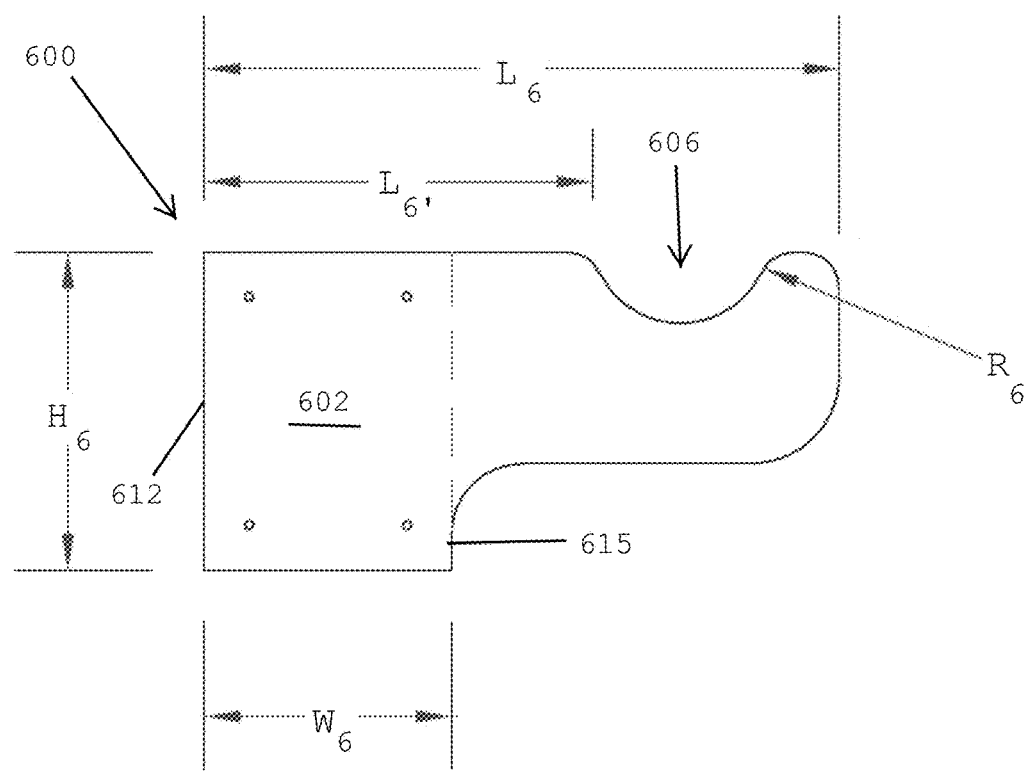

Referring to FIGS. 13A and 13B, in one embodiment, a tool organizing device 600 for storing a garden tool, such as a weed wacker, preferably includes a self-leveling mounting plate 602 and a tool supporting section 604 that projects from a leading edge 615 of the self-leveling mounting plate 602. In one embodiment, the tool organizing device 600 preferably includes a tool supporting recess 606 that is formed at an upper end of the tool supporting section 604.

In one embodiment, the self-leveling mounting plate 602 preferably includes a horizontally extending top edge 608 and a horizontally extending bottom edge 610 that are parallel to one another. In one embodiment, the mounting plate 602 preferably includes a vertically extending rear edge 612 that is perpendicular to the horizontally extending top and bottom edges 608, 610. In one embodiment, the rear edge 612 preferably defines a 90 degree angle with the top and bottom horizontally extending edges 608, 610 which enables the mounting plate 602 to be easily aligned with a vertical axis of a vertical stud of a storage shed. In one embodiment, the tool organizing device 600 preferably includes a plurality of fastener openings 614A-614D that extend through the mounting plate 602. The fastener openings 614A-614D are adapted to receive fasteners, such as screws, for securing the mounting plate 602 to a major face of a vertical stud or a horizontal beam of a storage shed.

Referring to FIG. 13B, in one embodiment, the tool organizing device 600 preferably has a length $L_1$ of about 9 inches. In one embodiment, the self-leveling mounting plate 602 preferably has a height $H_6$ of about 4.50 inches and a width $W_6$ of about 3.5 inches. In one embodiment, the distance between the rear edge of the tool supporting recess 606 and the rear vertical edge 612 of the mounting plate 602 defines a length $L_6'$ of about 5.50 inches. In one embodiment, the tool supporting recess 606 defines a concave curve surface having a radius $R_6$ of about 1.25 inches.

Figure 14A:
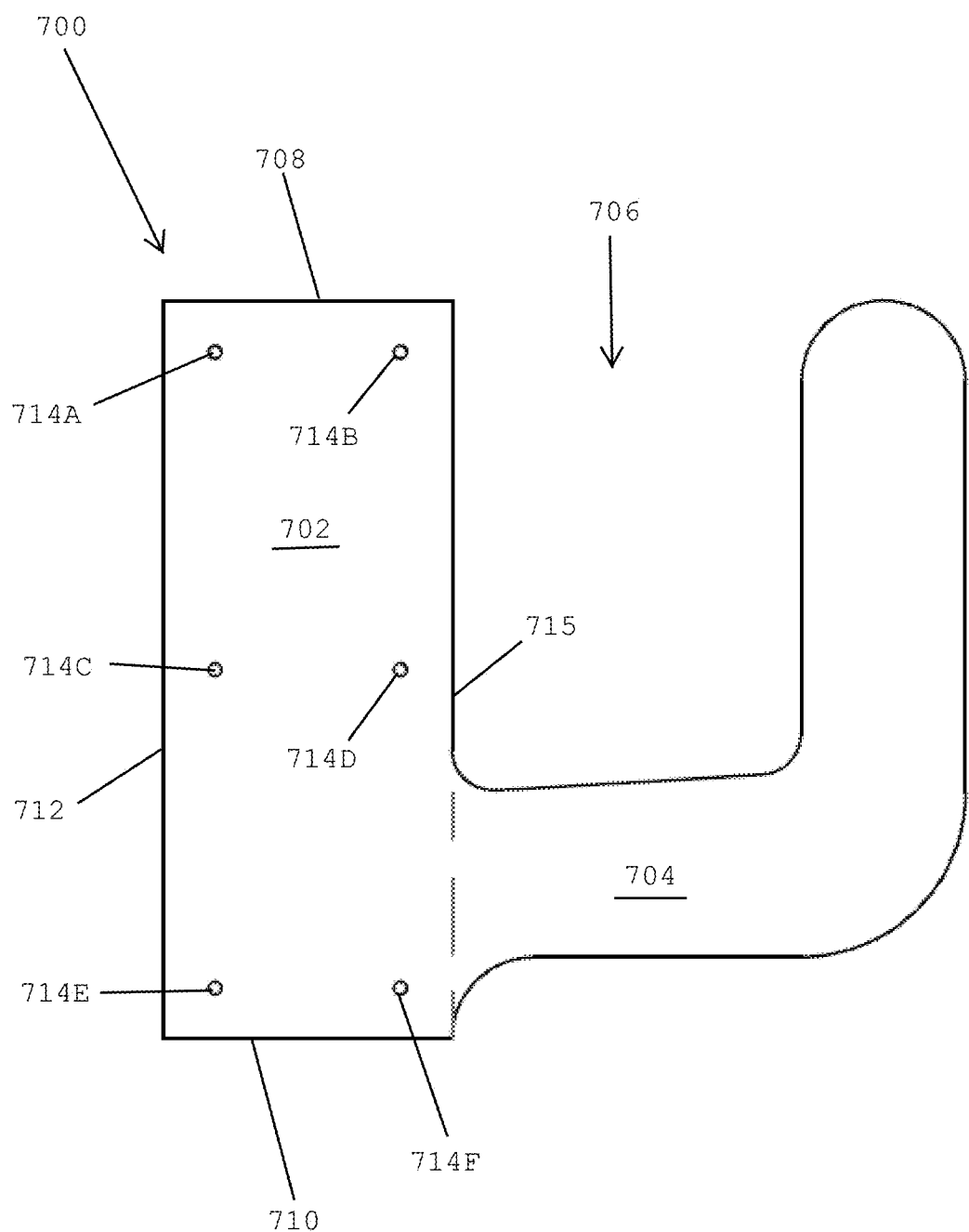
FIGS. 14A and 14B show a side view of a tool organizing device, in accordance with one embodiment of the present patent application.
Figure 14B:
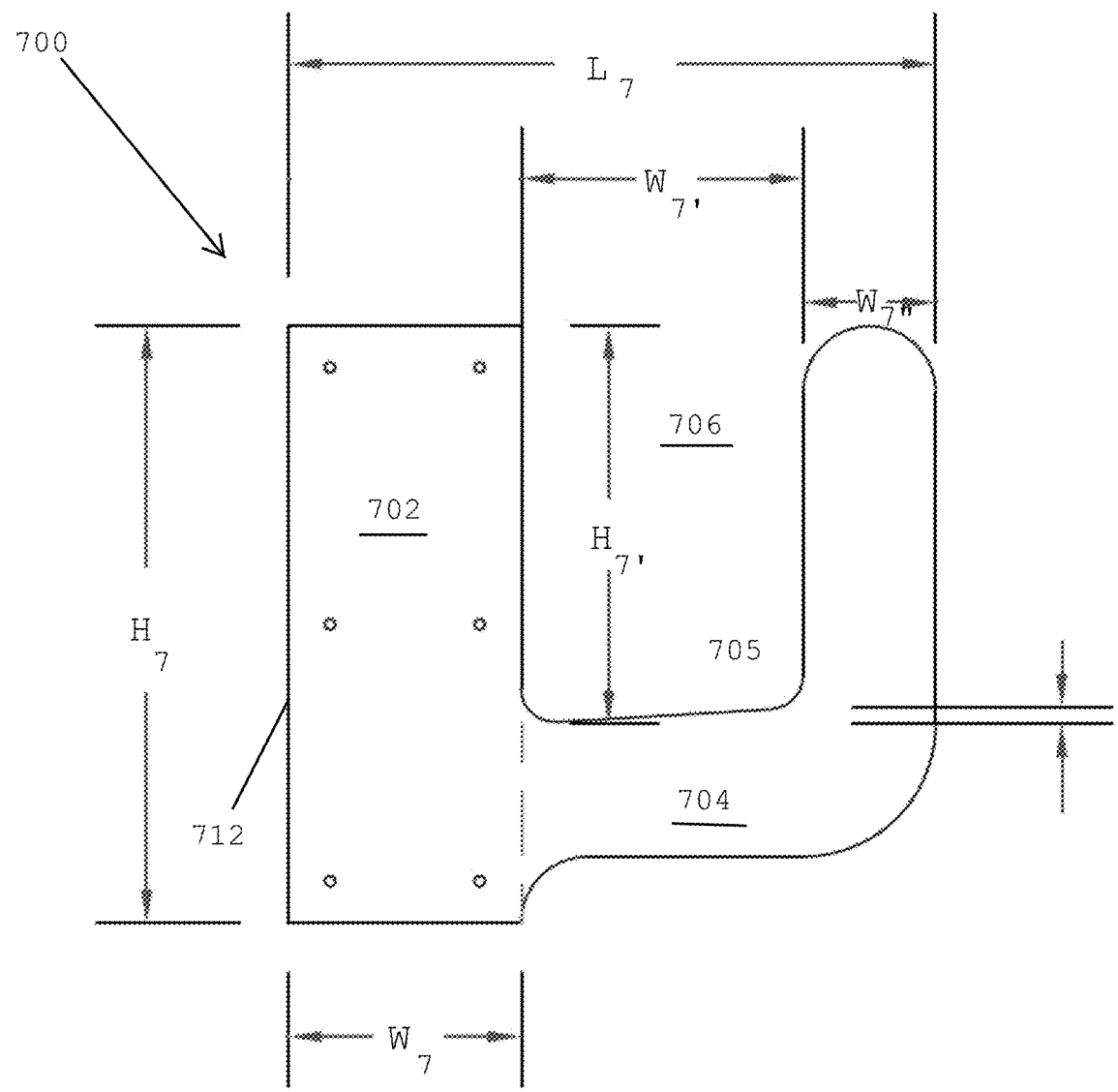

Referring to FIGS. 14A and 14B, in one embodiment, a tool organizing device 700 preferably includes a mounting plate 702 and a tool supporting section 704 that extends from a leading edge 715 of the mounting plate 702. In one embodiment, the upper end of the tool supporting section 704 preferably defines a tool supporting recess 706 that is adapted to receive and store a tool such as a corn hole game board.

In one embodiment, the mounting plate 702 preferably includes a horizontally extending top edge 708 and a horizontally extending bottom edge 710 that are parallel with one another. In one embodiment, the mounting plate 702 preferably includes a vertically extending rear edge 712 that is perpendicular to the top and bottom horizontally extending edges 708, 710 and that defines a 90 degree angle therewith. The 90 degree angle between the vertically extending rear edge 712 and the top and bottom horizontally extending edges 708, 710 preferably facilitates aligning the tool organizing device 700 onto a major surface of a vertically extending stud of a storage shed.

In one embodiment, the tool organizing device 700 preferably includes a plurality of fastener openings 714A-714F, which are spaced from one another on the mounting plate 702 and that are adapted to receive fasteners, such as screws, for securing the mounting plate 702 to a major face of a stud.

Referring to FIG. 14B, in one embodiment, the tool organizing device 700 preferably has a length $L_7$ of about 9.75 inches. The mounting plate 702 preferably has a height $H_7$ of about 9 inches and a width $W_7$ of about 3.25 inches. In one embodiment, the tool supporting recess 706 of the tool organizing device 700 preferably has a height $H_7'$ of about 6 inches and a width $W_7'$ of about 4.25 inches. In one embodiment, the tool supporting section 704 preferably has a vertically extending section having a width $W_7''$ of about 2 inches. In one embodiment, the horizontally extending section of the tool supporting section 704 preferably has a top surface 705 that slopes upwardly toward the vertically extending section of the tool supporting section 704. The sloping surface 705 preferably engages a lower end of a corn hole game board for leaning the game board toward the rear vertically extending edge 712 of the mounting plate 702.

Figure 15:
FIG. 15 shows the tool organizing device of FIGS. 14A and 14B being secured to a vertical stud of a storage shed, in accordance with one embodiment of the present patent application.

Referring to FIG. 15, in one embodiment, a pair of the tool organizing devices 700A, 700B shown and described above in FIGS. 14A and 14B may be secured to first and second studs 720A, 720B of a storage shed. The tool supporting sections 704A, 704B of the respective tool organizing devices 700A, 700B preferably project inwardly from the first and second vertical studs 720A, 720B.

Figure 16:
FIG. 16 shows two of the tool organizing devices shown in FIG. 15 being used for storing a corn hole game board in a vertical configuration inside a storage shed, in accordance with one embodiment of the present patent application.

Referring to FIG. 16, in one embodiment, the pair of tool organizing devices 700A, 700B may be utilized for storing a corn hole game board 755. In one embodiment, the tool supporting recesses 706 (FIG. 14A) of the tool supporting sections 704A, 704B preferably engage and receive the lower end of the corn hole game board 705 for storing the corn hole game board against the first and second studs 720A, 720B of the storage shed.

Figure 17A:
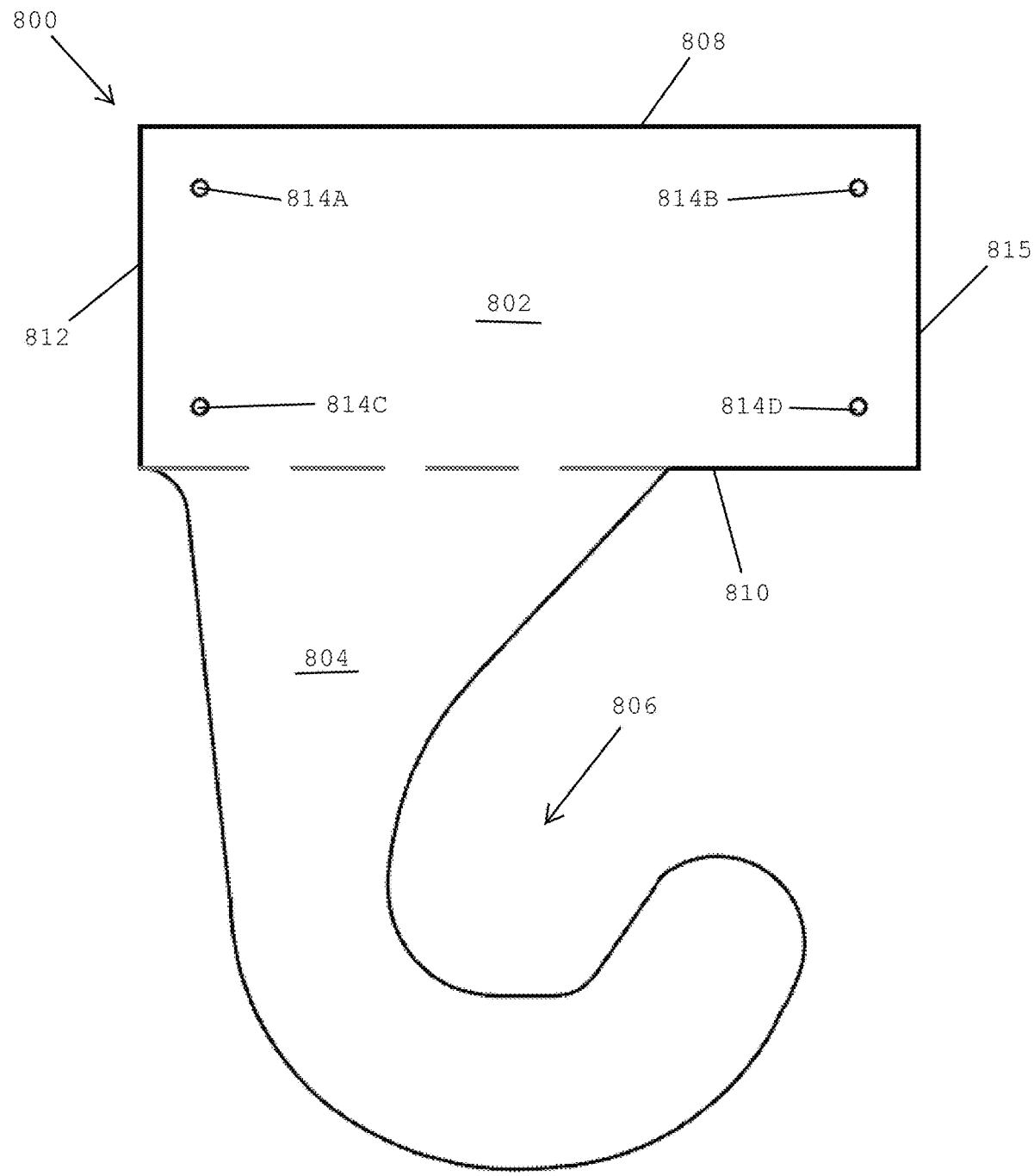
FIGS. 17A and 17B show a side view of a tool organizing device, in accordance with one embodiment of the present patent application.
Figure 17B:
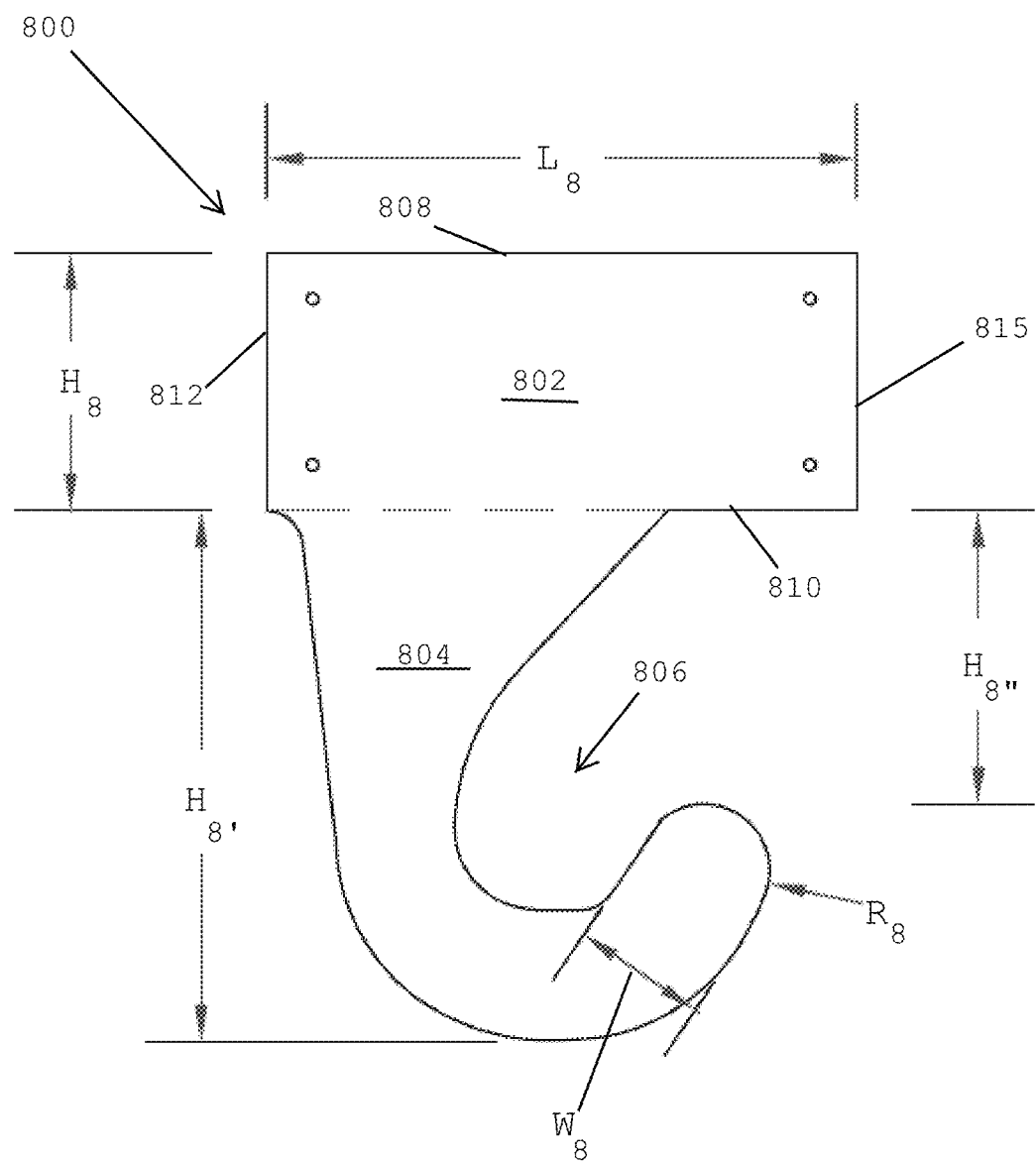

Referring to FIGS. 17A and 17B, in one embodiment, a tool organizing device 800 preferably includes a self-leveling mounting plate 802 and a tool supporting section 804 that extends from a lower edge 810 of the mounting plate 802. In one embodiment, the tool supporting section 804 has the appearance of a hook and includes a tool supporting recess 806 formed therein. In one embodiment, the mounting plate 802 preferably includes a horizontally extending top edge 808 and a horizontally extending bottom edge 810 that is parallel with the horizontally extending top edge. In one embodiment, the mounting plate 802 preferably includes a vertically extending rear edge 812 and a vertically extending front edge 815 that is parallel with the vertically extending rear edge 812, In one embodiment, the rear edge 812 defines a 90 degree angle with the top and bottom horizontally extending edges 808, 810.

In one embodiment, the tool organizing device 800 preferably includes a plurality of fastener openings 814A-814D that extend through the mounting plate 802 and that are adapted to receive fasteners, such as screws, for securing the mounting plate 802 to a stud or beam of a storage shed.

Referring to FIG. 17B, in one embodiment, the tool organizing device 800 preferably includes the mounting plate 802 having a length $L_8$ of about 8 inches and a height $H_8$ of about 3.25 inches. In one embodiment, the tool organizing device 800 preferably includes the tool supporting section having a height $H_8'$ of about 7.25-7.50 inches. The tool supporting section 804 may have the appearance of a hook with the tool supporting recess 806 having an opening defining a height $H_8''$ of about 4.0 inches. The free end of the tool supporting section 804 preferably defines an upwardly extending structure that functions as a storage hook having a width $W_8$ of about 1.75-2.0 inches. In one embodiment, the free end of the tool supporting section 804 has a convexly curved surface defining a radius $R_8$ of about 0.75-1.0 inches.

Referring to FIG. 18, in one embodiment, the tool organizing device 800 may be secured to a horizontally extending beam 820 of a storage shed. In one embodiment, the mounting plate 802 is abutted against a major face of the horizontally extending beam 820 and surgical fasteners 824 may be passed through the fastener openings of the mounting plate 802 for securing the tool organizing device 800 to the horizontally extending beam 820, In one embodiment, the top and bottom edges 808, 810 of the mounting plate 802 may be utilized for aligning the mounting plate 802 with the horizontal axis of the horizontally extending beam 820. In one embodiment, after the mounting plate 802 is secured to the horizontally extending beam 820, the rear edge 812 and the front edge 815 of the mounting plate 802 are preferably extending vertically and parallel with the vertically extending studs of the storage shed. In one embodiment, after the tool organizing device 800 is mounted onto the horizontally extending beam 820, the hook shaped tool supporting section 804 preferably extends below the beam 820 with the opening of the tool supporting recess 806 being adapted to hang an item such as a wheel of a bicycle.

In one embodiment, a second tool organizing device 800B may be secured to the horizontally extending beam 820 adjacent to the first tool organizing device 800. As a result, two or more bicycles may be hung from the horizontally extending beam 820 of the storage shed by utilizing the tool organizing devices 800A, 800B.

Figure 19:
FIG. 19 shows a perspective view of the tool organizing device of FIGS. 17A and 17B being used to hang bicycles in a vertical configuration from an overhead beam of a storage shed, in accordance with one embodiment of the present patent application.

Referring to FIG. 19, in one embodiment, a first tool organizing device 800A is secured to a horizontally extending beam 820 and a second tool organizing device 800B is also secured to the beam 820. In one embodiment, a wheel of a first bicycle may be placed into the tool supporting recess of the tool supporting section 804A of the first tool organizing device 800A and a wheel of a second bicycle may be placed within the tool supporting recess of the tool supporting section 8048 of the second tool organizing device 800B. As a result, a pair of bicycles may be hung side-by-side and in a vertical configuration using the tool organizing devices 800A, 800B shown and described above in FIGS. 17A-19.

Figure 20:
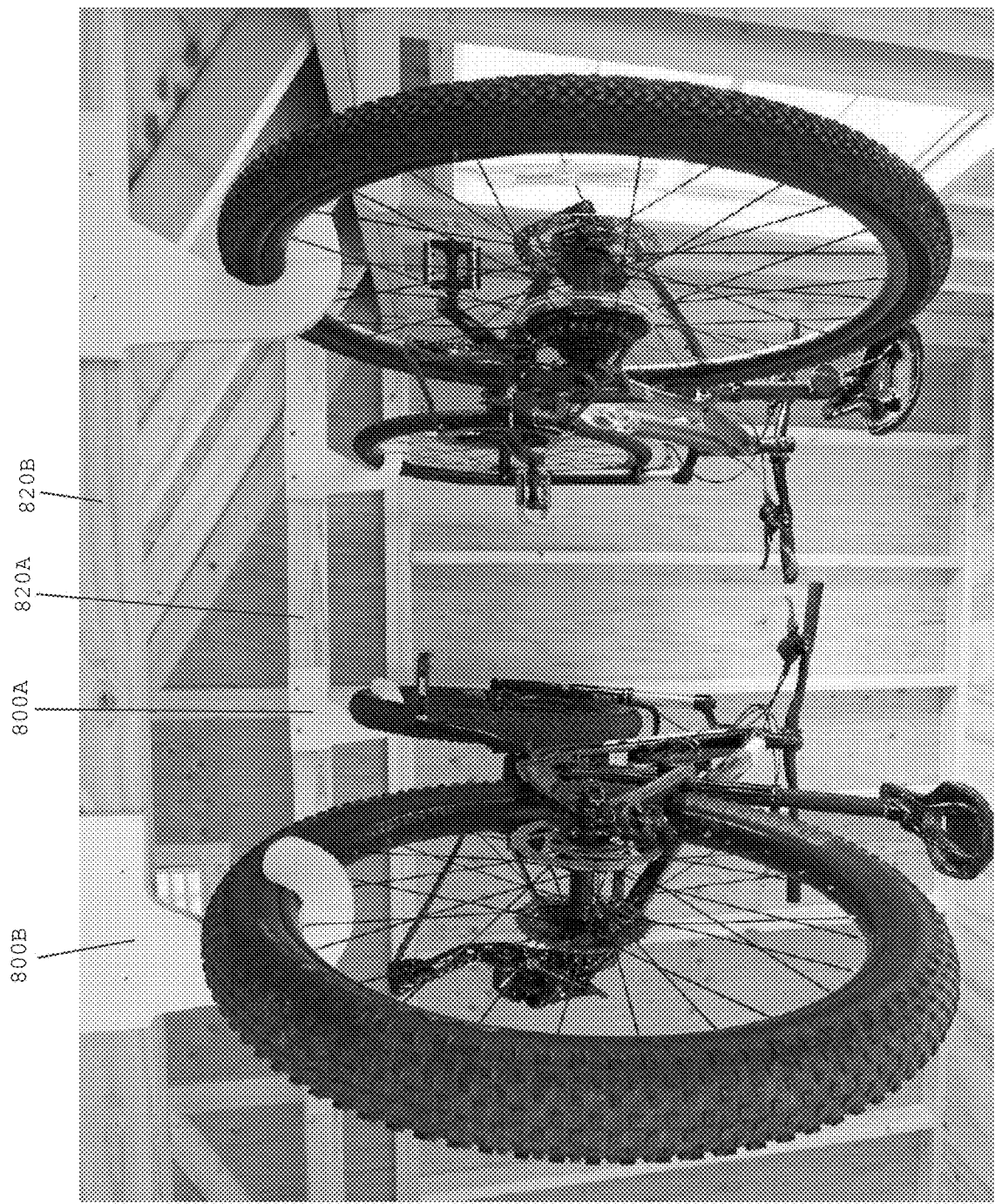
FIG. 20 shows a plurality of the tool organizing devices of FIGS. 17A-17B being utilized to store bicycles in a horizontal configuration, in accordance with one embodiment of the present patent application.

Referring to FIG. 20, in one embodiment, bicycles may be hung in a horizontal configuration by securing a first tool organizing device 800A to a first horizontally extending beam 820A and a second tool organizing device 800B to a second horizontally extending beam 820B. The first wheel of the bicycle is hung onto the tool supporting section of the first tool organizing device 800A and the second wheel of the bicycle is hung onto the tool supporting section of the second tool organizing device 800B.

Figure 21A:
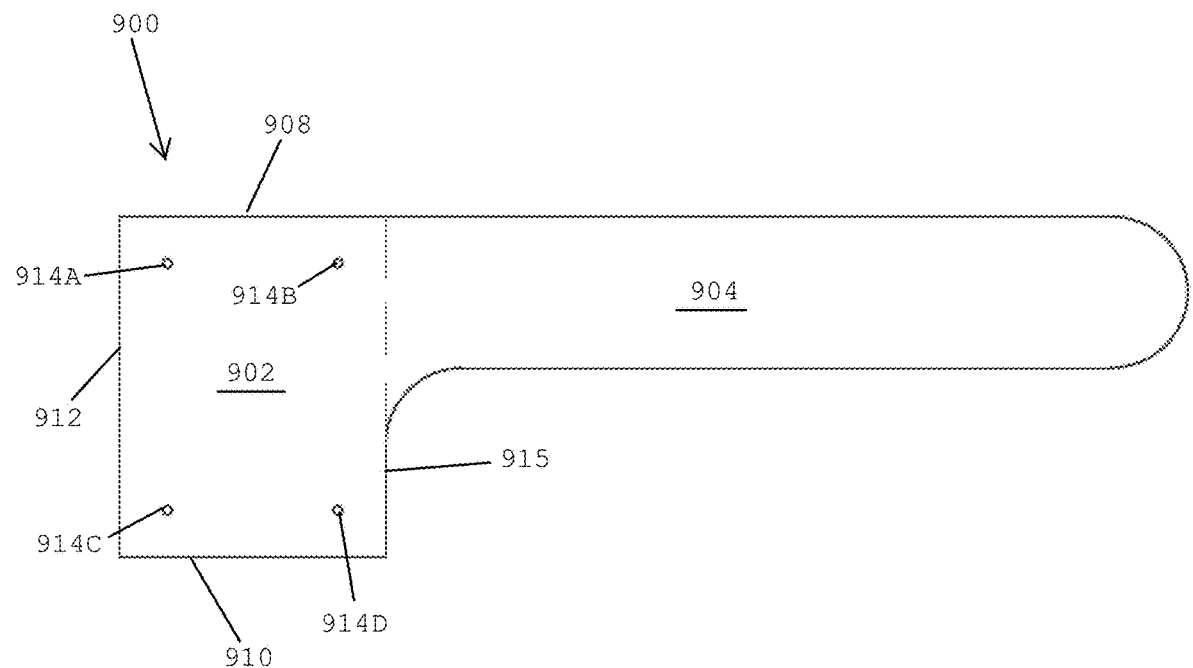
FIGS. 21A and 21B show a side view of a tool organizing device, in accordance with one embodiment of the present patent application.

Referring to FIGS. 21A and 218, in one embodiment, a tool organizing device 900 may be used to store a tool, or may be used to support a shelf. In one embodiment, the tool organizing device 900 preferably includes a self-leveling mounting plate 902 and a tool supporting section 904 that projects from a front vertical edge 915 of the mounting plate 902. In one embodiment, the mounting plate 902 includes a horizontally extending top edge 908 and a horizontally extending bottom edge 910 that is parallel with the horizontally extending top edge 908. In one embodiment, the mounting plate 902 preferably includes a vertically extending rear edge 912 that is parallel with the vertically extending front edge 915 of the mounting plate 902, In one embodiment, the vertically extending rear edge 912 is perpendicular to the top and bottom horizontal edges 908, 910 of the mounting plate 902. In one embodiment, the 90 degree angle between the rear edge 912 and the top and bottom edges 908, 910 preferably enables the mounting plate 902 to be easily aligned with an edge of a stud or a beam of a storage shed.

In one embodiment, the tool organizing device 900 preferably includes a plurality of fastener openings 914A-914D that are adapted to receive fasteners, such as screws, for securing the mounting plate 902 to a major surface of a stud or a beam of a storage shed.

Figure 21B:
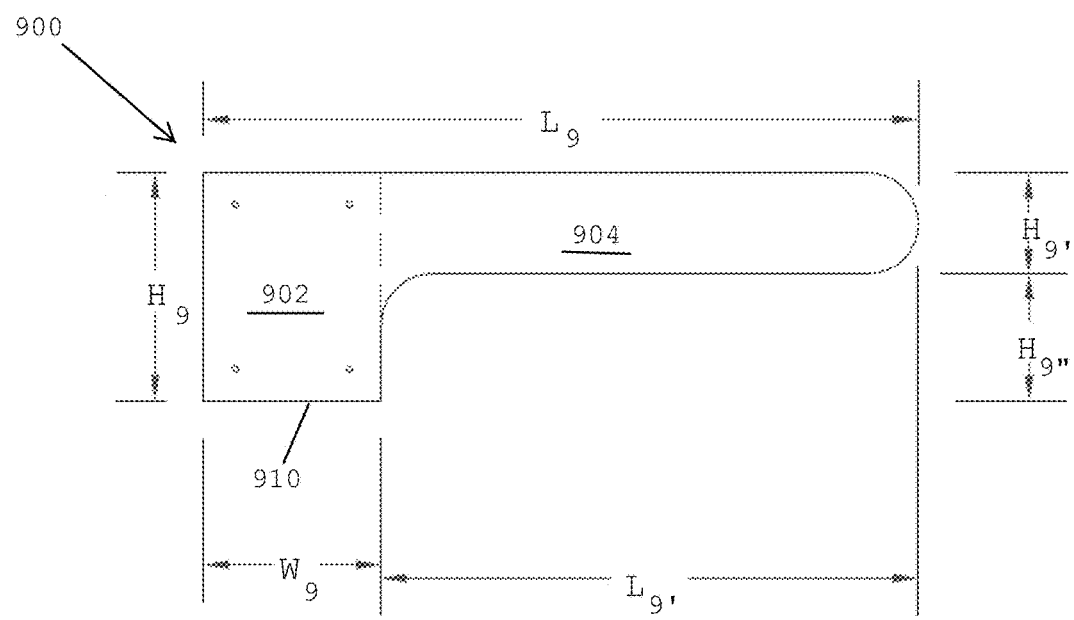

Referring to FIG. 21B, in one embodiment, the tool organizing device 900 preferably has a length $L_9$ of about 12-16 inches and more preferably about 14 inches. In one embodiment, the mounting plate 902 preferably has a height $H_9$ of about 4.25 inches and a width $W_9$ of about 3.25 inches. In one embodiment, the tool supporting section 904 preferably has a length $L_9'$ of about 10-11 inches and more preferably about 10.25 inches. In one embodiment, the tool supporting section 904 defines a height $H_9'$ of about 2 inches. In one embodiment, the distance between the lower edge of the tool supporting section 904 and the lower edge 310 of the mounting plate 902 preferably defines a height $H_9''$ of about 2.50 inches.

Figure 22:
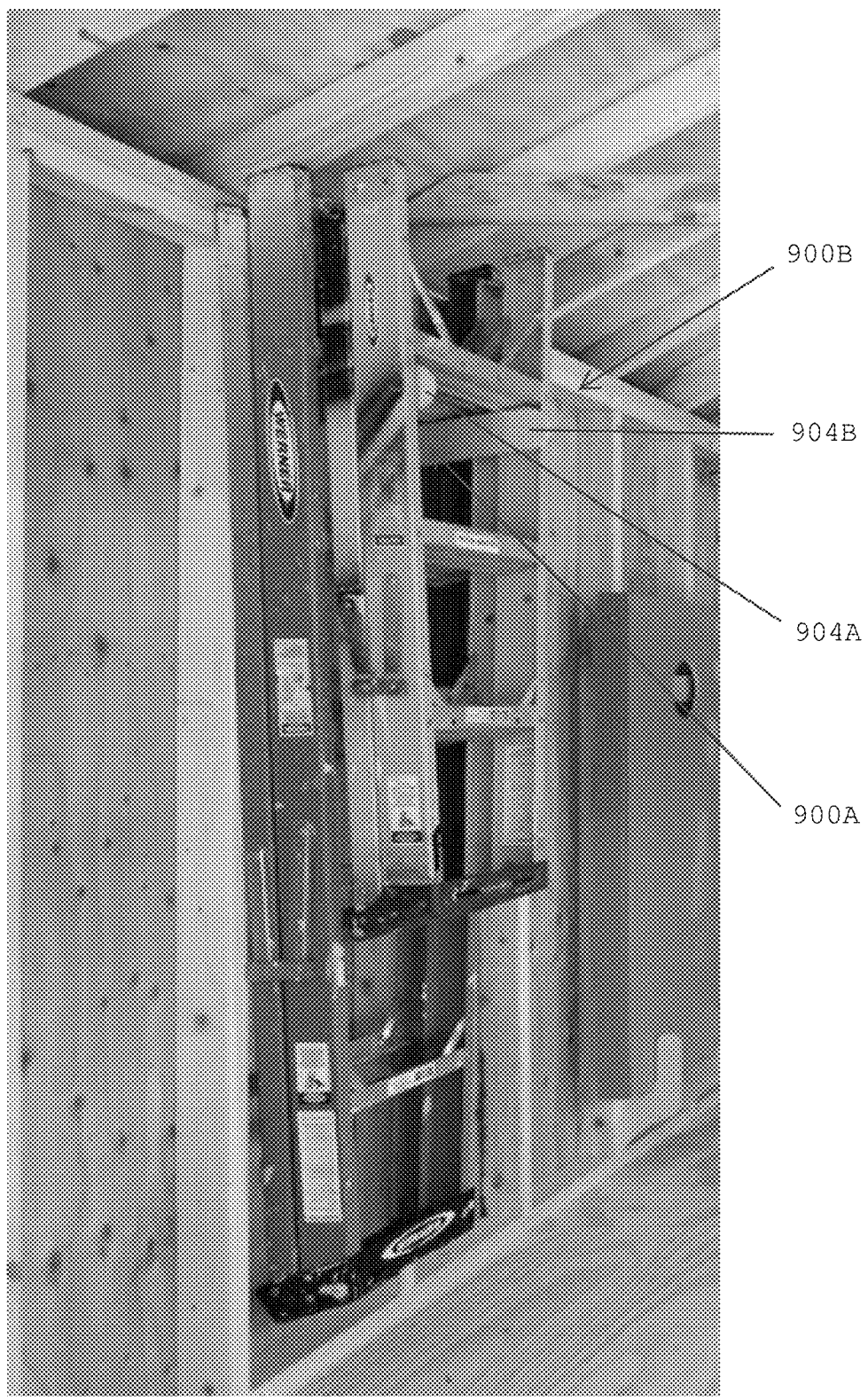
FIG. 22 shows the tool organizing device of FIGS. 21A and 21B after being secured to a vertical stud of a storage shed and being configured to store ladders in a storage shed, in accordance with one embodiment of the present patent application.

Referring to FIG. 22, in one embodiment, a pair of the tool organizing devices 900A, 900B shown and described above in FIGS. 21A, 21B may be secured to adjacent vertically extending studs of a storage shed. The respective tool supporting sections 904A, 904B of the first and second tool organizing devices 900A, 900B desirably project inwardly from the vertically extending studs for supporting items such as ladders.

Figure 23A:
FIGS. 23A and 23B show a top plan view of a shelf of a tool organizing system, in accordance with one embodiment of the present patent application.
Figure 23B:
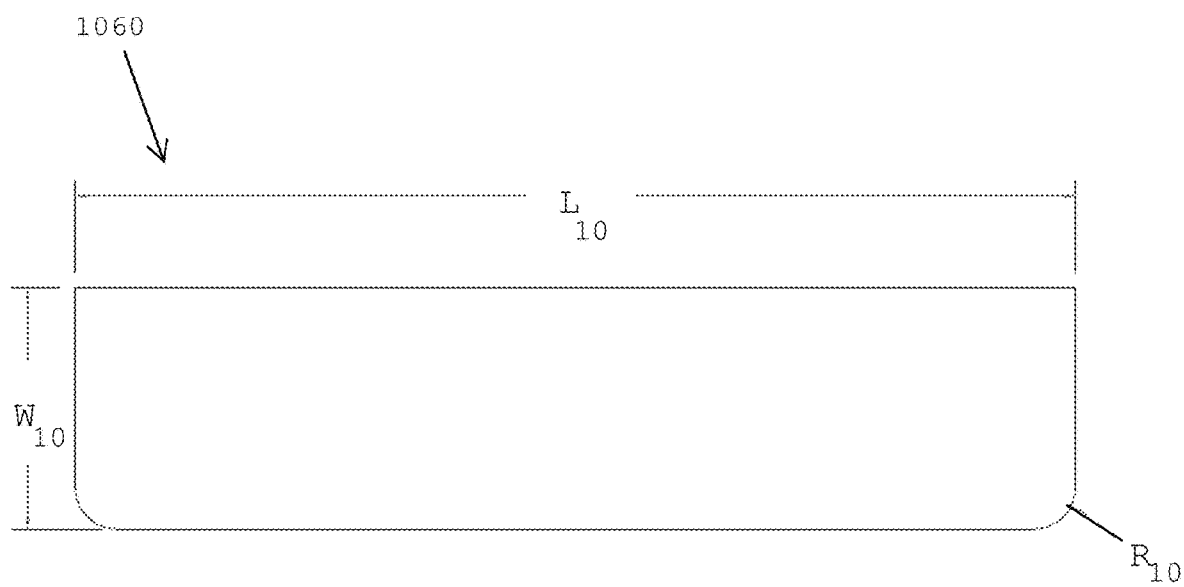

Referring to FIGS. 23A and 23B, in one embodiment, a tool organizing system may include a storage shelf 1060 that is adapted to be mounted atop the tool organizing devices 900 shown and described above in FIGS. 21A and 21B. In one embodiment, the storage shelf 1060 preferably has a length $L_{10}$ of about 46-52 inches and more preferably about 47.25 inches, and a width $W_{10}$ of about 10-12 inches and more preferably about 11.25 inches. In one embodiment, the leading corner edge of the shelf 1060 preferably defines a radius Rio of about 2 inches.

Figure 24A:
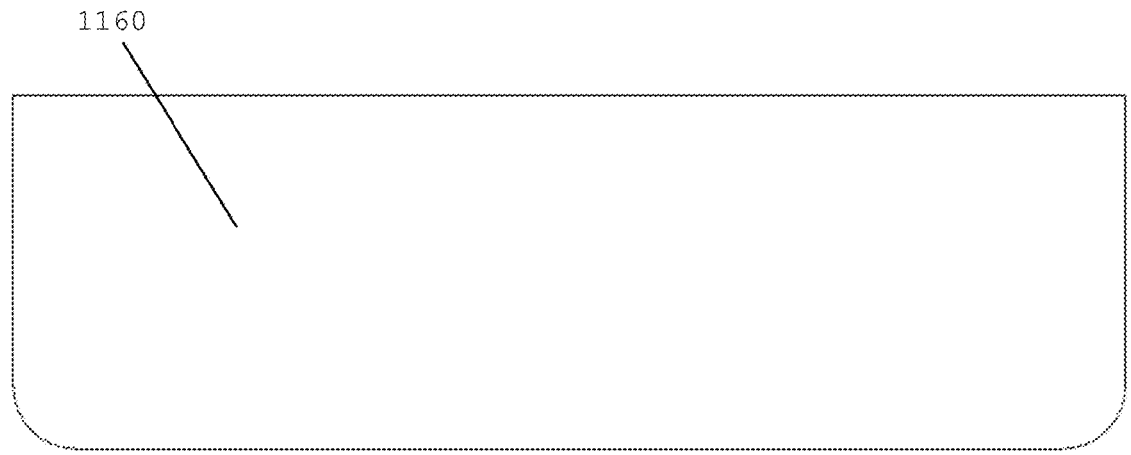
FIGS. 24A and 24B show a top plan view of a shelf of a tool organizing system, in accordance with one embodiment of the present patent application.
Figure 24B:
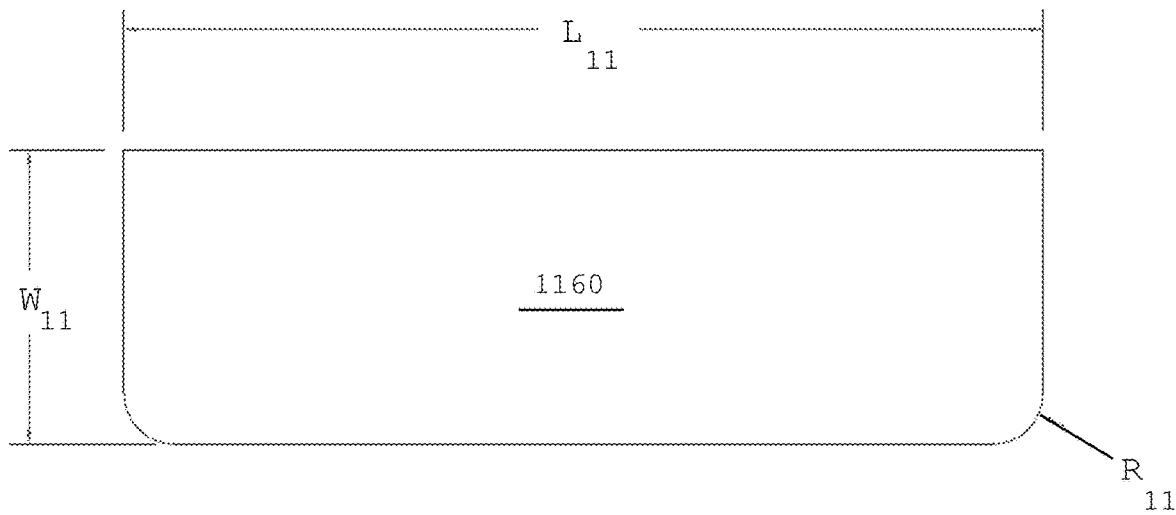

Referring to FIGS. 24A and 24B, in one embodiment, a tool organizing system may include a second shelf 1160 that is adapted to be positioned atop the tool organizing device 900 shown and described above in FIGS. 21A and 21B, In one embodiment, the second shelf 1160 preferably has a length $L_{11}$ of about 36 inches and a width $W_{11}$ of about 11-12 inches and more preferably about 11.25 inches. In one embodiment, a leading front corner of the shelf 1160 has a convexly curved surface having a radius Ru of about two (2.0) inches.

Figure 25A:
FIG. 25A shows an assembly of the tool organizing device of FIGS. 21A and 21B and the shelf of FIGS. 24A and 24B for storing items within a storage shed, in accordance with one embodiment of the present patent application.
Figure 25B:
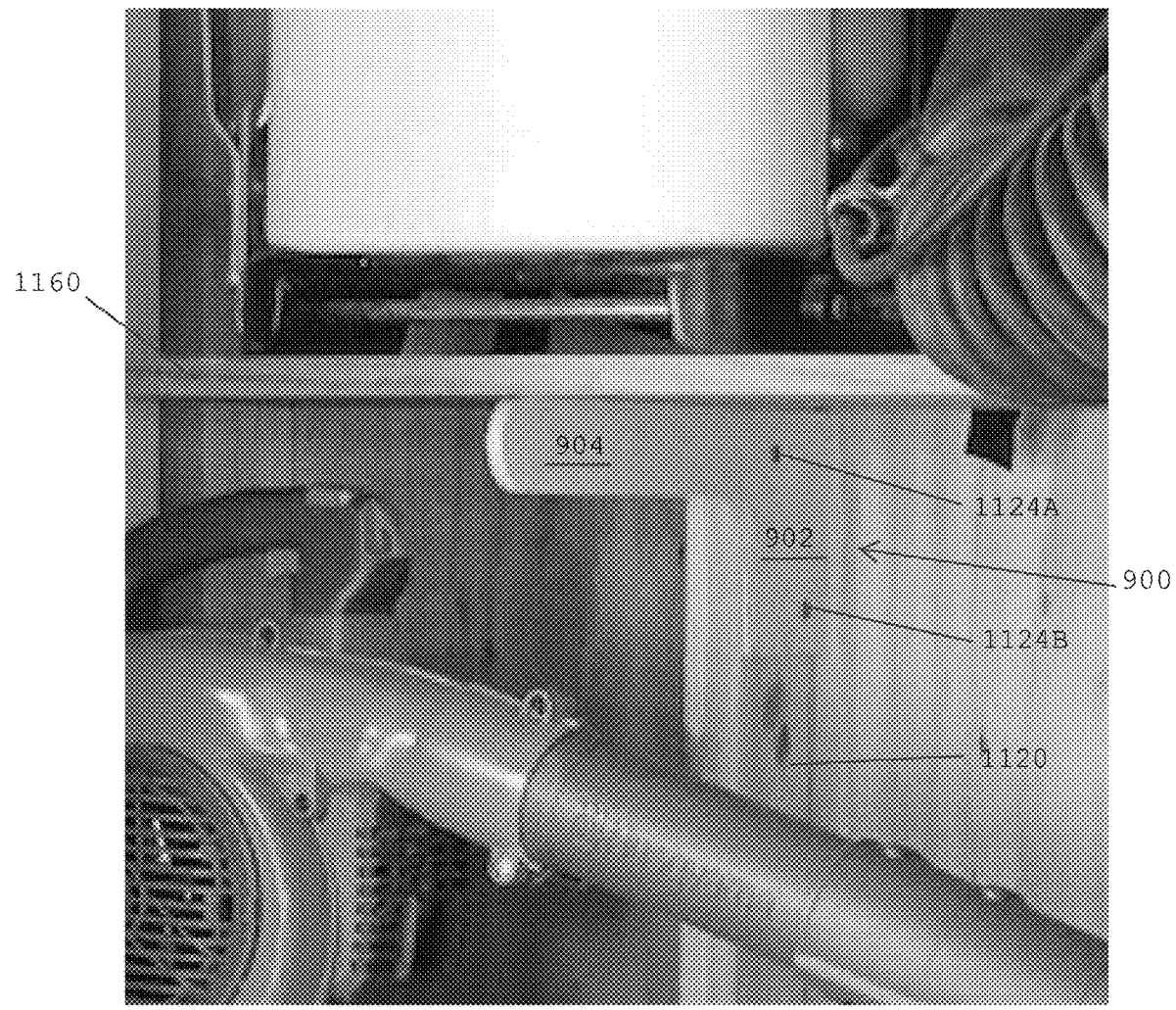
FIG. 25B shows a magnified view of one of the tool organizing devices and one of the shelves shown in FIG. 25A.

Referring to FIGS. 25A and 25B, in one embodiment, a plurality of the tool organizing devices 900 shown and described above in FIGS. 21A and 21B may be secured to adjacent vertically extending studs 1120 of a storage shed. The shelves 1060, 1160 shown and described above in FIGS. 23A-23B and 24A-24B may be positioned atop the tool supporting section 904 of the tool organizing device 900.

A plurality of the tool organizing device 900 may be secured to adjacent vertically extending studs 1120 so that a series of shelves 1160 may be secured onto the vertically extending studs 1120 of the storage shed.

FIG. 25B shows a magnified view of a tool organizing device 900 secured to a vertically extending stud 1120 of a storage shed. The self-leveling mounting plate 902 is preferably abutted against a major face of the vertically extending stud 1120 and secured to the stud using fasteners 1124A, 1124B. The edges of the mounting plate 902 are preferably utilized to self-level the tool organizing device 900 relative to the vertical axis of the stud 1120, The tool supporting section 904 preferably projects inwardly from the mounting plate 902. The shelf 1160 is preferably positioned on an upper surface of the tool supporting section 904 for supporting the shelf 1160 in a horizontal configuration for storing items on a top surface of the shelf 1160.

Figure 26A:
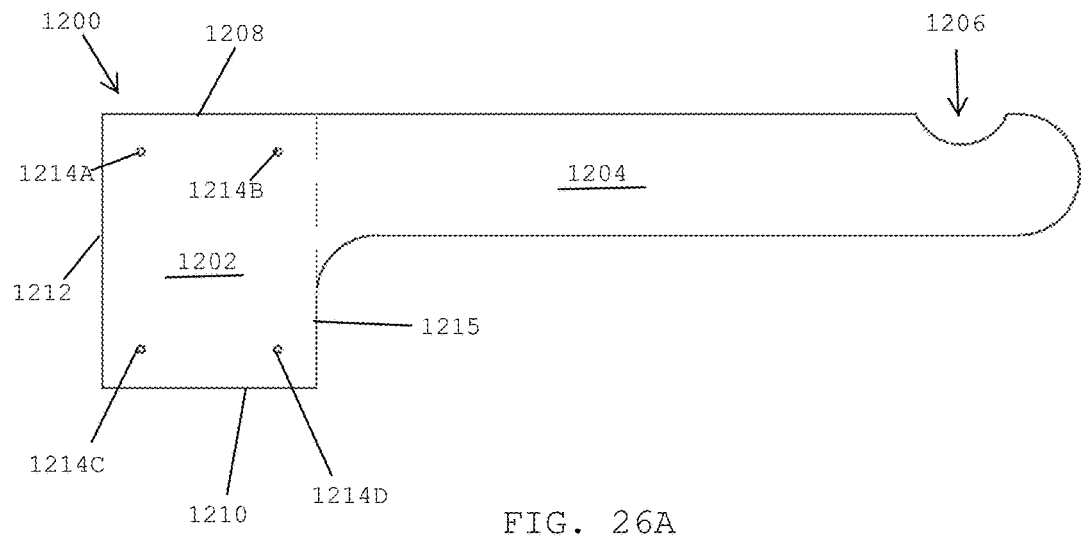
FIGS. 26A and 26B show a side view of a tool organizing device, in accordance with one embodiment of the present patent application.
Figure 26B:
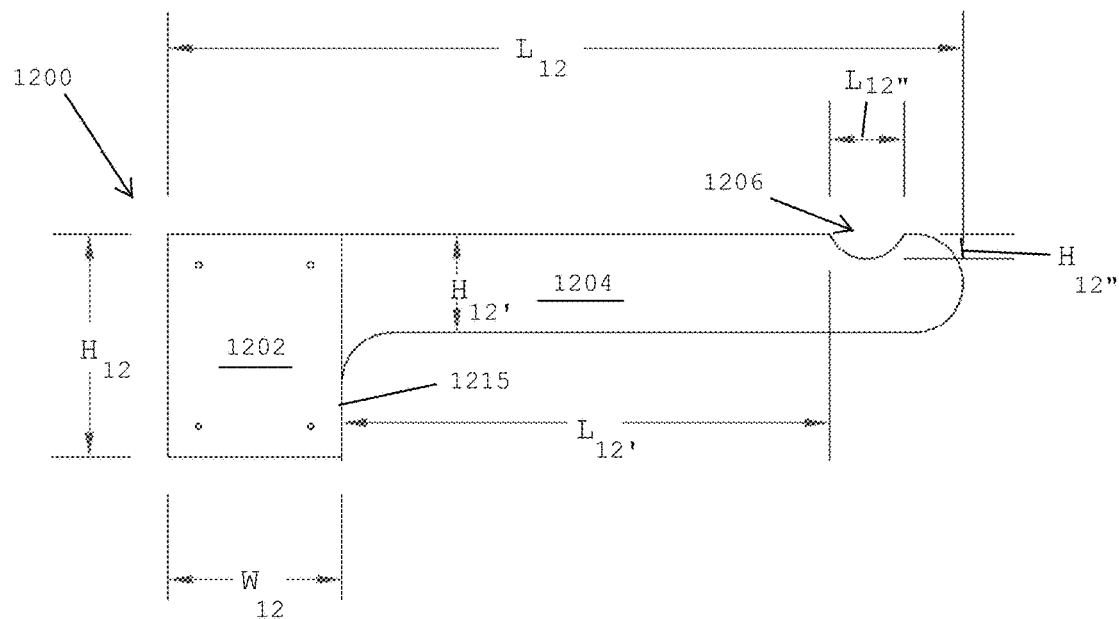

Referring to FIGS. 26A and 26B, in one embodiment, a tool organizing device 1200 preferably includes a self-leveling mounting plate 1202 and a tool supporting section 1204 that projects from a front vertical edge 1215 of the self-leveling mounting plate 1202, In one embodiment, an upper surface of the tool supporting section 1204 preferably includes a tool supporting recess 1206, which may define a concave curve surface adapted to seat an item such as a lawn chair. In one embodiment, the self-leveling mounting plate 1202 preferably includes horizontally extending top and bottom edges 1208, 1210 and vertically extending rear and front edges 1212, 1215. In one embodiment, the vertically extending rear edge 1212 is preferably perpendicular to the top and bottom horizontally extending edges 1208, 1210 for defining a 90 degree angle therewith. The 90 degree angle preferably enables the mounting plate 1202 to be properly aligned with a vertical axis of a vertically extending stud or a horizontal axis of a horizontally extending beam of a storage shed. In one embodiment, the tool organizing device 1200 preferably includes a plurality of fastener openings 1214A-1214D that are adaptive receive fasteners (e.g., screws) for securing the mounting plate 1202 to a major surface or face of a stud or beam of a storage shed.

Referring to FIG. 26B, in one embodiment, the tool organizing device 1200 preferably has a length $L_{12}$ of about 14-18 inches and more preferably about 16 inches. In one embodiment, the self-leveling mounting plate 1202 preferably has a height $H_{12}$ of about 4.25 inches and a width $W_{12}$ of about 3.25 inches. In one embodiment, the distance between the commencement of the tool supporting recess 1206 and the front vertical edge 1215 of the mounting plate 1202 preferably defines a length $L_{12}'$ of about 9.50-10 inches. In one embodiment, the tool supporting section 1204 preferably has a height $H_{12}'$ of about 2 inches. In one embodiment, the tools supporting recess 1206 preferably defines a length $L_{12}''$ of about 1.50 inches and a depth $H_{12}''$ of about 0.50 inches.

Figure 27:
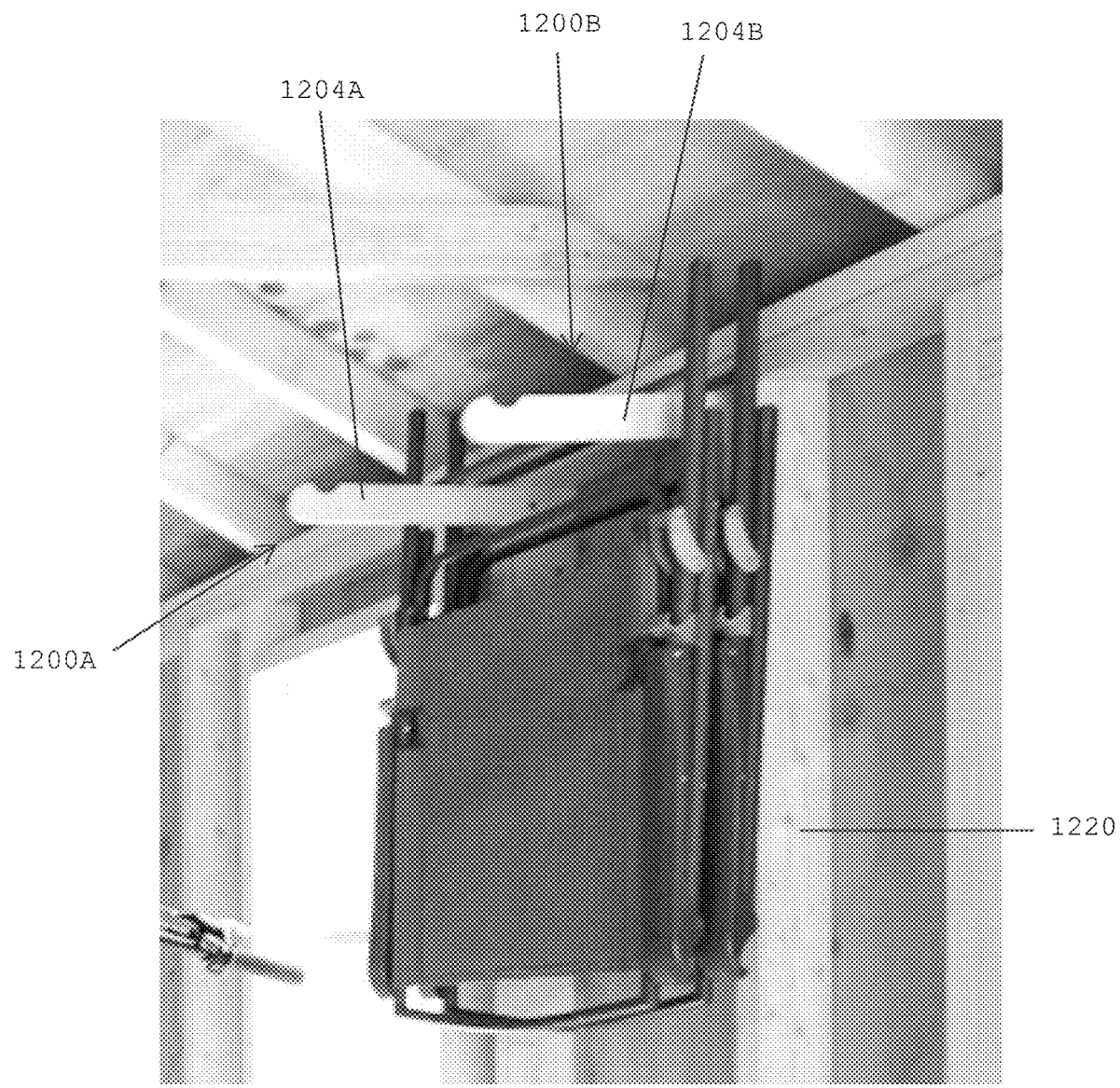
FIG. 27 shows a pair of the tool organizing devices of FIGS. 26A and 26B being secured to vertical studs for storing chairs within a storage shed, in accordance with one embodiment of the present patent application.

Referring to FIG. 27, in one embodiment, the tool organizing device 1200 shown and described in FIGS. 26A and 26B may be mounted to adjacent studs 1220 of a storage shed. In one embodiment, a pair of the tool organizing devices 1200 are mounted side by side on adjacent vertically extending studs. The tool supporting sections 1204A, 1204B of the respective tool organizing devices 1200A, 1200B project inwardly from the studs and are adapted to store and/or hang items such as a lawn chair.

Figure 28A:
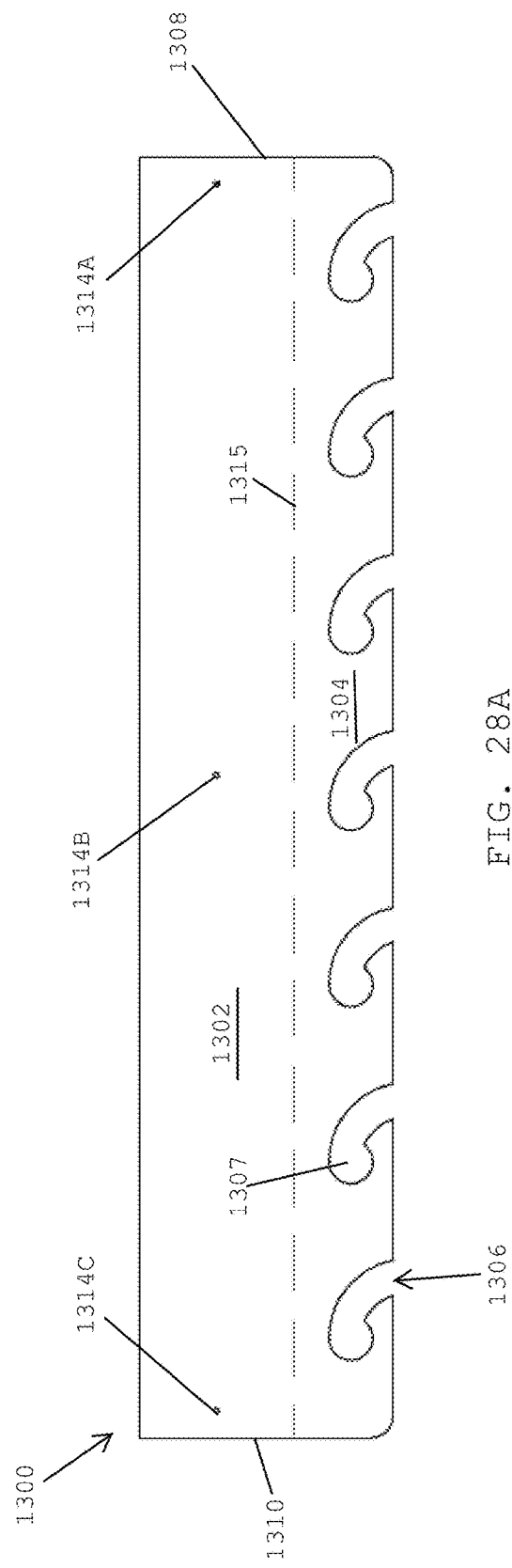
FIGS. 28A and 28B show a rod support plate of a fishing rod organizing system, in accordance with one embodiment of the present patent application.
Figure 28B:
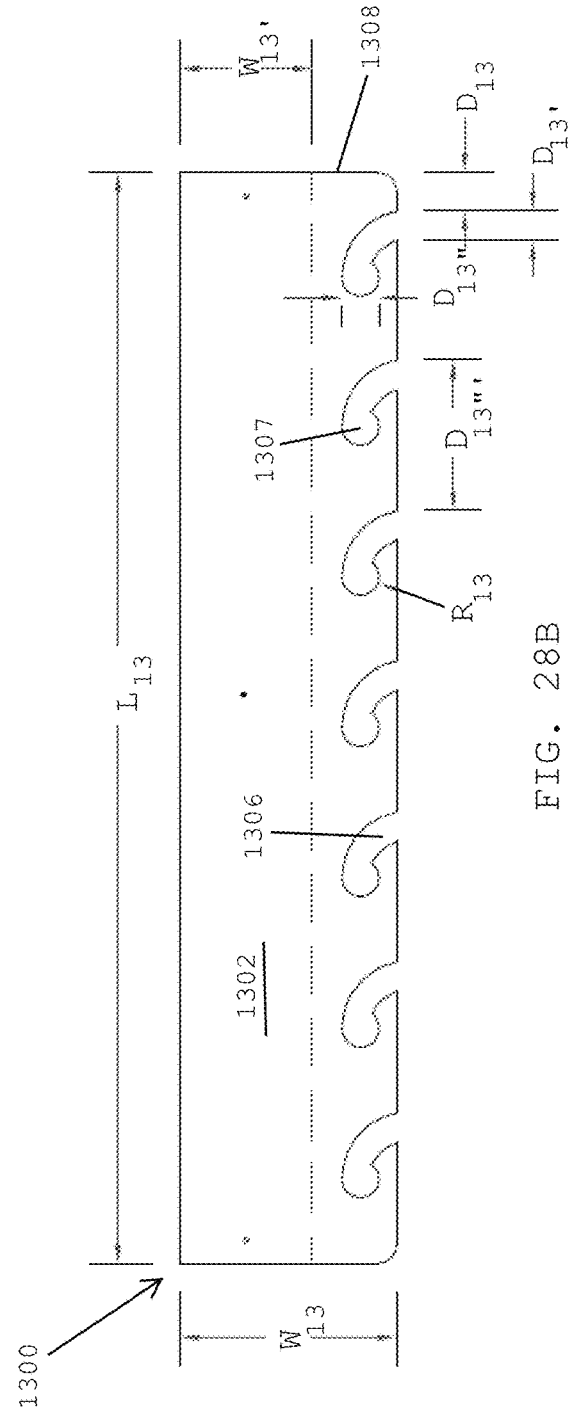

Referring to FIGS. 28A and 28B, in one embodiment a tool organizing device 1300 provides a first half of a fishing rod organizer that is adapted to secure the rod sections of fishing rods. In one embodiment, the tool organizing device 1300 preferably includes a self-leveling mounting plate 1302 and a tool supporting section 1304 having a series of tool supporting recesses 1306 formed therein that are adapted to receive the rods of fishing rods. In one embodiment, the mounting plate 1302 preferably includes an upper edge 1308 and a lower edge 1310 that is parallel with the upper edge. In one embodiment, the mounting plate 1302 preferably includes a rear edge 1312 that extends along an axis that is perpendicular with the upper and lower edges 1308, 1310.

In one embodiment, the tool supporting section 1304 that has the tool supporting recesses 1306 extends along the front edge 1315 of the mounting plate 1302. The tool supporting recesses 1306 preferably have closed bulbous regions 1307 that are adapted to receive and seat the rods of fishing rods.

In one embodiment, the tool organizing device 1300 preferably includes a plurality of spaced fastener openings 1314A, 1314C that are adapted to receive fasteners, such as screws, for securing the tool organizing device 1300 to a vertically extending stud of a storage shed.

Referring to FIG. 28B, in one embodiment, the tool organizing device 1300 preferably has a length $L_3$ of about 2 feet 5 inches and a width $W_{13}$ of about 5.75 inches. In one embodiment, the mounting plate 1302 has a width $W_{13}'$ of about 3.25 inches.

In one embodiment, the distance $D_{13}$ between the upper edge 1308 and the first tool receiving recess 1306 is about one (1.0) inch. In one embodiment, the opening of the tool supporting recess 1306 defines a distance $D_{13}'$ of about 0.75-0.90 inches. In one embodiment, the closed bulbous region 1307 of the tool supporting recess 1306 defines a distance $D_{13}''$ of about one (1.0) inch.

In one embodiment, the distance $D_{13}'''$ between adjacent tool supporting recesses 1306 is about four (4.0) inches. In one embodiment, the bulbous region 1307 of the tool supporting recess 1306 has a radius $R_{13}$ of about 0.50 inches.

Figure 29A:
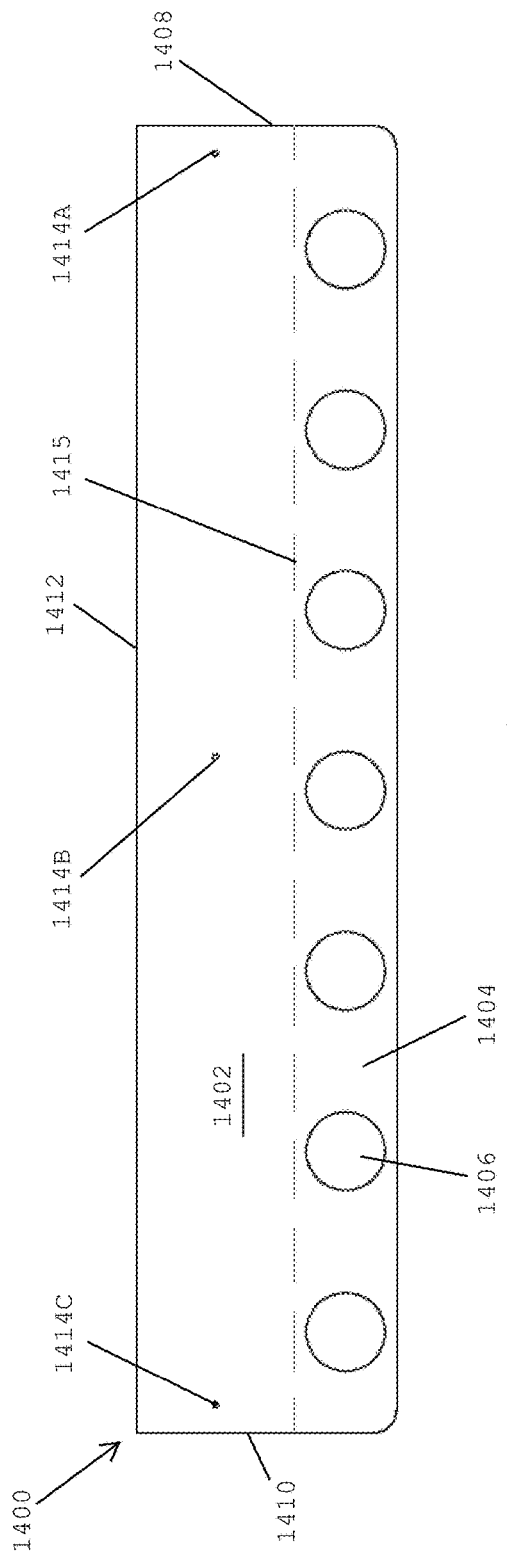
FIGS. 29A and 29B show a handle support plate of a fishing rod organizing system, in accordance with one embodiment of the present patent application.
Figure 29B:
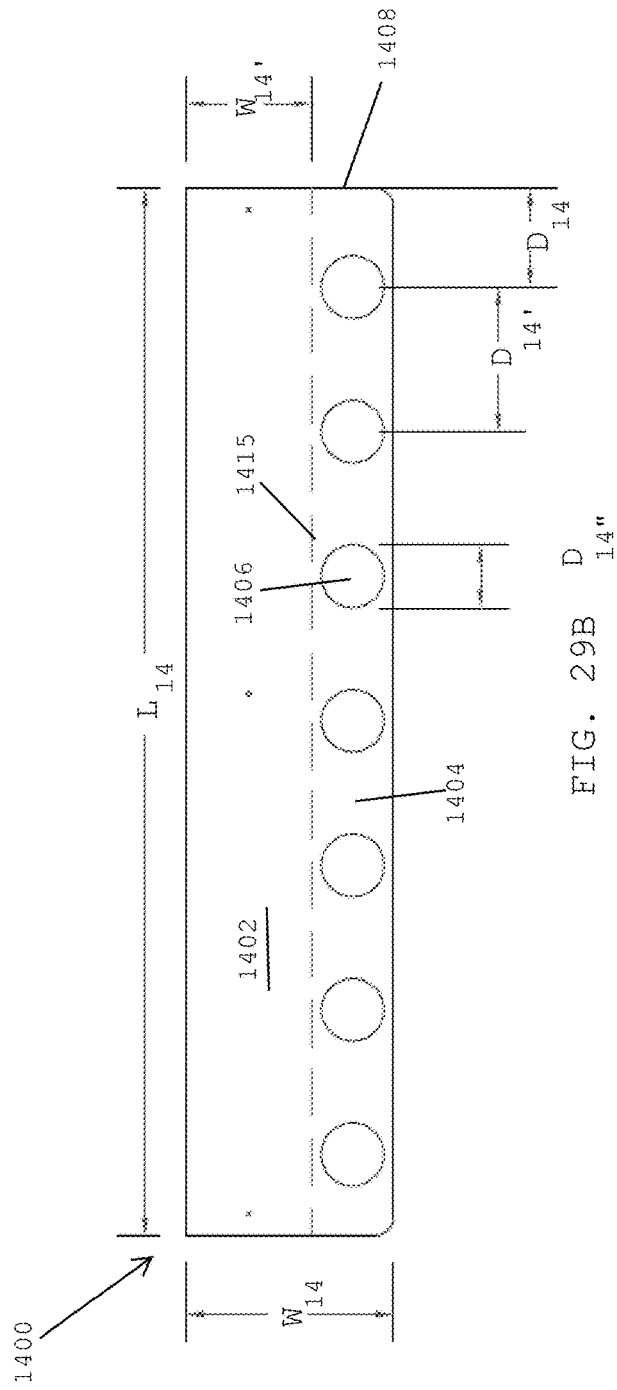

Referring to FIGS. 29A and 29B, in one embodiment, a tool organizing device 1400 forms a second part of a fishing rod organizer that is adapted to hold the handle ends of fishing rods.

In one embodiment, the tool organizing device 1400 preferably includes a self-leveling mounting plate 1402 and a tool supporting section 1404 that extends from a leading edge 1415 of the mounting plate 1402. In one embodiment, the tool supporting section 1404 preferably includes a series of circular openings 1406 that are adapted to receive the handle ends of fishing rods.

In one embodiment, the mounting plate 1402 preferably includes a top edge 1408 and a bottom edge 1410 that is parallel with the top edge 1408. In one embodiment, the mounting plate 1402 preferably includes a rear edge 1412 that is perpendicular with and defines a 90 degree angle with the top and bottom edges 1408, 1410, which enables the mounting plate 1402 to be properly aligned with the long axis of a stud or a beam of a storage shed. In one embodiment, the series of circular openings 1406 extend along the length of the tool organizing device 1400.

Referring to FIG. 29B, in one embodiment, the tool organizing device 1400 preferably has a length $L_{14}$ of about 2 feet, 5 inches and a width $W_{14}$ of about 5.75 inches. In one embodiment, the mounting plate 1402 has a width $W_{14}'$ of about 3.50 inches. The tool supporting section 1404 projects from the front edge 1415 of the mounting plate 1402. In one embodiment, the spacing between the top edge 1408 of the mounting plate 1402 and the center of the first circular opening 1406 defines the distance $D_{14}$ of about 2.75 inches. In one embodiment, the center-to-center distance $D_{14}'$ between adjacent circular openings 1406 is preferably about four (4.0) inches. In one embodiment, the diameter $D_{14}''$ of the circular openings 1406 is about 1.75 inches.

In one embodiment, the mounting plate 1402 includes a series of spaced fastener openings 1414A, 14140 that are adapted to receive fasteners, such as screws, for securing the mounting plate to a major face of a stud or a beam of a storage shed.

Figure 30:
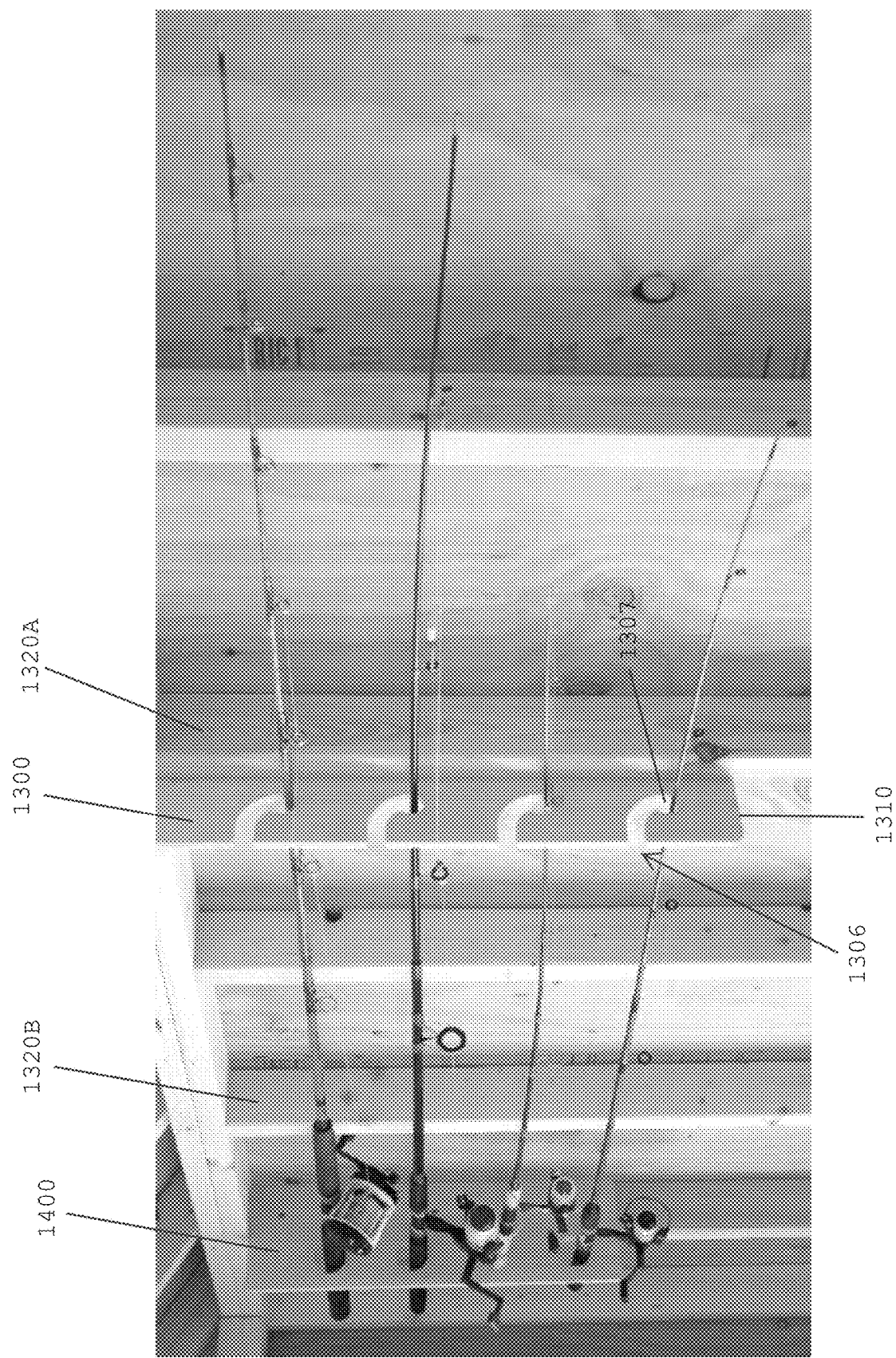
FIG. 30 shows a side view of the rod support plate of FIGS. 28A and 28B and the handle support plate of FIGS. 29A and 29B secured to adjacent vertical studs of a storage shed for use in storing fishing rods, in accordance with one embodiment of the present patent application.

Referring to FIG. 30, in one embodiment, the tool organizing device 1300 shown and described above in FIGS. 28A and 28B is preferably secured to a vertically extending stud 1320A of a storage shed. The lower edge 1310 of the mounting plate 1302 (FIG. 28A) is preferably closer to the ground and the upper edge of the mounting plate is preferably closer to the ceiling of the storage shed. The rods of fishing rods may be placed into the tool supporting recesses 1306 and seated in the bulbous openings 1307 for supporting the rod ends of fishing rods in the tool organizing device 1300.

The tool organizing device 1400 shown and described above in FIGS. 29A and 29B may be secured to a second vertically extending stud 1320B for supporting the handle ends of fishing rods.

Figure 31A:
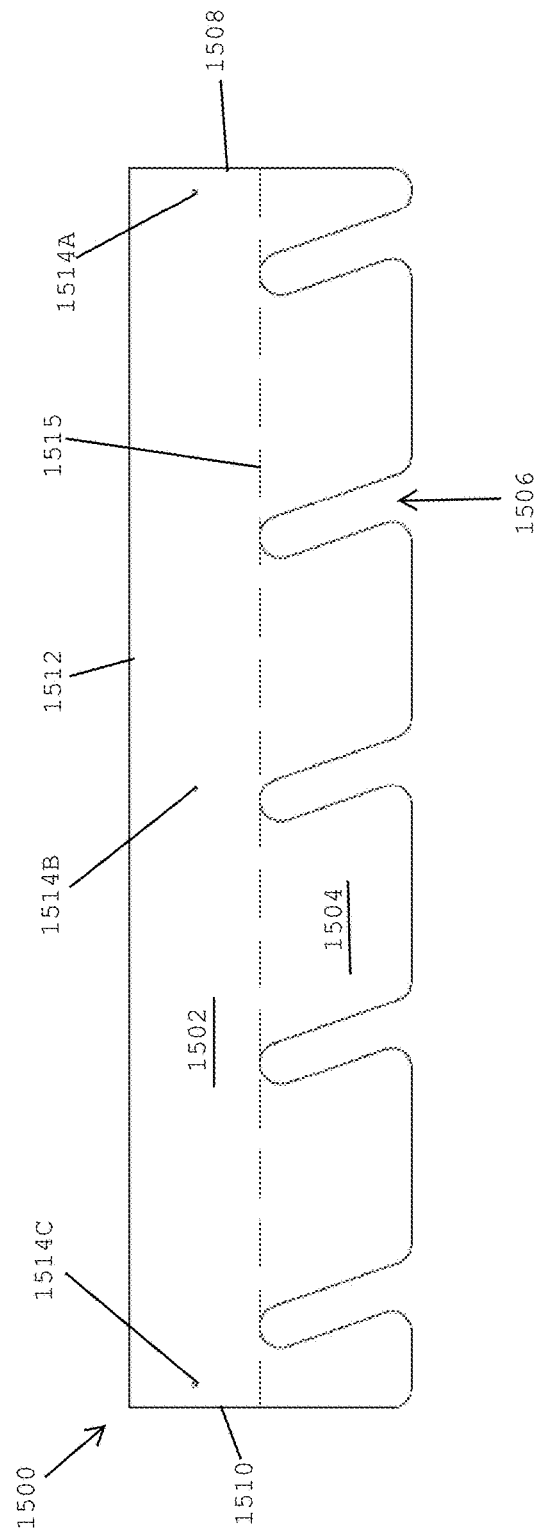
FIGS. 31A and 31B show a ski organizing plate utilized for storing skis within a storage shed, in accordance with one embodiment of the present patent application.
Figure 31B:
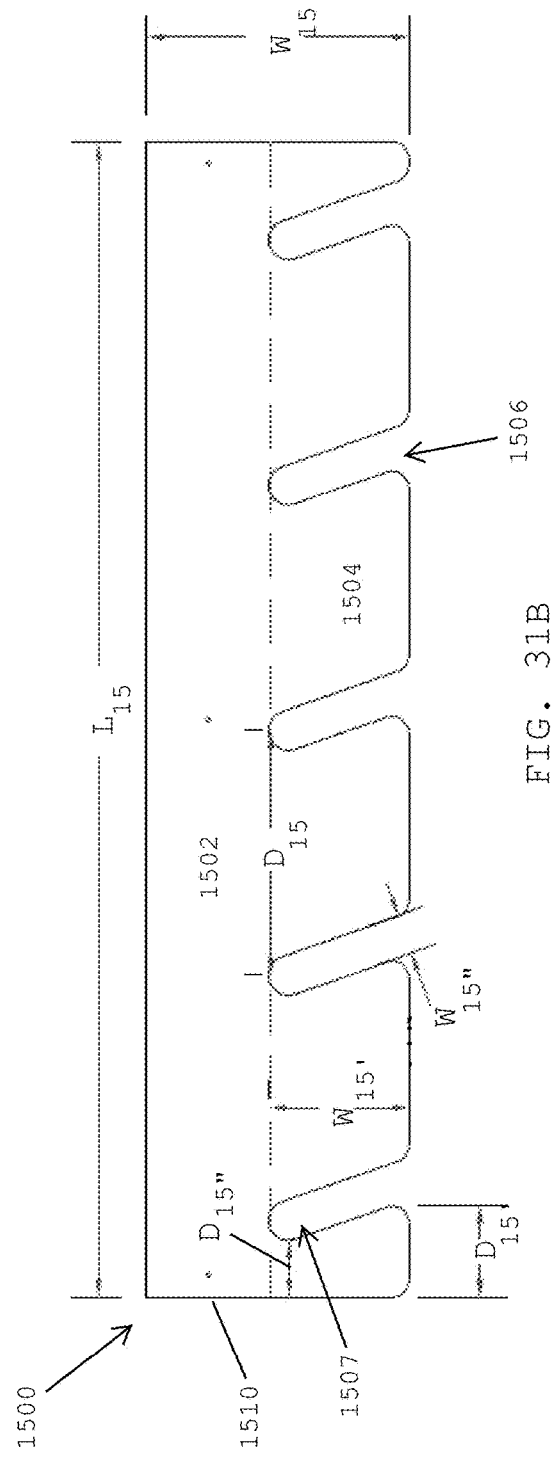

Referring to FIGS. 31A and 31B, in one embodiment, a tool organizing device 1500 preferably includes a self-leveling mounting plate 1502 and a tool supporting section 1504 that projects from a leading edge 1515 of the mounting plate 1502. In one embodiment, the tool supporting section 1504 preferably includes a plurality of spaced tool supporting recesses 1506 that are adapted to receive and seat snow and/or water skis. In one embodiment, the tool supporting recesses 1506 may extend along diagonal axes relative to a longitudinal axis of the mounting plate 1502. In one embodiment, the mounting plate 1502 preferably includes a top edge 1508 and a bottom edge 1510 that is parallel with the top edge 1508. In one embodiment, the mounting plate 1502 preferably includes a rear edge 1512 and a leading edge 1515 that are parallel with one another. In one embodiment, the rear edge 1512 is a vertically extending edge that is perpendicular to the top and bottom edges 1508, 1510 that extend along a horizontal axis after being mounted to a vertically extending stud of storage shed. In one embodiment, the tool organizing device 1500 preferably includes a plurality of spaced fastening openings 1514A-15140 that are spaced along the length of the mounting plate 1502. In one embodiment, fasteners, such as screws, may be passed through the spaced fastener openings 1514A-15140 for securing the mounting plate 1502 to a major face of a stud or beam of a storage shed.

Referring to FIG. 31B, in one embodiment, the tool organizing device 1500 preferably has a length $L_{15}$ of about 2 feet, 9 inches and a width is of about 7.50 inches. In one embodiment, the spacing between adjacent tool supporting recesses 1506 defines a distance $D_{15}$ of about 7 inches. In one embodiment, the supporting section 1504 of the tool organizing device 1500 has a width $W_{15}'$ of about 4 inches. In one embodiment, each tool supporting recess 1506 has an opening that defines a width $W_{15}''$ of about 1.25 inches.

In one embodiment, the distance between the lower edge 1510 of the tool organizing device 1500 and the lower most tool deporting recess 1506 defines a distance $D_{15}'$ of about 2.50 inches. In one embodiment, the distance between the closed end 1507 of a tool supporting recess 1506 and the lower edge 1510 of the tool organizing device 1500 defines a distance $D_{15}''$ of about 1.50-1.75 inches.

Figure 32A:
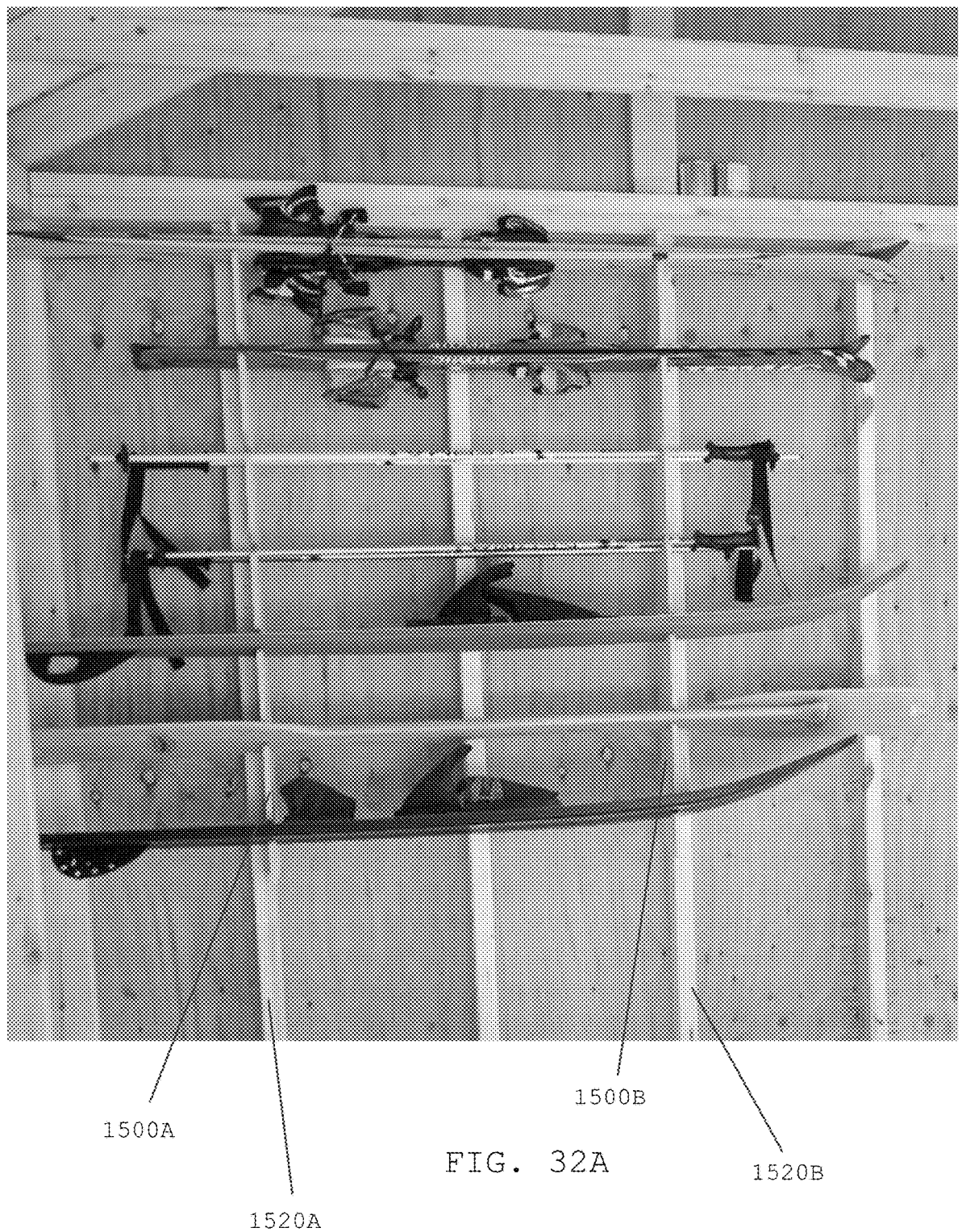
FIGS. 32A-32C show two of the ski organizing plates of FIGS. 31A and 31B secured to adjacent vertical studs of a storage shed for storing snow and water skis within the storage shed, in accordance with one embodiment of the present patent application.
Figure 32B:
Figure 32C:
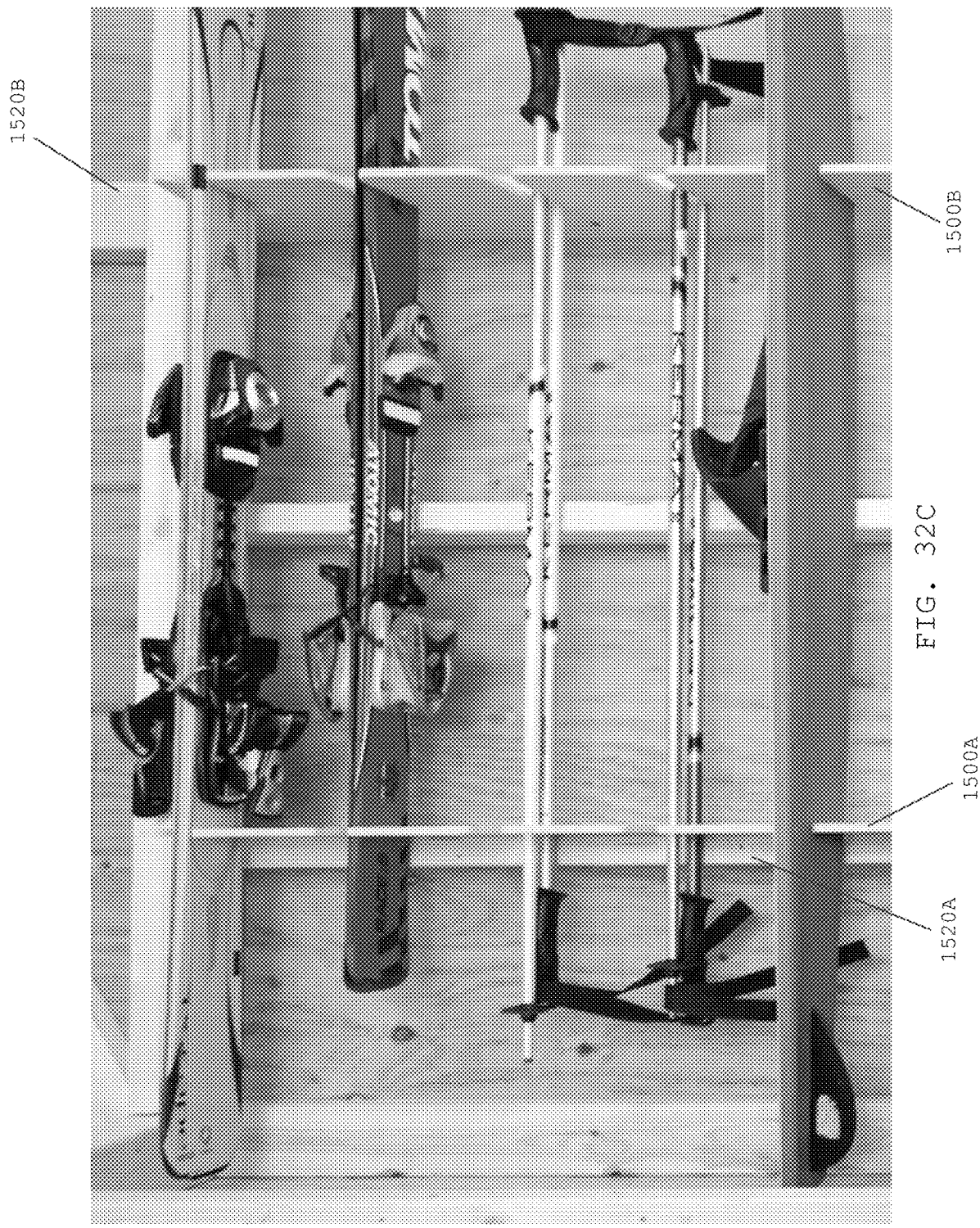

Referring to FIGS. 32A-32C, in one embodiment, the tool organizing device 1500 may be secured to a vertically extending stud of a storage shed for organizing and storing snow and water skis. In one embodiment, a first tool organizing device 1500A is secured to a first vertically extending stud 1520A of a storage shed and a second tool organizing device 1500B is secured to a second vertically extending stud 1520B of a storage shed. The first and second tool organizing devices 1500A, 1500B are preferably secured to the studs so that the open ends of the tool supporting recesses 1506 face outwardly away from the wall 1522 of the shed and are accessible for receiving snow and water skis for storage. In one embodiment, the closed ends of the tool supporting recesses 1506 are preferably lower than the open ends of the tool supporting recesses 1506 so that the snow and water skis do not fall out of the tool supporting recesses and are retained by the respective first and second tool organizing devices 1500A, 1500B.

Figure 33A:
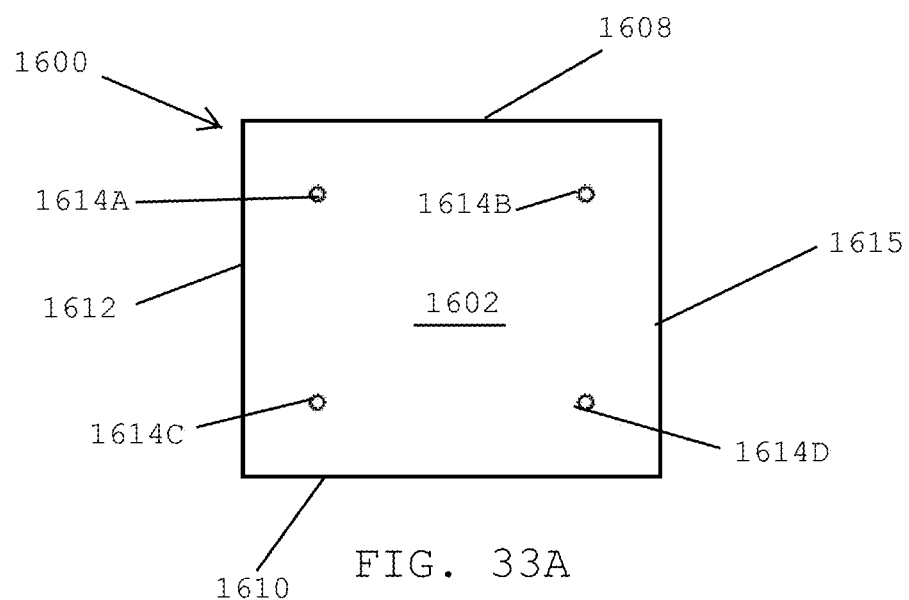
FIGS. 33A and 33B show a side view of a self-leveling mounting plate of a tool organizing system, in accordance with one embodiment of the present patent application.
Figure 33B:
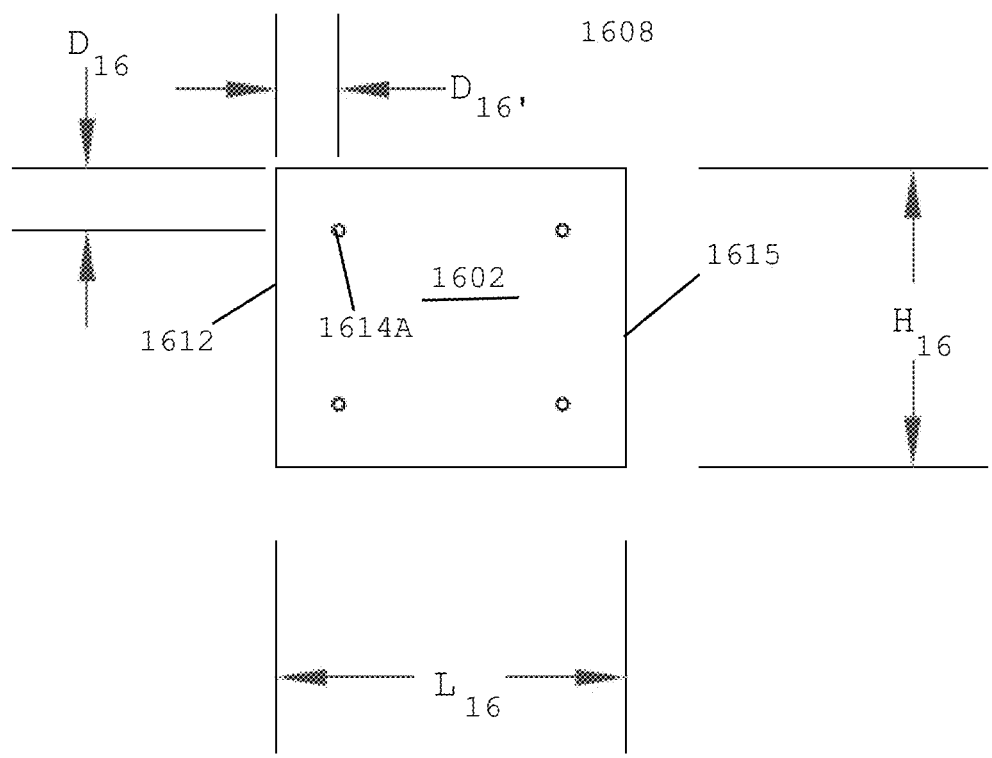

Referring to FIGS. 33A and 33B, in one embodiment, a tool organizing system 1600 preferably includes a self-leveling mounting plate 1602 having a horizontal top edge 1608 and a horizontal bottom edge 1610 that extend along axes that are parallel with one another. In one embodiment, the self-leveling mounting plate 1602 preferably includes a vertical rear edge 1612 and a vertical front edge 1615 that extends along respective axes that are parallel with one another. In one embodiment, the rear edge 1612 extends along an axis that is perpendicular with the top edge 1608 and the lower edge 1610, which enables the mounting plate 1602 to be easily leveled relative to a long axis (e.g., vertical axis) of a stud by using the respective edges of the mounting plate 1602. In one embodiment, the mounting plate 1602 preferably includes a plurality of spaced fastener openings 1614A-1614D that are adapted to receive fasteners, such as screws, for securing the mounting plate 1602 to a major face of a stud or beam of a storage shed.

Referring to FIG. 338, in one embodiment, the self-leveling mounting plate 1602 preferably has a length Lib of about 3.5 inches and a height $H_{16}$ of about 3 inches. In one embodiment, a first fastener opening 1614 is spaced a first distance $D_{16}$ of about 0.5-0.75 inches away from the upper edge 1608 of the mounting plate. In one embodiment, the first fastener opening 1614A is spaced a distance $D_{16}'$ of about 0.5-0.75 inches away from the rear edge 1612 of the mounting plate 1602.

Figure 34A:
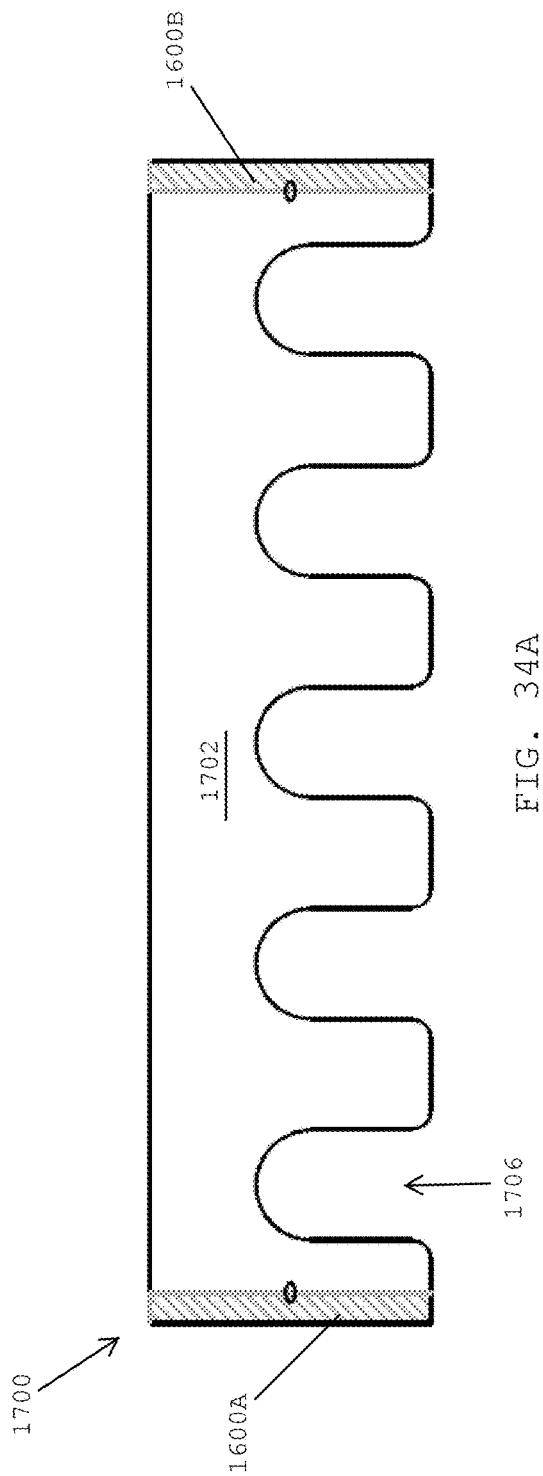
FIGS. 34A and 34B show a top view of a baseball bat organizing system including a baseball bat support plate and two self-leveling mounting plates, in accordance with one embodiment of the present patent application.
Figure 34B:
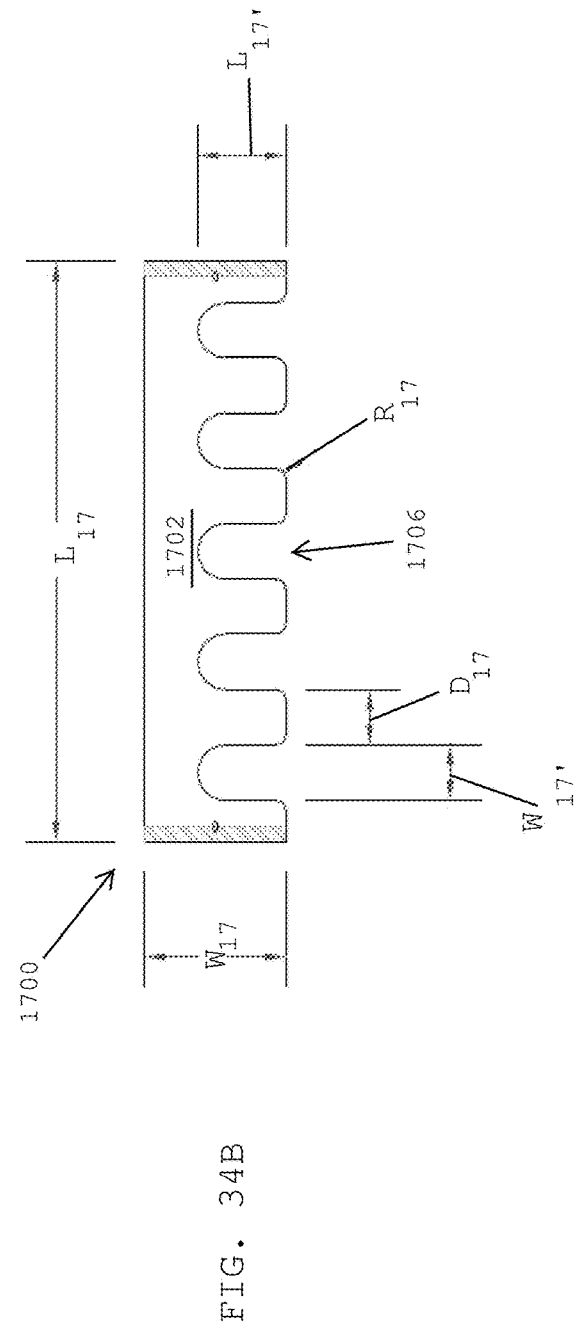

Referring to FIGS. 34A and 34B, in one embodiment, a baseball bat organizer 1700 preferably includes a shelf 1702 having a series of baseball bat openings 1706 formed in a front edge thereof.

In one embodiment, the shelf 1702 preferably has a length $L_{17}$ of about 14-15 inches and more preferably about 14.50 inches and a width $W_{17}$ of about 3.50 inches. In one embodiment, the baseball bat openings 1706 preferably have a length $L_{17}'$ of about 2.25 inches and a width $W_{17}'$ of about 1.25-1.50 inches. In one embodiment, the distance $D_{17}$ between adjacent baseball bat opening 1706 is preferably about 1.25-1.50 inches.

Figure 35A:
FIGS. 35A and 35B show two self-leveling mounting plates secured to adjacent vertical studs of a storage shed and a baseball bat support plate secured atop the two self-leveling mounting plates.
Figure 35B:
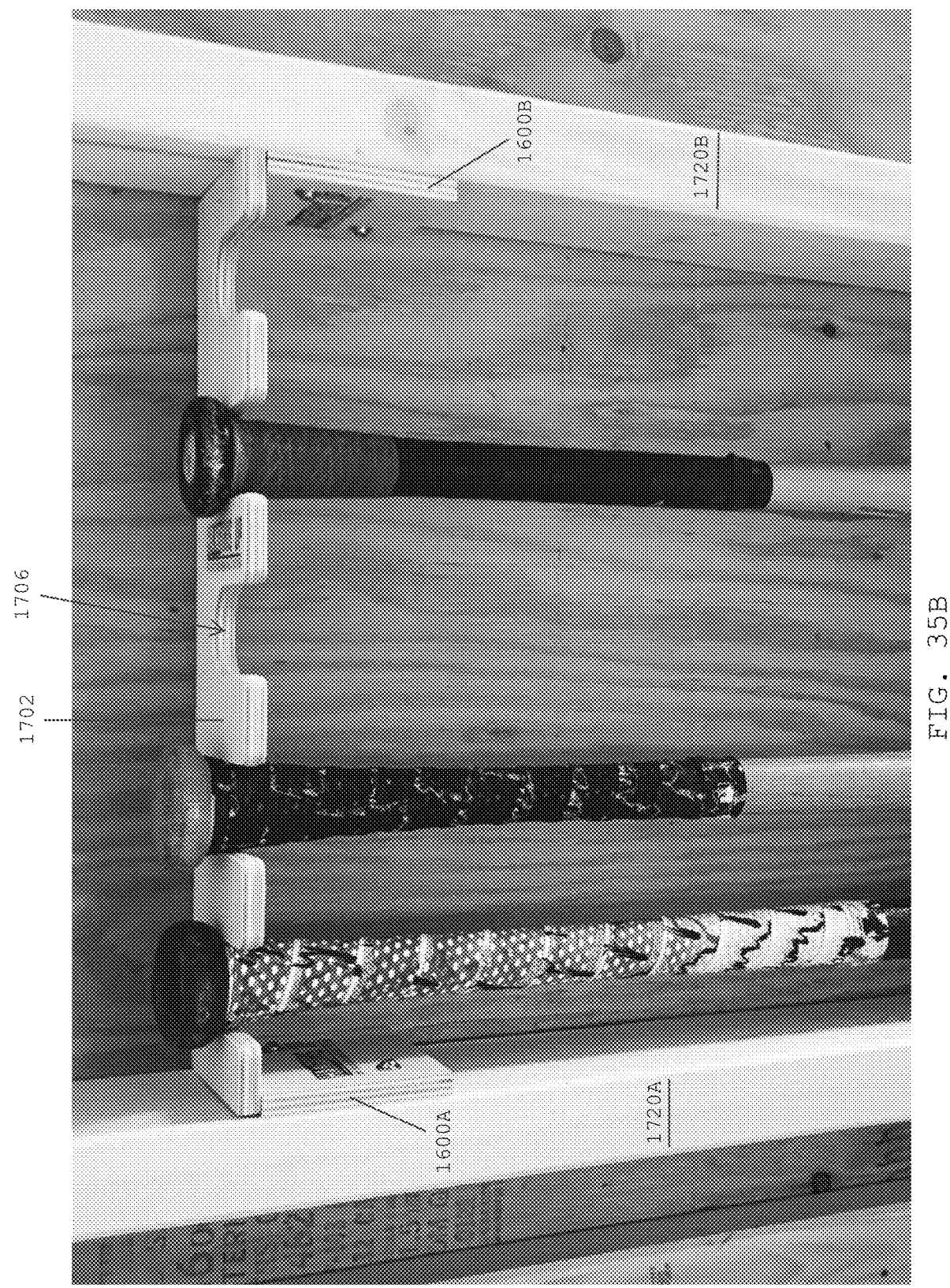

Referring to FIGS. 35A and 35B, in one embodiment, a first mounting plate 1600A as shown and describes above in FIGS. 33A and 33B may be secured to a major surface of a first vertically extending stud 1620A of a storage shed and a second mounting plate 1600B may be secured to a second vertically extending stud 1620B of a storage shed. The baseball bat organizing shelf 1702 may be secured over the top edge 1608 (FIG. 33) of the respective first and second mounting plates 1600A, 1600B. After being mounted onto the mounting plates 1600A, 1600B, the shelf 1702 preferably extends in a horizontal plane with the openings 1706 facing away from a wall 1722 of the storage shed for receiving the handles and/or knobs of baseball bats.

Referring to FIGS. 36A and 36B, in one embodiment, a golf club organizer 1800 preferably includes a shelf 1802 having a front edge with a series of golf club openings 1806 spaced from one another along the front edge. In one embodiment, the golf club organizer 1800 may be mounted atop the self-leveling mounting plates 1602A and 1602B as shown and describe above in FIGS. 33A and 33B. In one embodiment, the golf club organizing shelf 1802 preferably has a length $L_{18}$ of about 15-16 inches and a width $W_{18}$ of about 3.50 inches. In one embodiment, the respective golf club organizer openings 1806 preferably have a length $L_{18}'$ of about 1.25 inches. The golf club organizer openings 1806 have closed ends 1807 defining a radius $R_{18}$ of about 0.5-0.75 inches. In one embodiment, the open ends of the golf club openings 1806 preferably have a width $W_{18}'$ of about 0.5 inches. In one embodiment, a first golf club opening 1806 that is adjacent the left edge 1810 of the shelf 1802 defines a distance $D_{18}$ of about 1.50-1.75 inches.

In one embodiment, after the mounting plates 1802A and 1802B have been mounted on opposing major faces of adjacent vertically extending studs, the golf club organizing shelf 1802 may be secured atop the upper edges of the mounting plates. The shelf 1802 preferably extends in a horizontally extending direction with the open ends of the golf club openings 1806 facing away from a wall of the shed and adapted to receive the shafts of golf clubs for storing the heads of the golf clubs above a top surface of the horizontally extending shelf 1802.

Figure 37A:
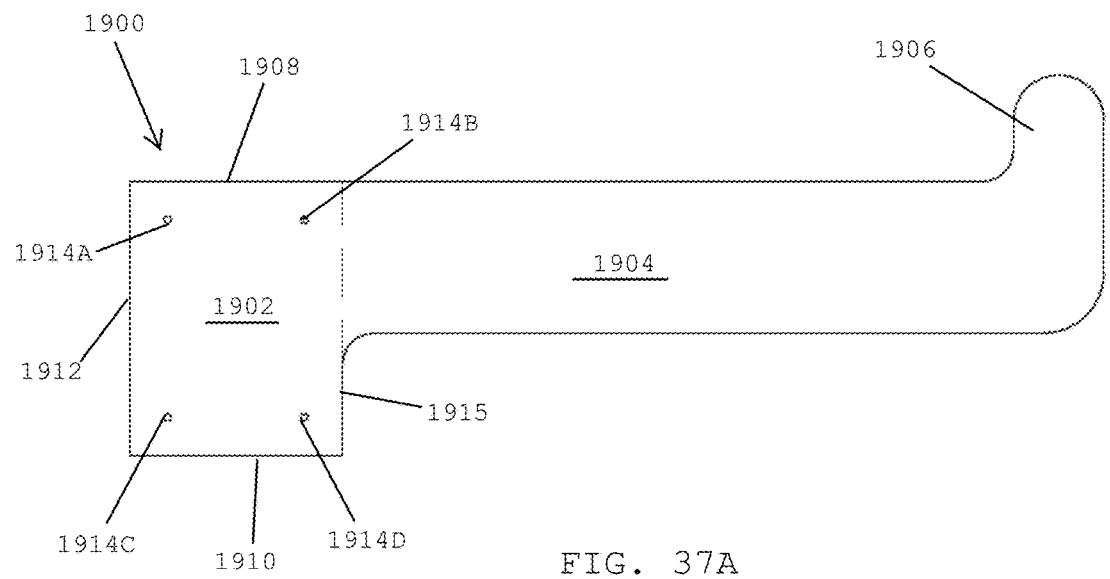
FIGS. 37A and 37B show a side view of a tool organizing device, in accordance with one embodiment of the present patent application.
Figure 37B:
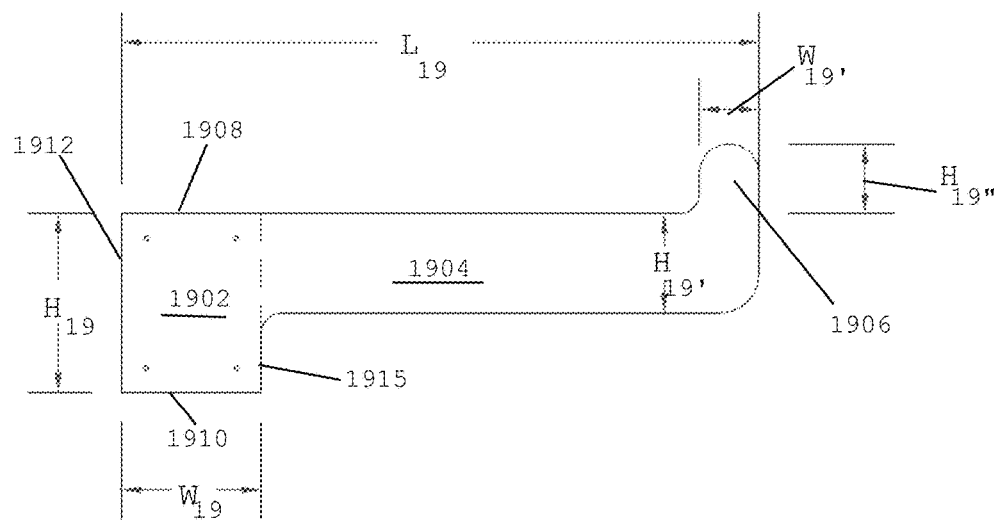

Referring to FIGS. 37A and 37B, in one embodiment, a tool organizing device 1900 such as a miscellaneous storage organizer preferably includes a self-leveling mounting plate 1902 and a tool supporting section 1904 that projects from a leading or front edge 1915 of the mounting plate 1902. In one embodiment, the tool organizing device 1900 preferably includes a vertically extending component 1906 that is located at a distal free end of the tool supporting section 1904 that is adapted to retain an item that has been stored and/or placed atop the top surface of the tool supporting section 1904. In one embodiment, the mounting plate 1902 preferably has a top edge 1908 and a bottom edge 1910 that is parallel with the top edge 1908. In one embodiment, the mounting plate 1902 preferably includes a rear edge 1912 that extends in a vertical direction and that is perpendicular with the axes of the respective top and bottom edges 1908, 1910. In one embodiment, the front edge 1915 of the mounting plate 1902 extends along an axis that is parallel to the axis of the rear edge 1912 and perpendicular to the top and bottom edges 1908, 1910. In one embodiment, the mounting plate 1902 preferably includes a plurality of spaced fastener openings 1914A-1914D that are adapted to receive fasteners, such as screws, for securing the plate 1902 to a major surface of a vertically extending stud, or a major surface of a horizontally extending beam of a storage shed.

Referring to FIG. 37B, in one embodiment, the tool organizing device 1900 preferably has a length $L_{19}$ of about 15-17 inches and more preferably about 16 inches. In one embodiment, the mounting plate 1902 preferably has a height $H_{19}$ of about 4.25 inches and a width $W_{19}$ of about 3.50 inches. In one embodiment, the tool supporting section 1904 preferably defines a height $H_{19}'$ of about 2.50 inches. In one embodiment, the vertical component 1906 extends a distance above the upper edge of the tool supporting section 1904 a height $H_{19}''$ of about 1.75 inches. In one embodiment, the vertical extension 1906 of the tool organizing device 1900 preferably has a width $W_{19}'$ of about 1.50 inches.

Figure 38A:
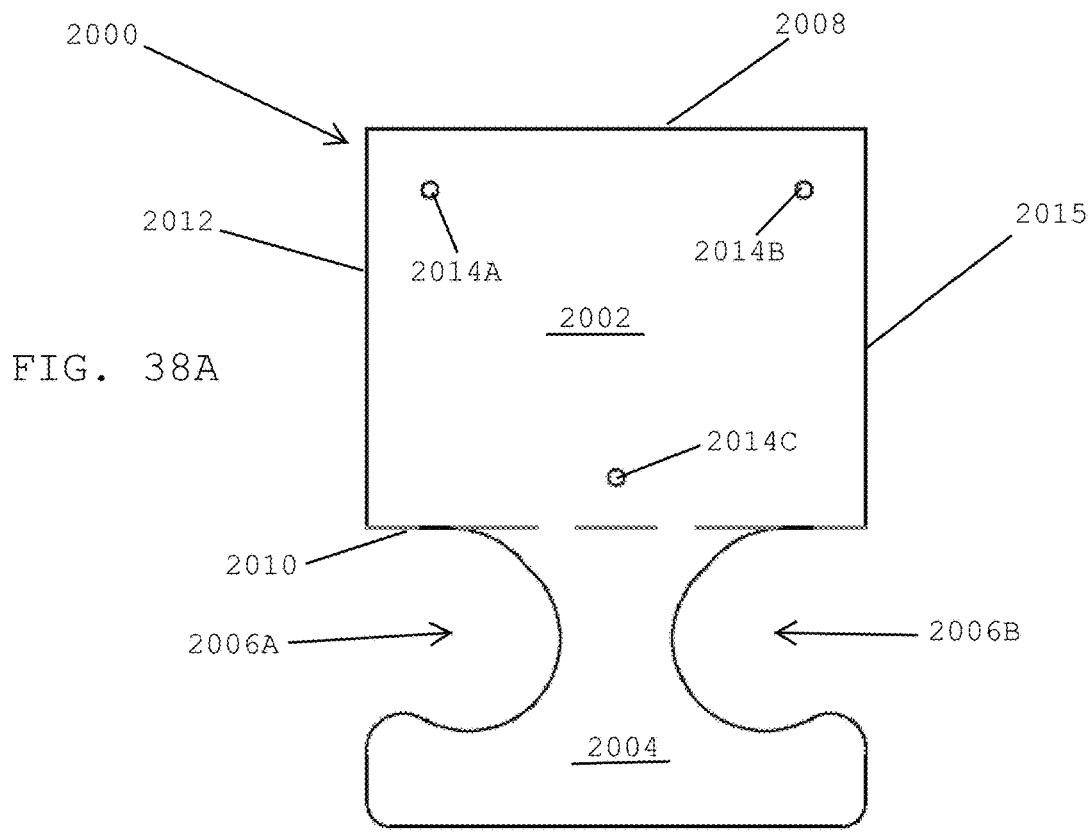
FIGS. 38A and 38B show a side view of a tool organizing device, in accordance with one embodiment of the present patent application.
Figure 38B:
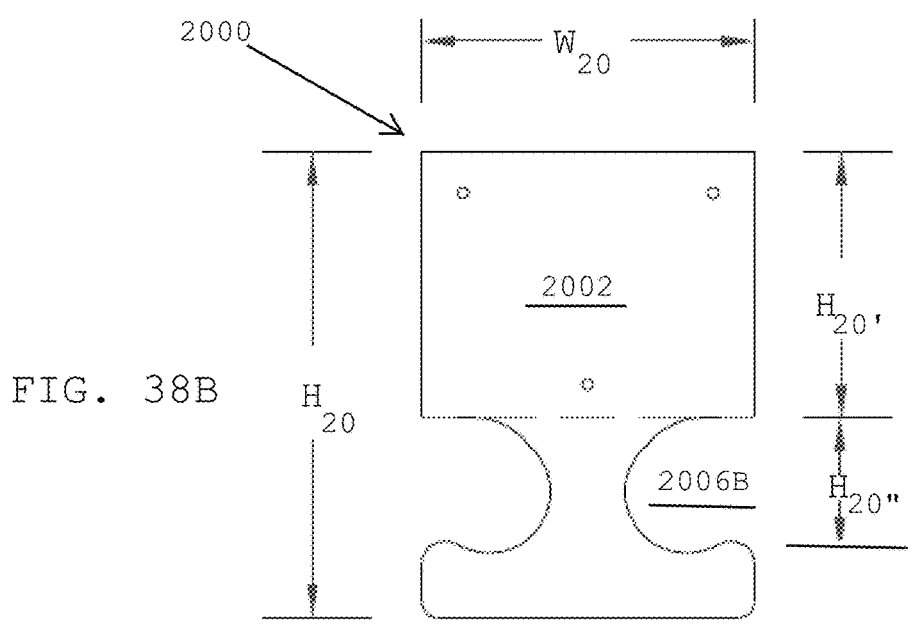

Referring to FIGS. 38A and 38B, in one embodiment, a pole and pool equipment organizer 2000 preferably includes a self-leveling mounting plate 2002 that is adapted to be mounted onto a horizontally extending beam of a storage shed. In one embodiment, the mounting plate 2002 preferably has a top edge 200B and a bottom edge 2010 that extend along respective axes that are parallel with one another. In one embodiment, the mounting plate 2002 preferably has a rear edge 2012 and a front edge 2015 that extend along respective axes that are parallel with one another and that are perpendicular to the respective axes of the top and bottom edge 200B and 201O. In one embodiment, the pole and pool equipment organizer 2000 preferably includes a tool supporting section 2004 that extends from the lower edge 2010 of the mounting plate 2002.

In one embodiment, the pole and pool equipment organizer 2000 preferably includes a first pole opening 2006A formed on one side of the tool supporting section 2004 and a second pole opening 2006B formed on a second side of the tool supporting section 2004. In one embodiment, the openings 2006A and 2006B may define hook shaped openings that are adapted to receive and retain poles and pool equipment.

In one embodiment, the mounting plate 2002 preferably includes a plurality of spaced fasteners openings 2014A-20140 that are adapted to receive fasteners, such as screws, for securing the mounting plate 2004 to a major surface of a vertically extending stud or horizontally extending beam of a storage shed. In one embodiment, a series of pole and pool equipment organizers 2000 may be secured to adjacent horizontally extending beams of a storage shed so that poles and pool equipment may be stored adjacent a ceiling of a storage shed (i.e., in the rafters). In one embodiment, the poles and pool equipment will preferably extend in a horizontal direction when being hung from the tool organizing device 2000.

Referring to FIG. 388, in one embodiment, the pole and pool equipment organizer 2000 preferably has a height $H_{20}$ of about 7 inches. In one embodiment, the mounting plate 2002 preferably has a width $W_{20}$ of about 5 inches and a height $H_{20}'$ of about 4 inches. In one embodiment, the pole opening 2005B of the pole and pool equipment organizer 2000 preferably has a height $H_{20}''$ of about two (2.0) inches and depth $D_{20}$ of about two (2.0) inches.

Figure 39A:
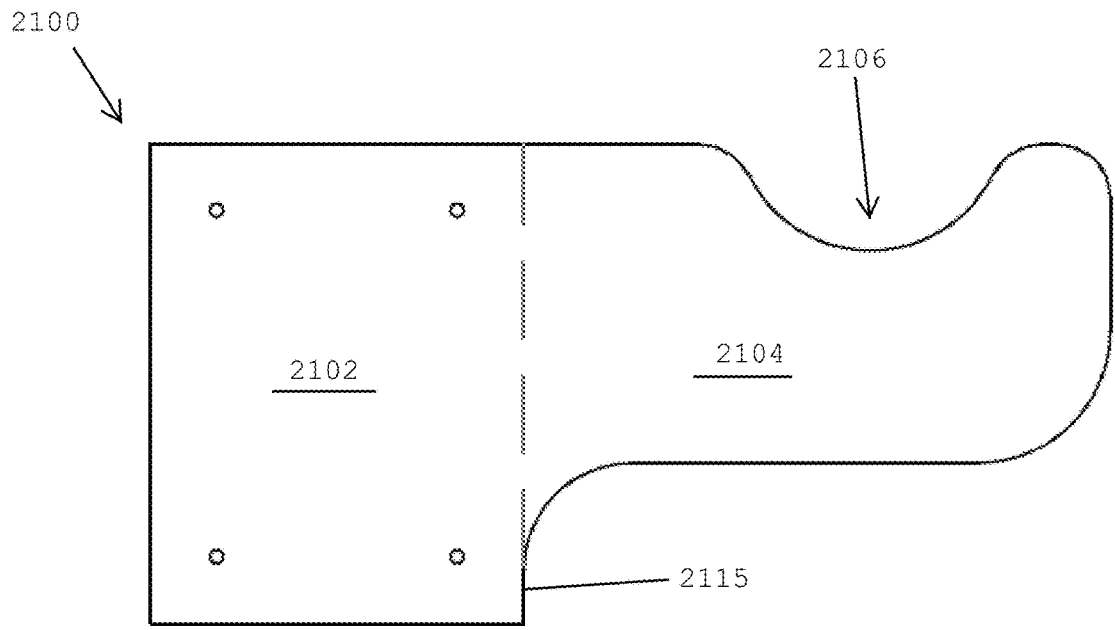
FIGS. 39A and 39B show a side view of a tool organizing device, in accordance with one embodiment of the present patent application.
Figure 39B:
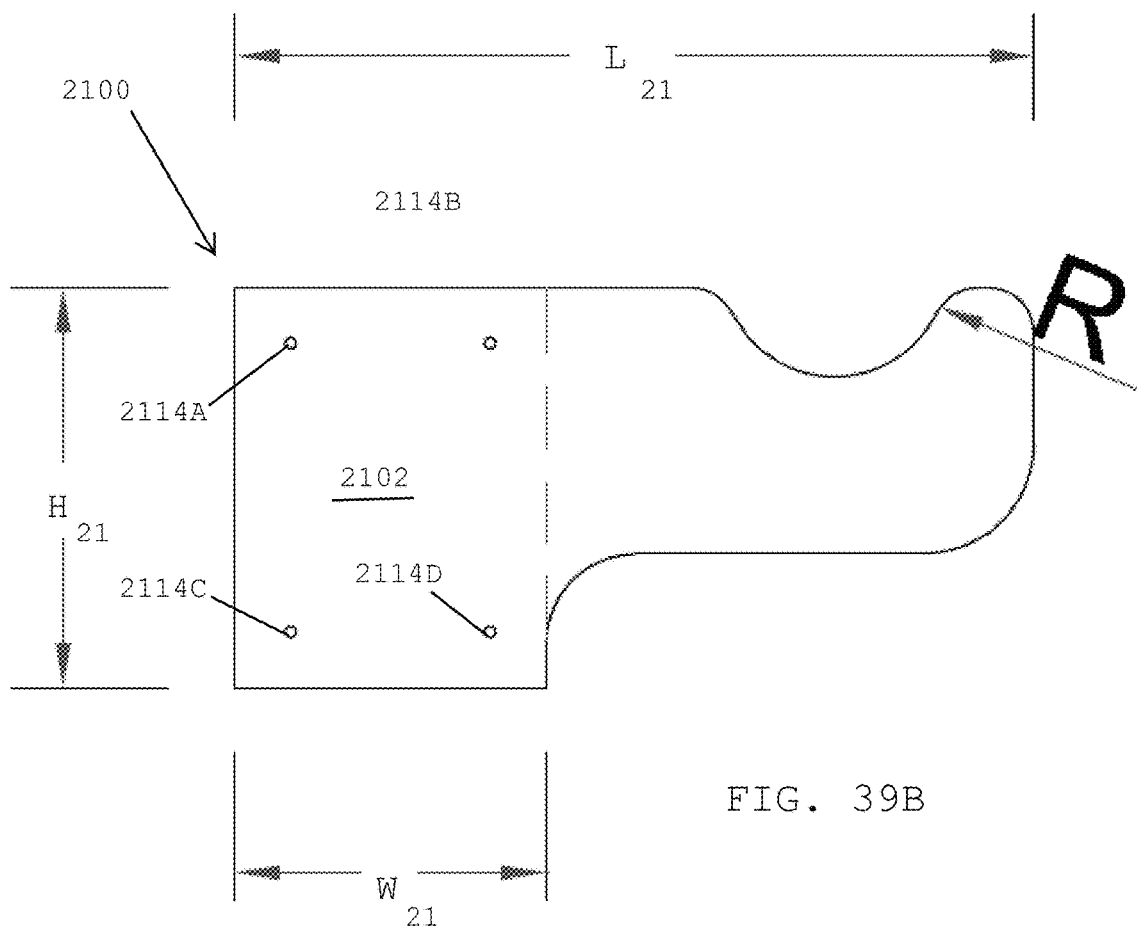

Referring to FIGS. 39A and 39B, in one embodiment, a tool organizing device 2100 preferably includes a self-leveling mounting plate 2102 and a tool supporting section 2104 that projects from a front edge 2115 of the mounting plate 2102. In one embodiment, the tool organizing device 2100 preferably includes a tool supporting recess 2106 formed at an upper end of the tool supporting section 2104.

Referring to FIG. 39B, in one embodiment, the tool organizing device 2100 preferably has a length $L_{21}$ of about 9.0 inches. In one embodiment, the mounting plate 2102 preferably has a height $H_{21}$ of about 4.50 inches and a width $W_{21}$ of about 3.50 inches. In one embodiment, the tool supporting recess 2106 of the tool supporting device 2100 preferably has a radius $R_{21}$ of about 1.25 inches.

In one embodiment, the mounting plate 2102 preferably includes a plurality of fasteners openings 2114A-2114D that are adapted to receive fasteners, such as screws, for securing the mounting plate 2102 to a major surface of a vertically extending stud of a storage shed.

Figure 40A:
FIGS. 40A and 40B show a tool shed having tool organizing devices secured to vertically extending studs of the tool shed for mounting and storing garden tools and related items, in accordance with one embodiment of the present patent application.
Figure 40B:

FIGS. 40A and 40B show a storage shed having the tool organizing devices and systems disclosed herein for storing tools, garden equipment, and other components along the walls of the storage shed. In one or more embodiments, the tool organizing devices are secured to the major faces of vertically extending studs of the storage shed with the tools being supported by one or more of the tool organizing devices.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A shed organizing system comprising:
a first tool organizing device including a first mounting plate and a first tool supporting section that extends from said first mounting plate;
a second tool organizing device including a second mounting plate and a second tool supporting section that extends from said second mounting plate;
a shed including an exposed vertical stud having a first major surface that extends along a first side of said exposed vertical stud and a second major surface that extends along a second side of said exposed vertical stud, and wherein said first mounting plate is secured to said first major surface of said exposed vertical stud and said second mounting plate is secured to said second major surface of said exposed vertical stud;
wherein said first mounting plate has a top horizontally extending edge and a bottom horizontally extending edge that is parallel with said top horizontally extending edge, and a rear vertically extending edge that is perpendicular to the top and bottom horizontally extending edges, and wherein said rear vertically extending edge of said first mounting plate is pressed against a vertical wall of said shed for aligning said first mounting plate on said exposed vertical stud;
wherein said first mounting plate includes three fastener openings, with one of said fastener openings being positioned off of a line extending between the other two fastener openings.

2. The shed organizing system as claimed in claim 1, wherein said second mounting plate has a top horizontally extending edge and a bottom horizontally extending edge that is parallel with said top horizontally extending edge, and a rear vertically extending edge that is perpendicular to the top and bottom horizontally extending edges, and wherein said rear vertically extending edge of said second mounting plate is pressed against said vertical wall of said shed for aligning said second mounting plate on said exposed vertical stud.

3. The shed organizing system as claimed in claim 2, wherein said exposed vertical stud has a length that extends along a vertical axis thereof, and wherein said rear vertically extending edges of said respective first and second mounting plates are parallel with the vertical axis of said exposed vertical stud.

4. The shed organizing system as claimed in claim 3, wherein said top and bottom horizontally extending edges of said respective first and second mounting plates are perpendicular to the vertical axis of said exposed vertical stud.

5. The shed organizing system as claimed in claim 1, wherein said first and second mounting plates are secured to said exposed vertical stud using fasteners.

6. The shed organizing system as claimed in claim 5, wherein said fasteners are selected from the group consisting of screws, nails and bolts.

7. The shed organizing system as claimed in claim 1, wherein said first and second tool organizing devices are spaced from one another on opposite sides of said exposed vertical stud so that a gap is present between said tool supporting structure of said first tool organizing device and said tool supporting structure of said second tool organizing device.

8. The shed organizing system as claimed in claim 1, wherein said first tool organizing device comprises wisa birch plywood, and wherein said second tool organizing device comprises wisa birch plywood.

9. The shed organizing system as claimed in claim 1, wherein said tool supporting sections of said first and second tool organizing devices include tool supporting recesses that are adapted to seat a tool therein.

10. The shed organizing system as claimed in claim 1, wherein said first mounting plate and said first tool supporting section are formed from a single piece of plywood having a uniform thickness.

11. The shed organizing system as claimed in claim 1, further comprising at least one additional fastener opening.

12. The shed organizing system as claimed in claim 11, wherein said at least one additional fastener opening is positioned off of said line.

13. A shed organizing system for a shed having a plurality of exposed vertical studs supporting a vertical wall, the shed organizing system comprising:
a first equipment organizing device including a first mounting plate and a first supporting section that extends from said first mounting plate;
a second equipment organizing device including a second mounting plate and a second supporting section that extends from said second mounting plate;
each of the plurality of exposed vertical studs having a first major surface that extends along a first side thereof and a second major surface that extends along a second side thereof;
said first mounting plate adapted for being secured to one of the first and second major surfaces of a first one of the exposed vertical studs;
said second mounting plate adapted for being secured to one of the first and second major surfaces of a second one of the exposed vertical studs;
wherein said first mounting plate has a top horizontally extending edge and a bottom horizontally extending edge that is parallel with said top horizontally extending edge, and a rear vertically extending edge that is perpendicular to the top and bottom horizontally extending edges, and wherein when said rear vertically extending edge of said first mounting plate is pressed against the vertical wall of the shed, said top and bottom horizontally extending edges are arranged perpendicular to the vertical wall for aligning said first mounting plate on an exposed vertical stud:
wherein said first mounting plate includes three fast openings. with one of said fastener openings being positioned off of a line extending en. the other two fastener openings.

14. The shed organizing system as claimed in claim 13, wherein the first one of the exposed vertical studs has a length that extends along a vertical axis thereof, and wherein said rear vertically extending edge of said first mounting plate is adapted to be mounted parallel with the vertical axis of the first one of the exposed vertical studs.

15. The shed organizing system as claimed in claim 14, wherein said second mounting plate has a top horizontally extending edge and a bottom horizontally extending edge that is parallel with said top horizontally extending edge, and a rear vertically extending edge that is perpendicular to the top and bottom horizontally extending edges thereof;
wherein said rear vertically extending edge of said second mounting plate is adapted to be pressed against the vertical wall of the shed for aligning said second mounting plate on the exposed vertical stud.

16. The shed organizing system as claimed in claim 15, wherein the second one of the exposed vertical studs has a length that extends along a vertical axis thereof, and wherein said rear vertically extending edge of said second mounting plate is adapted to be mounted parallel with the vertical axis of the second one of the exposed vertical studs.

17. The shed organizing system as claimed in claim 16, wherein said top and bottom horizontally extending edges of said first mounting plate are perpendicular to the vertical axis of the first one of the exposed vertical studs, and wherein said top and bottom horizontally extending edges of said second mounting plate are perpendicular to the vertical axis of the second one of the exposed vertical studs.

18. The shed organizing system as claimed in claim 13, wherein said first and second mounting plates are adapted to be secured to the respective first and second ones of the exposed vertical studs using fasteners.

19. The shed organizing system as claimed in claim 18, wherein the fasteners are selected from the group consisting of screws, nails, and bolts.

20. The shed organizing system as claimed in claim 13, wherein said first tool organizing device comprises wisa birch plywood, and wherein said second tool organizing device comprises wisa birch plywood.

21. The shed organizing system as claimed in claim 13, wherein said supporting sections of said first and second equipment organizing devices include recesses or U-shaped surfaces that are adapted to seat equipment therein.

22. The shed organizing system as claimed in claim 13, wherein said first mounting plate and said first tool supporting section are formed from a single piece of plywood having a uniform thickness.

23. The shed organizing system as claimed in claim 13, further comprising at least one additional fastener opening.

24. The shed organizing system as claimed in claim 23, wherein said at least one additional fastener opening is positioned off of said line.

25. A shed organizing system comprising:
a first tool organizing device including a first mounting plate and a first tool supporting section that extends from said first mounting plate;
a second tool organizing device including a second mounting plate and a second tool supporting section that extends from said second mounting plate;
wherein said first mounting plate has a top horizontally extending edge and a bottom horizontally extending edge that is parallel with said top horizontally extending edge, and a rear vertically extending edge that is perpendicular to the top and bottom horizontally extending edges,
wherein said first mounting plate includes three fastener openings, with one of said fastener openings being positioned off of a line extending between the other two fastener openings.

26. The shed organizing system as claimed in claim 25, further comprising at least one additional fastener opening.

27. The shed organizing system as claimed in claim 26, wherein said at least one additional fastener opening is positioned off of said line.

* * * * *